FIG. 3
TRAFFIC SERVICE POSITION KEYBOARD AND LAMP DISPLAY

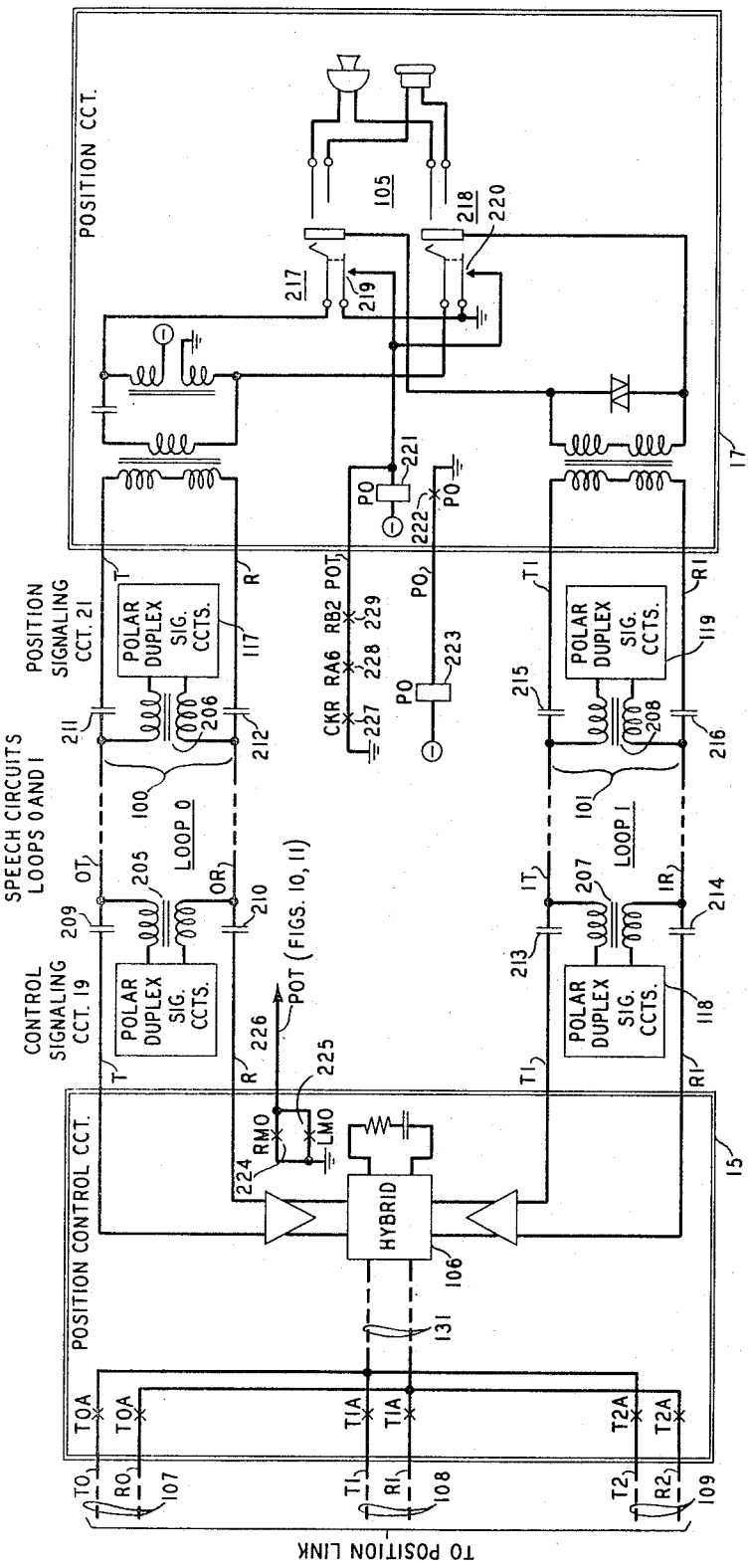

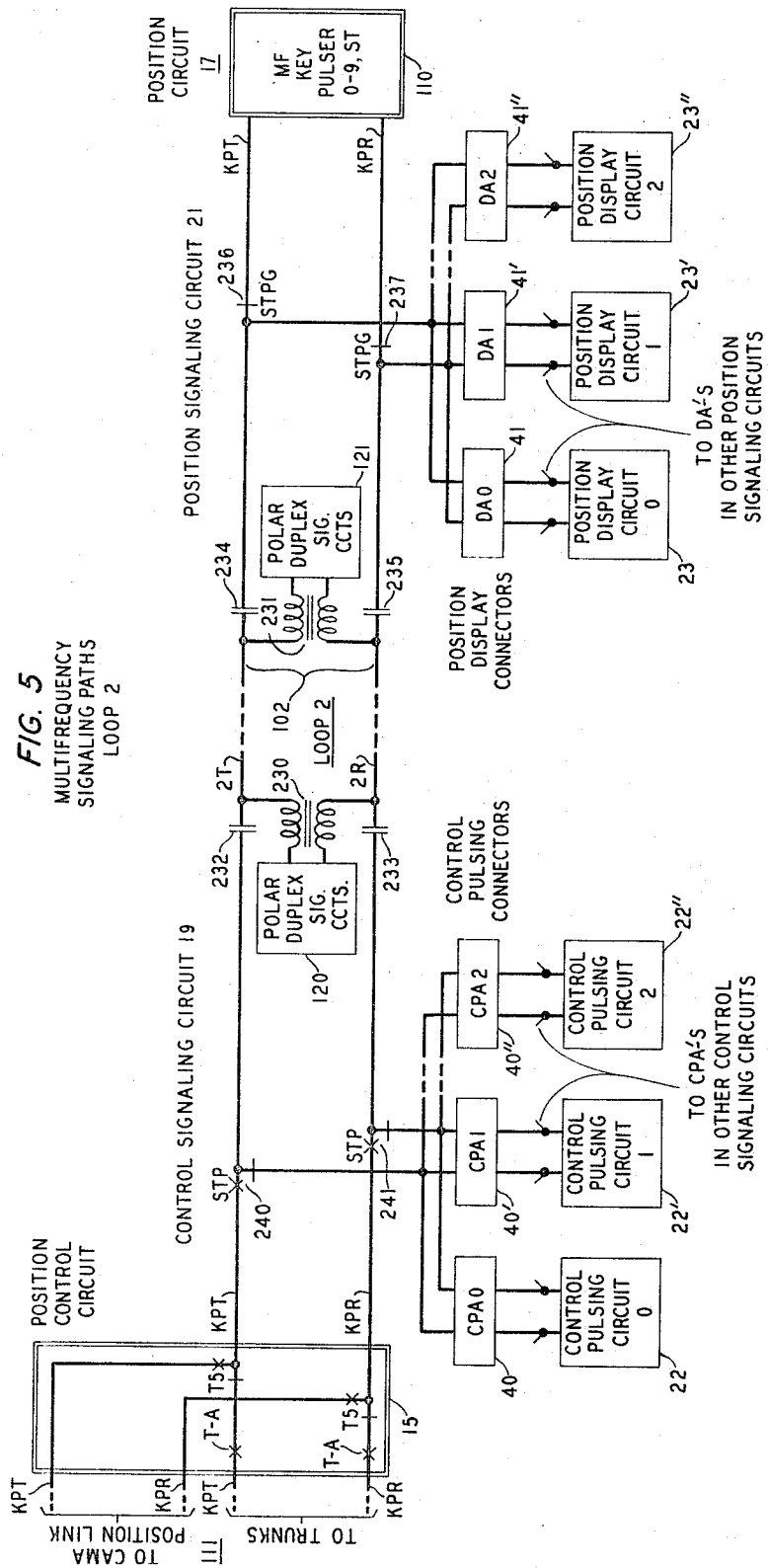
FIG. 5 MULTIFREQUENCY SIGNALING PATHS LOOP 2

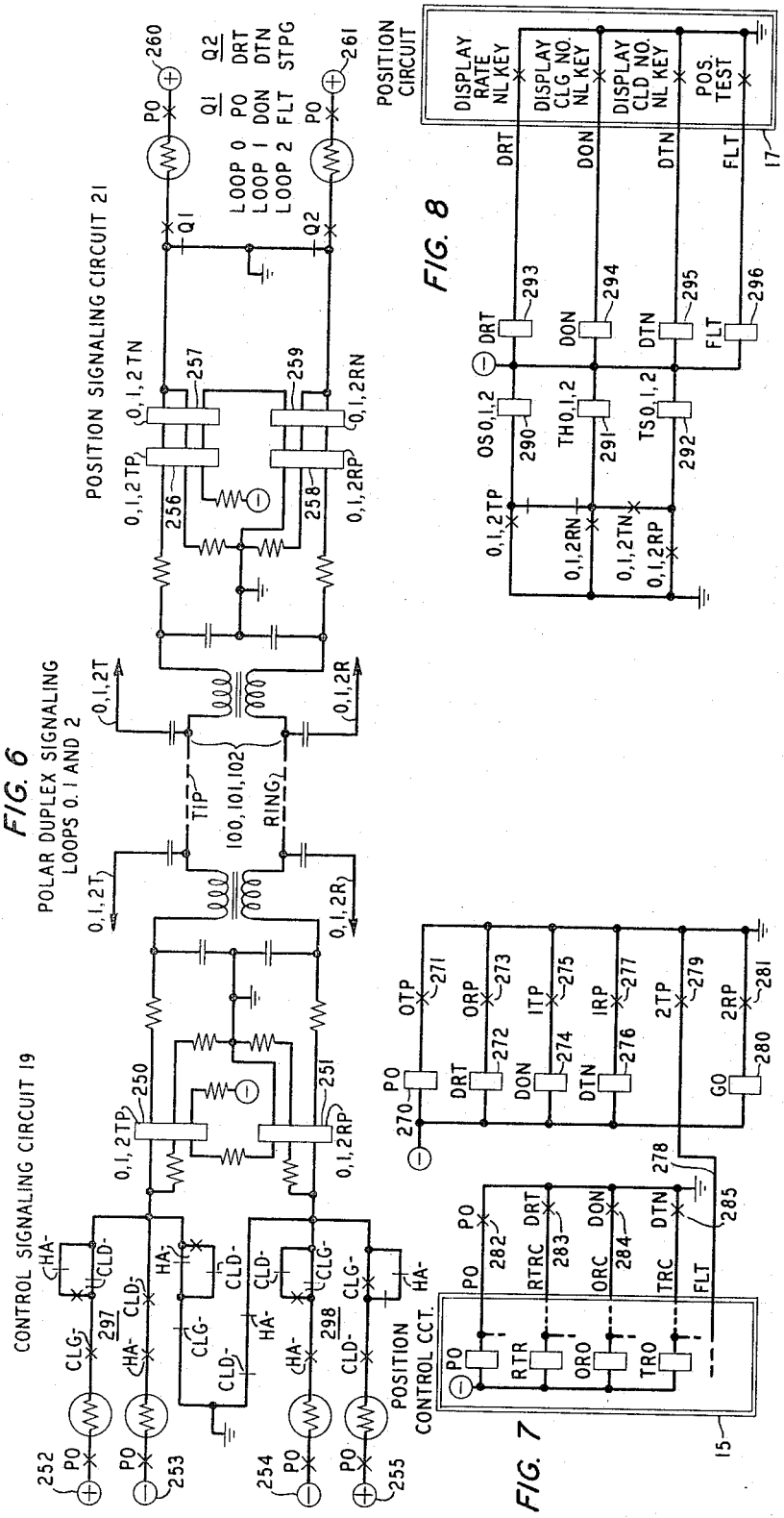

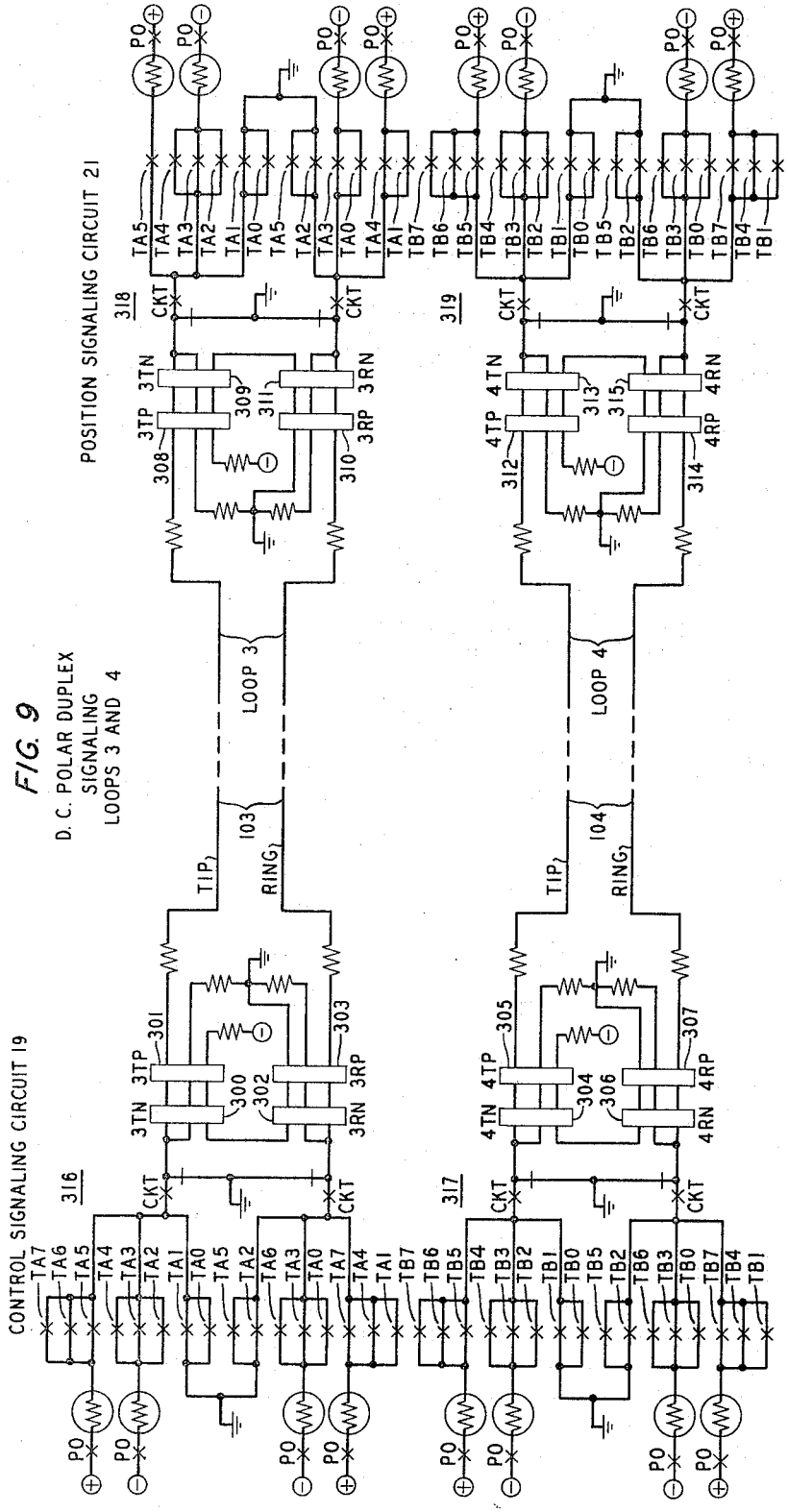

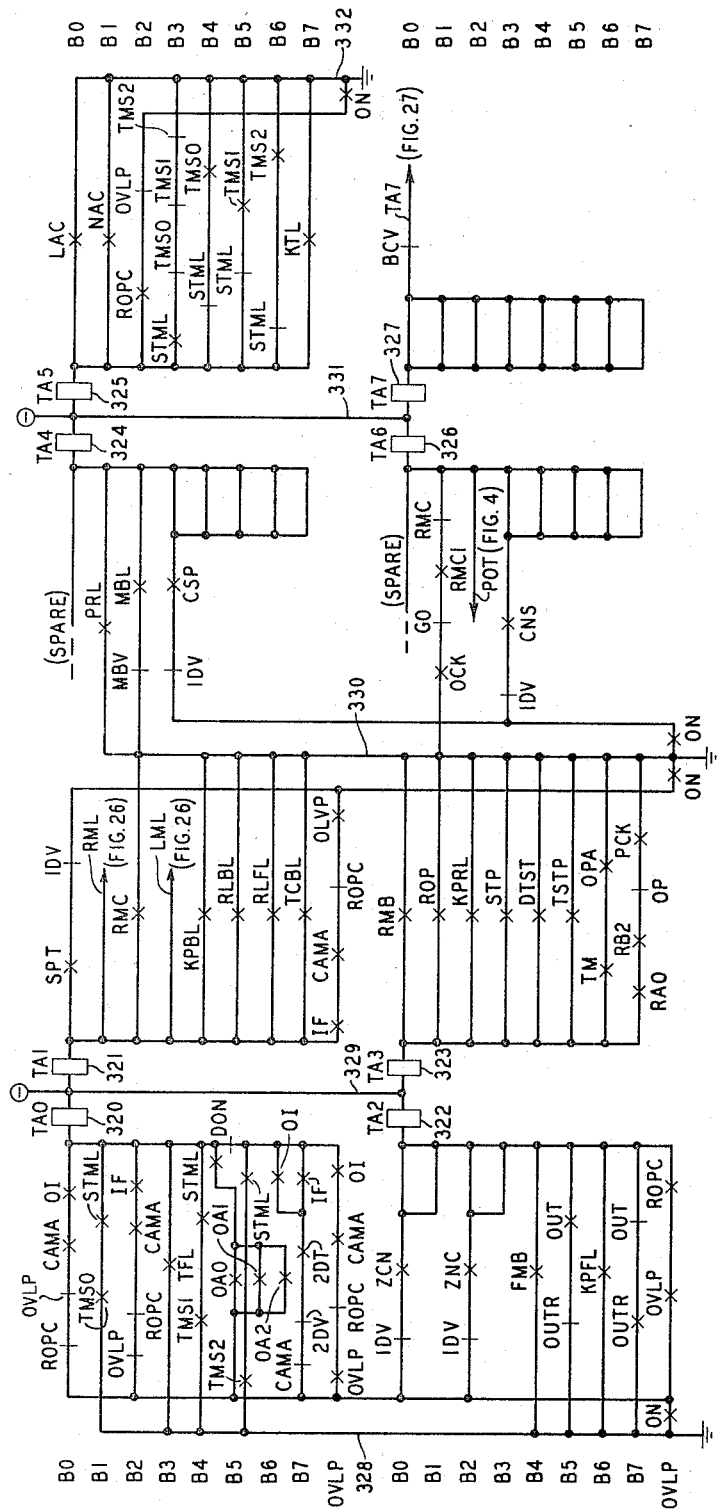

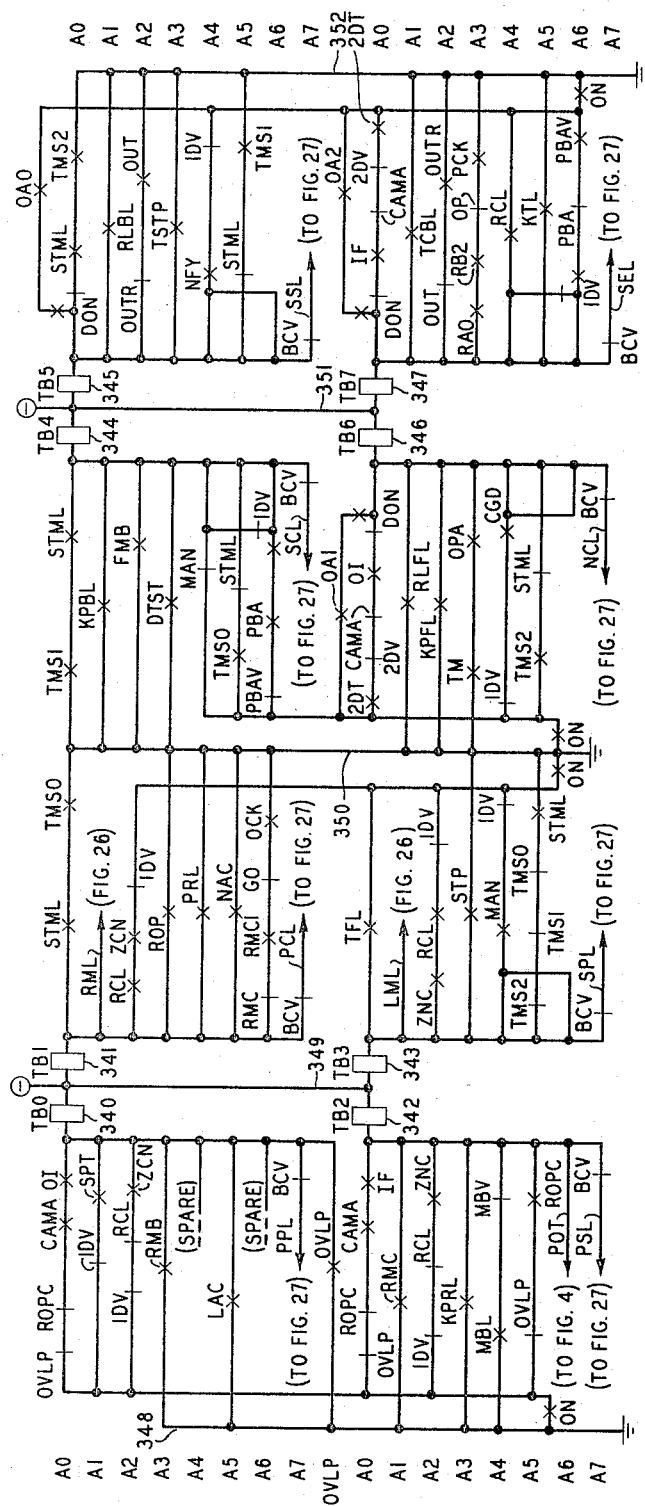
FIG. 11 SECOND DIGIT ENCODER-CONTROL SIGNALING CIRCUIT 19

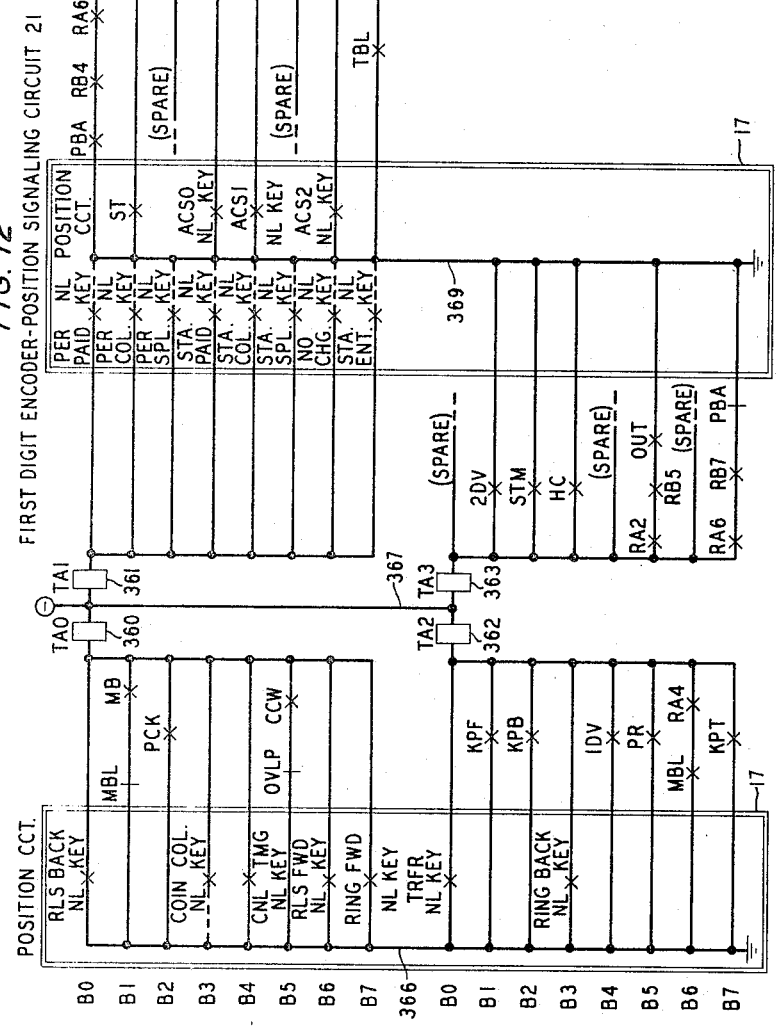

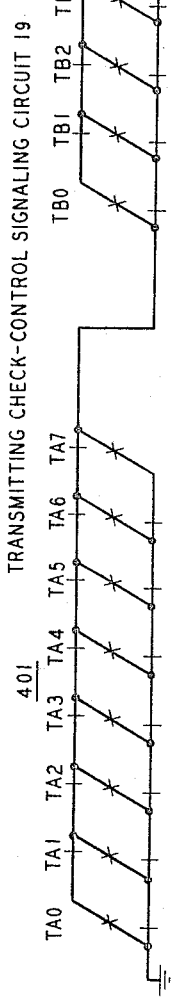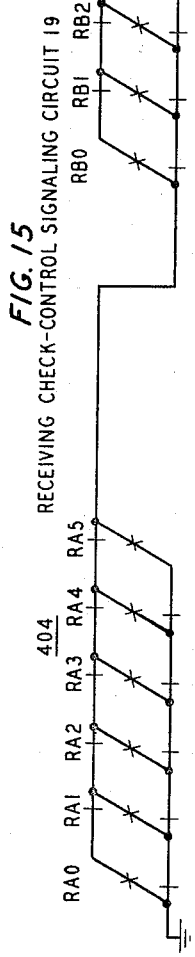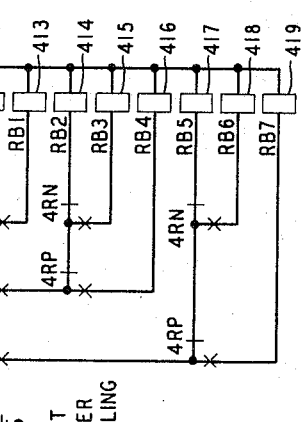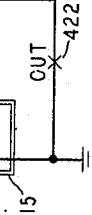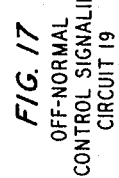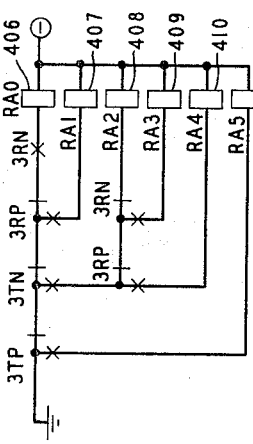

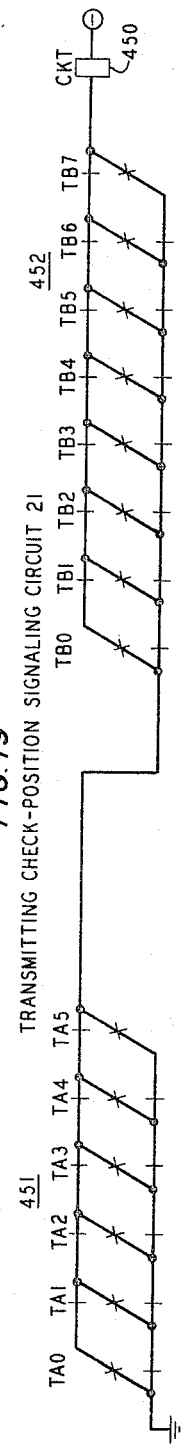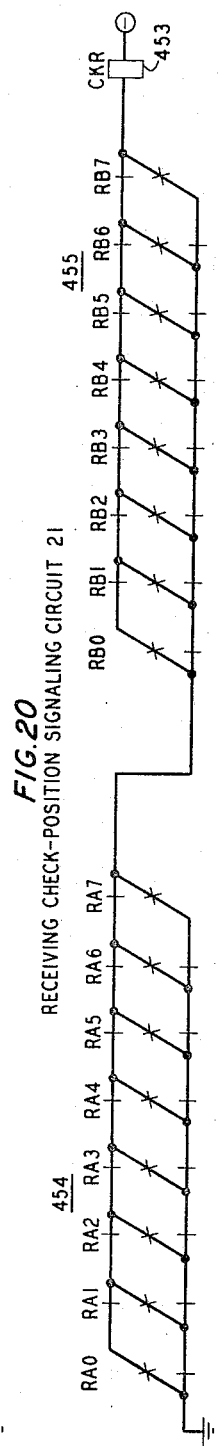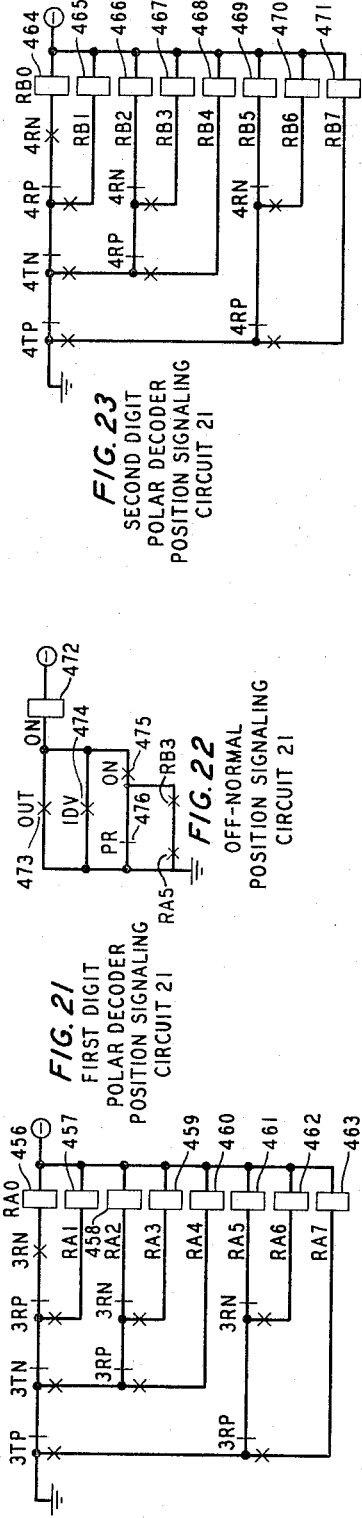

May 2, 1967 J. J. CHUDKOSKY ET AL 3,317,677
REMOTE OPERATOR'S POSITION SIGNALING SYSTEM
Filed Nov. 26, 1963 47 Sheets-Sheet 14

CONTROL SIGNALING CIRCUIT 19
CLASS OF CALL LAMPS
TRANSMIT CONTROL

CONTROL SIGNALING CIRCUIT 19

May 2, 1967

J. J. CHUDKOSKY ET AL 3,317,677

REMOTE OPERATOR'S POSITION SIGNALING SYSTEM

Filed Nov. 26, 1963

BILLING CLASS REGISTRATION
CONTROL SIGNALING CIRCUIT 19

CONTROL SIGNALING CIRCUIT 19

May 2, 1967 J. J. CHUDKOSKY ET AL 3,317,677
REMOTE OPERATOR'S POSITION SIGNALING SYSTEM
Filed Nov. 26, 1963 47 Sheets-Sheet 19

POSITION SIGNALING CIRCUIT 21
CLASS OF CALL LAMPS CONTROL

POSITION SIGNALING CIRCUIT 21

May 2, 1967 J. J. CHUDKOSKY ET AL 3,317,677

REMOTE OPERATOR'S POSITION SIGNALING SYSTEM

Filed Nov. 26, 1963 47 Sheets-Sheet 21

POSITION SIGNALING CIRCUIT 21
LAMP VERIFICATION RECEIVE

CONTROL PULSING START RELAY

PREFERENCE RELAYS

CONNECTOR RELAYS

CONTROL PULSING BUSY CIRCUIT

CONTROL PULSING CIRCUIT CONTROL

CONTROL PULSING CONTROL
DIGIT REGISTRATION

DIGIT STEERING-CONTROL PULSING CIRCUIT 22

PULSE GENERATOR

REGISTER CONTROL

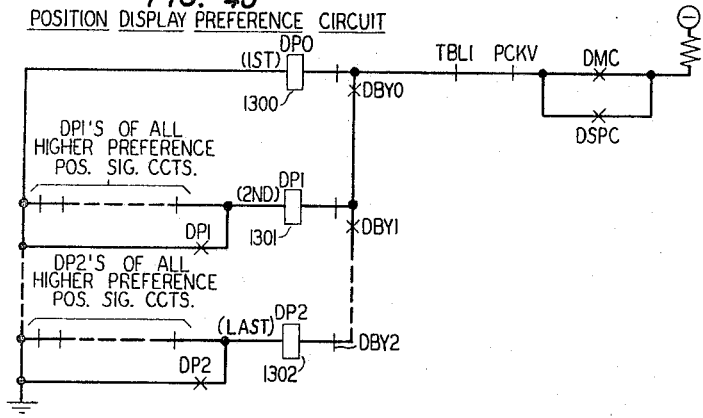
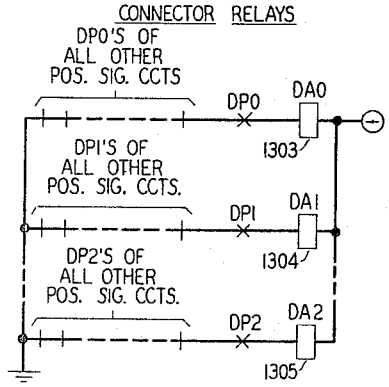
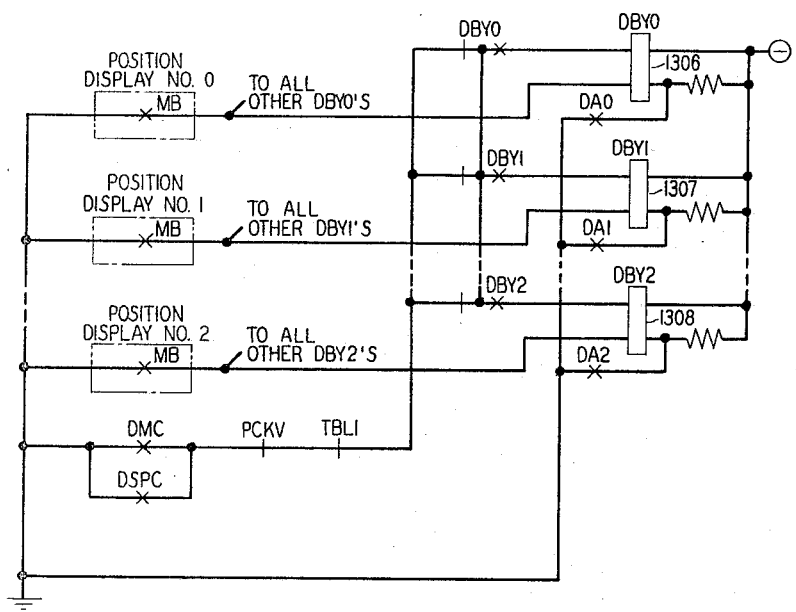

May 2, 1967  J. J. CHUDKOSKY ET AL  3,317,677
REMOTE OPERATOR'S POSITION SIGNALING SYSTEM
Filed Nov. 26, 1963  47 Sheets-Sheet 29

POSITION DISPLAY CONTROL

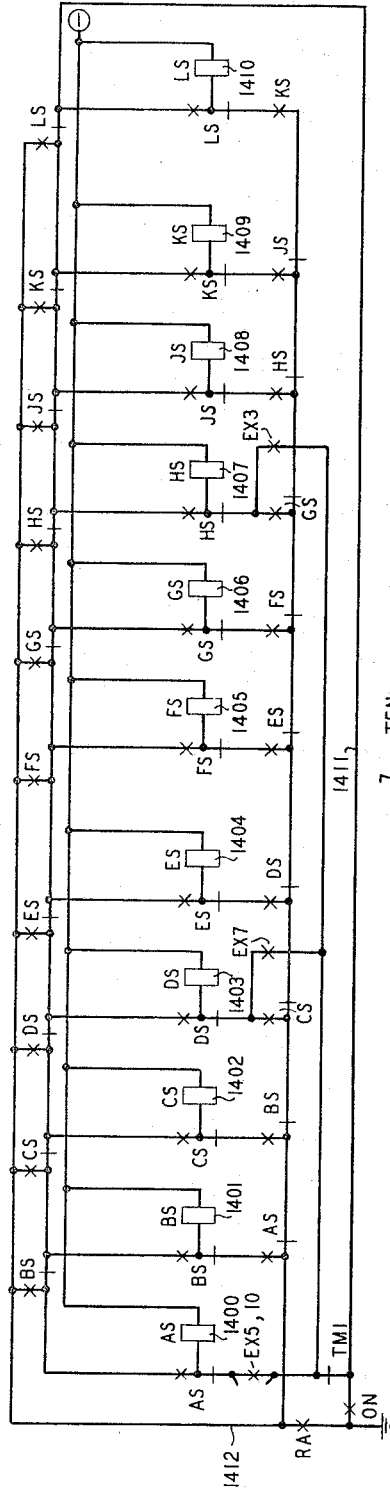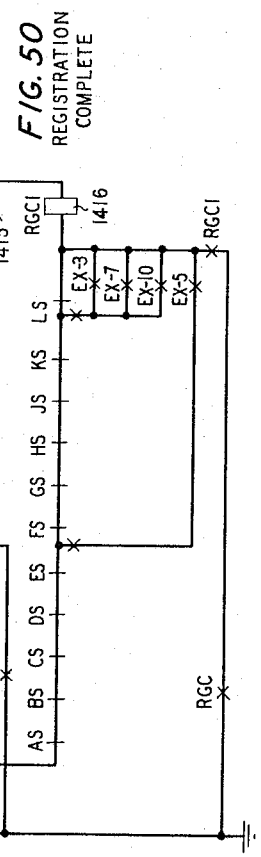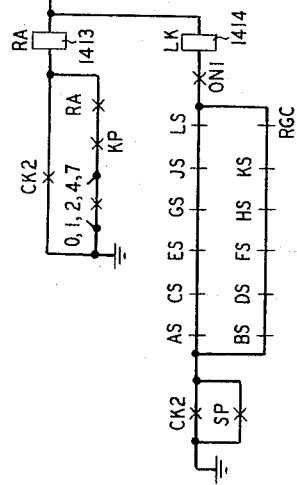

TIMER CONTROL

TIMEOUT CIRCUIT

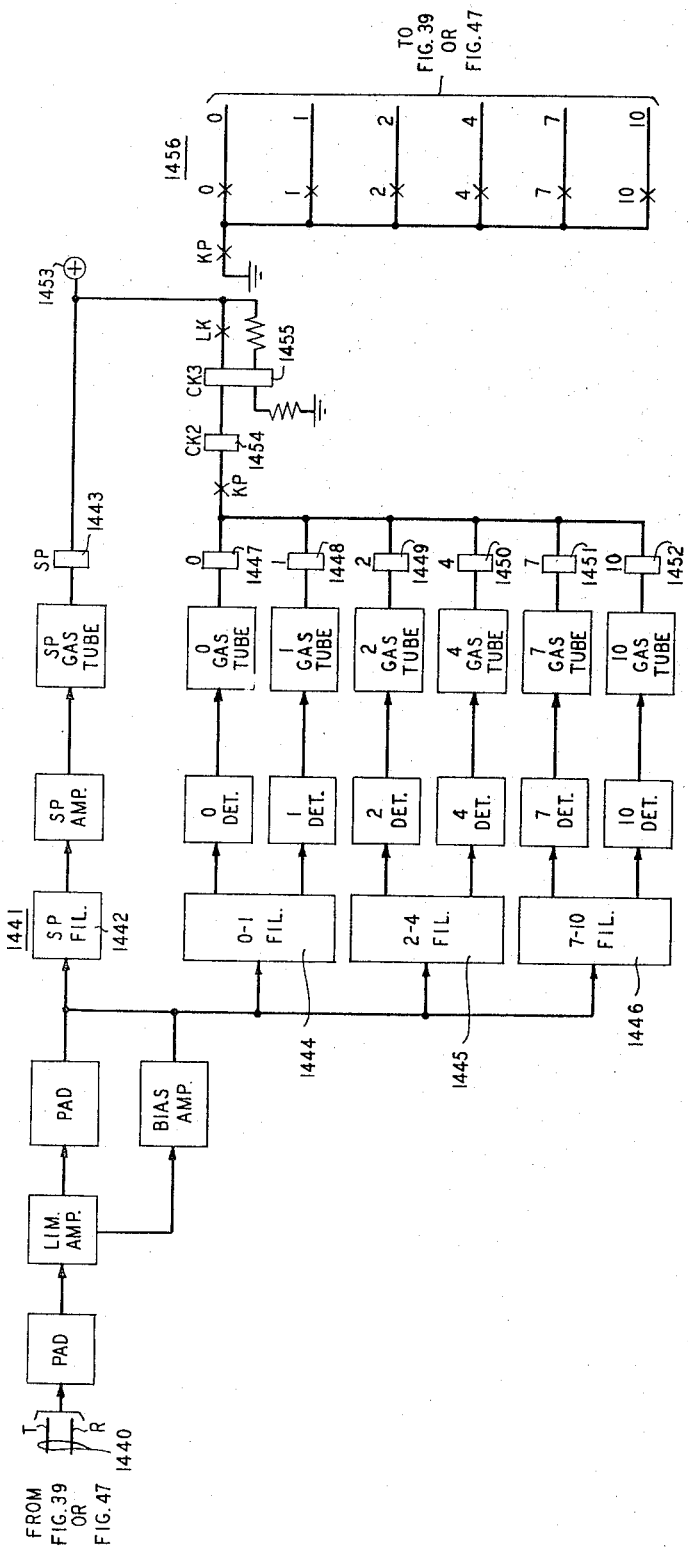

SEQUENCE CHART
NON COIN
CLASS OF CALL
FIRST DIGIT
(NON COIN, CUSTOMER DIALED, PERSON-TO-PERSON)

SEQUENCE CHART
INITIATION OF AUTOMATIC DISPLAY
(MINUTES AND CHARGE)

SEQUENCE CHART
TERMINATION OF
AUTOMATIC DISPLAY
(MINUTES AND CHARGE)

SEQUENCE CHART
INITIAL TAPE
ENTRY

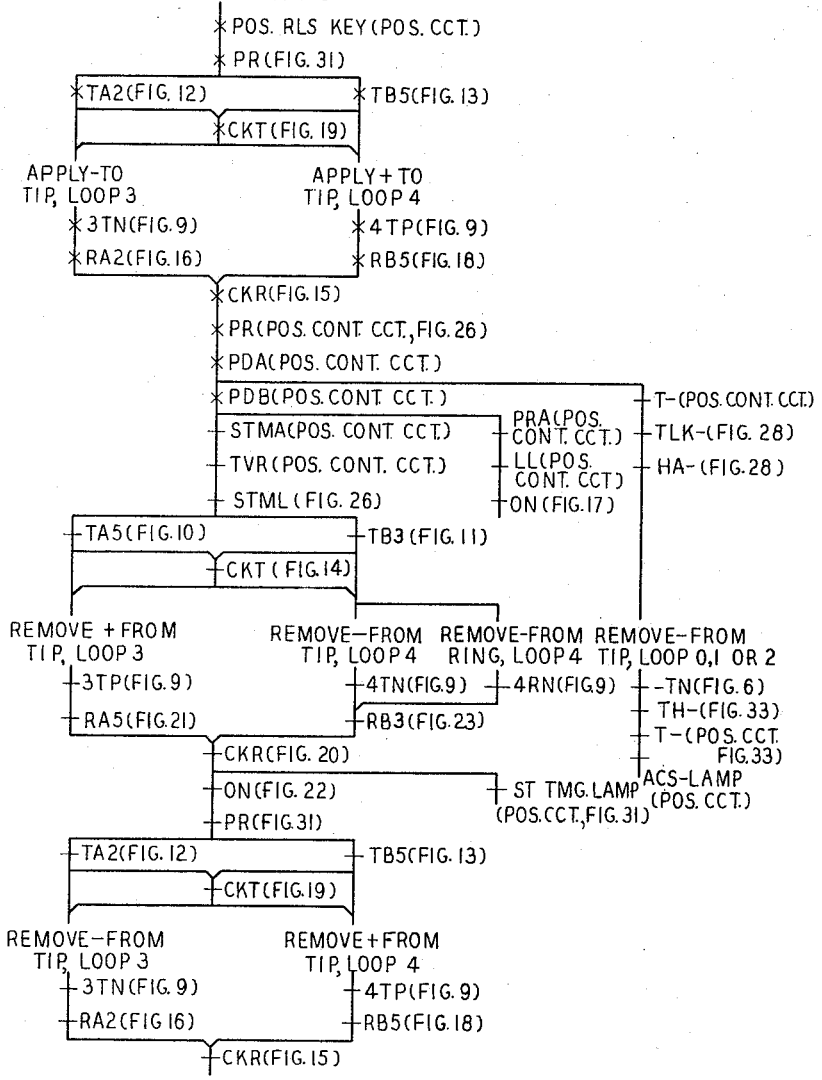

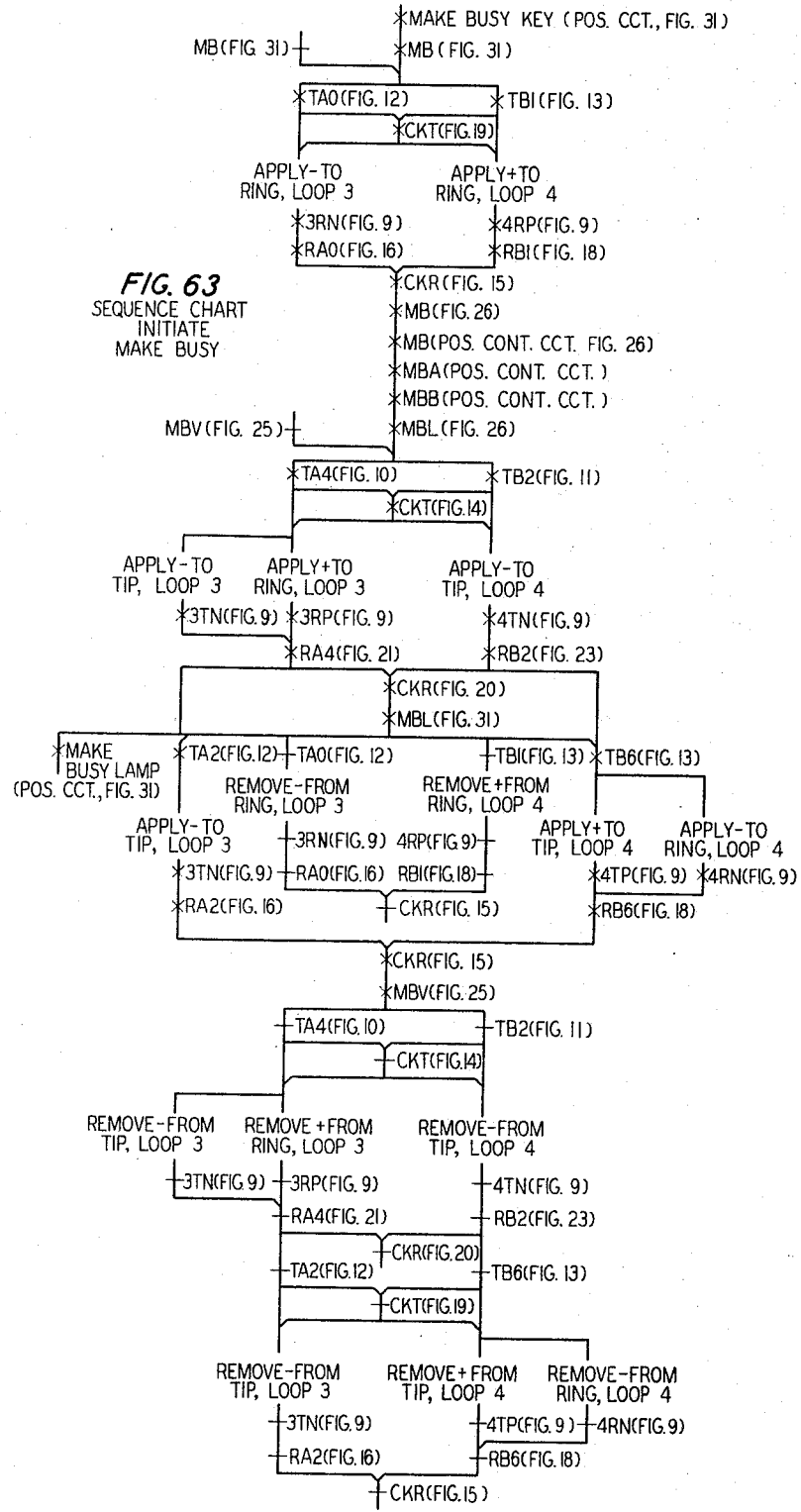

SEQUENCE CHART
RELEASE
MAKE BUSY

SEQUENCE CHART
TERMINATION OF
DISPLAY REQUEST
(SEVEN DIGIT
TERMINATING
NUMBER)

United States Patent Office 3,317,677
Patented May 2, 1967

3,317,677
REMOTE OPERATOR'S POSITION SIGNALING SYSTEM
Joseph J. Chudkosky and Robert C. Nance, Columbus, Ohio, assignors to Bell Telephone Laboratories, Incorporated, New York, N.Y., a corporation of New York
Filed Nov. 26, 1963, Ser. No. 325,890
21 Claims. (Cl. 179—27)

This invention relates to multipurpose signaling systems and, more particularly, to remote control indication and verification circuits in signaling systems between a telephone tandem switching center and a remotely located operator's position.

Tandem telephone switching centers are normally located in areas having a large number of local exchange central offices, but in which the volume of chargeable traffic between the local exchanges is too small to warrant the use of direct trunks between all of these local exchanges. A centrally located tandem switching center is therefore connected by trunks to all of the local exchange offices, and all interexchange traffic is routed through the tandem switching center. Such tandem switching centers must be equipped to handle all types of calls, and preferably include automatic message accounting apparatus. In addition, operator traffic service positions must be provided for those calls requiring operator's assistance.

A tandem switching center such as that described above is often located in the center of a large city where space is at a premium and is not necessarily suitable for operators' positions. In such cases, it becomes desirable to locate the operator's traffic service positions at some distance from the actual tandem switching equipment.

It is an object of the present invention to permit telephone traffic service positions to be located at significant distances from the actual switching equipment which they monitor and control.

The major difficulty in locating the traffic service positions at great distances from the switching center itself is the large amount of information which must be transmitted back and forth between these locations. In the copending application of R. B. Curtis, Ser. No. 325,842, filed Nov. 26, 1963, for example, there is shown a tandem switching center in which almost two hundred separate and independent leads interconnect each traffic service position with the balance of the switching center. Since hundreds of traffic service positions may be required to serve a single tandem switching center, the total number of leads to these positions is so large that any significant separation of the positions and the balance of the switching centers becomes excessively expensive.

It is a more specific object of the present invention to reduce the cost of remote traffic service positions by multiplexing the signal information from and to the positions by multiplexing the signal information from and to the position on a small number of leads.

Since operators handle calls on a one-at-a-time basis, or nearly so, it is clear that all of the information need not be available at one time. Different classes of calls, for example, require different types of information, but almost never at the same time. In addition, some types of information, such as calling and called number displays, require bursts of relatively large amounts of information, but only for brief intervals. Finally, other types of information, such as line supervision, must be monitored more or less continually rather than on a one-at-a-time basis.

It is a further object of the invention to separate information into at least three classes and to provide for each class separate signaling facilities most appropriate to that class of information.

In accordance with the present invention, three types of signaling circuits are provided between a tandem switching center and remote traffic service positions. A first type of information, exemplified by class of call (coin, non-coin, station, special, etc.) and comprising the greatest bulk of the information, is transmitted one datum at a time and automatically when that datum is required by the operator. A two-digit direct current polar duplex signaling circuit with automatic verification and termination is most suitable for signaling this type of information.

A second type of information, exemplified by calling and called line supervision, is transmitted continuously, since a constant awareness of this information is required by the operator in order to perform properly her functions. A separate direct current polar duplex signaling circuit for each talking path to be monitored is most suitable for signaling this type of information.

A third type of information, exemplified by calling and called number displays, must be transmitted very rapidly, but only when requested by the operator. A multifrequency signaling channel, arranged to automatically pulse out this information on demand, is the most suitable signaling circuit for this type of information. In addition, this same signaling channel can be used by the operator to keypulse information to the tandem switching center. Furthermore, since the multifrequency transmitter and receiver are used only for relatively infrequent, brief intervals, a large number of traffic service positions can advantageously share this equipment on an assigned priority basis.

It can be seen that all of the signaling between a tandem switching center and a remote position can, in accordance with the present invention, be concentrated on five signaling trunks. Three of these signaling trunks are equipped with direct current polar duplex signaling circuits for continuous supervision of the second type of information (line supervision of up to three separate loops). The remaining two signaling trunks are also equipped with direct current polar duplex signaling circuits, but arranged to be used together for two-digit parallel signaling, and arranged to signal one datum at a time with automatic verification and termination of each datum code.

The third type of signaling circuit, arranged for multifrequency serial code transmission, can share one of these five signaling trunks since the direct current and alternating current multifrequency signals can be easily separated at the trunk terminations. A four-wire speech circuit can likewise share two others of these five signaling trunks with direct current and speech separation at the signaling trunk terminals.

Thus the present invention provides highly concentrated signaling circuits for transmitting all of the required information from and to a remote traffic service position. Moreover, these signaling circuits are arranged to accommodate each type of signal with signaling apparatus having the speed and availability most suitable to that type of signal.

These and other objects and features, the nature of the present invention and its various advantages, will be more readily understood upon consideration of the attached drawings and the following detailed description of the drawings.

In the drawings:

FIG. 3 is a plan view of a traffic service position keyboard and lamp display suitable for use with the signaling circuits of the present invention;

FIG. 4 is a more detailed circuit diagram of the speech circuits connecting the tandem switching center with the remote operator's position;

FIG. 5 is a more detailed circuit diagram of the multifrequency signaling circuits connecting the tandem switching center with the remote operator's position;

FIGS. 6 through 8 are more detailed circuit diagrams of the polar duplex signaling and control circuits for continuous supervision direct current signaling between the tandem switching center and the remote operator's position;

FIG. 9 is a more detailed circuit diagram of the polar duplex signaling circuits for one-at-a-time direct current signaling between the tandem switching center and the remote operator's position;

FIGS. 10 and 11 are detailed circuit drawings as the coding relays of the Control Signaling Circuit 19 of FIG. 1;

FIGS. 12 and 13 are detailed circuit drawings of the coding relays of the Position Signaling Circuit 21 of FIG. 1;

FIGS. 14 and 15 are circuit diagrams of the transmitting and receiving check circuits, respectively, of the Control Signaling Circuit 19;

Figure 1:
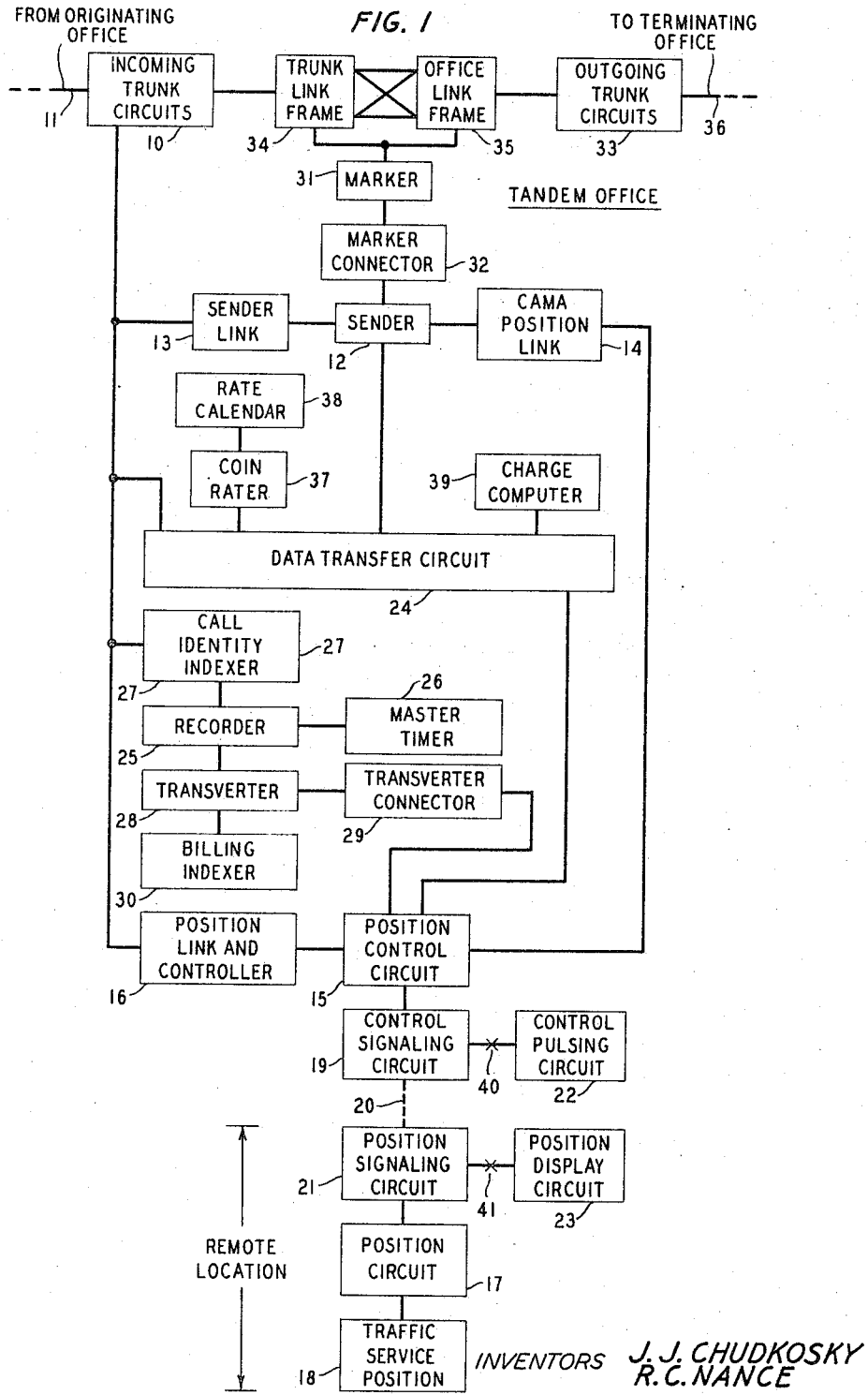
FIG. 1 is a general block diagram of a tandem central office switching center showing the relationship of the remote position signaling circuits of the present invention with respect to the various other units.
Figure 52:
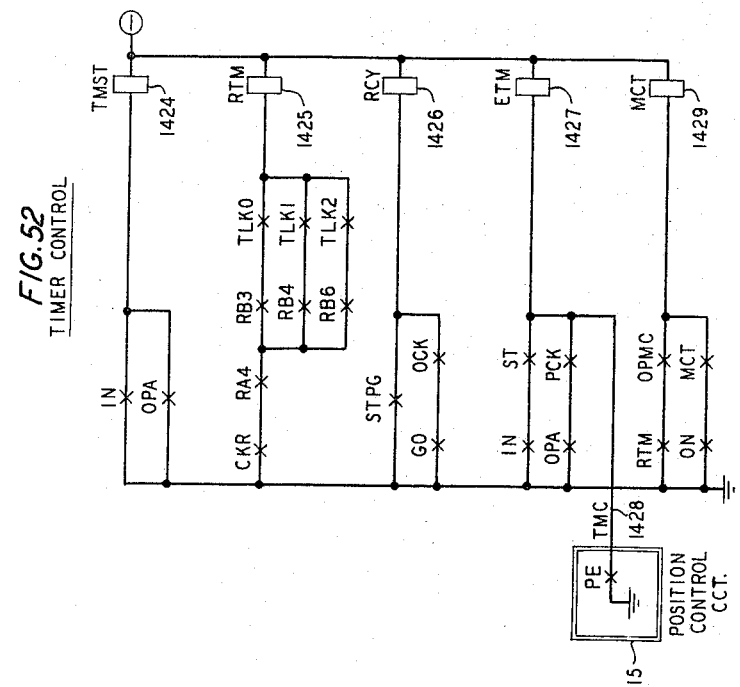
Figure 51:
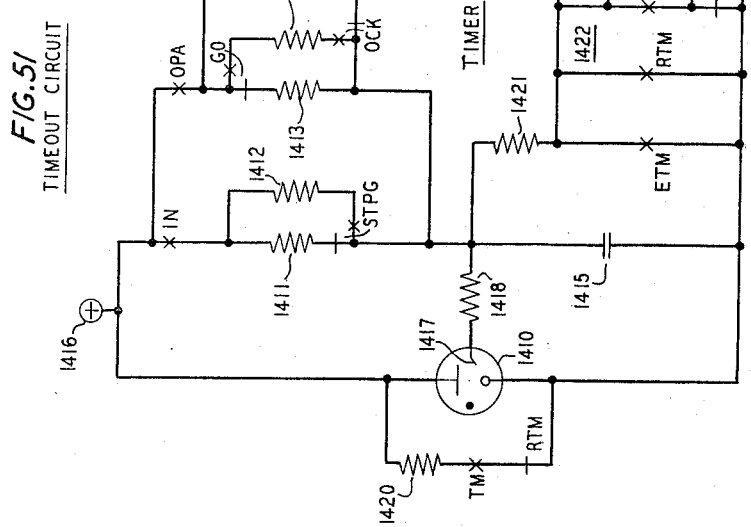

FIGS. 16, 17, and 18 are circuit diagrams of the off-normal and decoding relay circuits of the Control Signaling Circuit 19;

FIGS. 19 and 20 are circuit diagrams of the transmitting and receiving check circuits, respectively, of the Position Signaling Circuit 21;

FIGS. 21, 22 and 23 are circuit diagrams of the off-normal and decoding relay circuits of the Position Signaling Circuit 21;

FIGS. 24 through 28 are circuit diagrams of the transmitting and receiving control relays of the Control Signaling Circuit 19;

FIGS. 29 through 33 are circuit diagrams of the transmitting and receiving control relays of the Position Signaling Circuit 21;

FIGS. 34 through 42 are circuit diagrams of the Control Pulsing Circuit 22 of FIG. 1 and of the associated portions of the Control Signaling Circuit 19;

FIGS. 43 through 48 are circuit diagrams of the Position Display Circuit 23 of FIG. 1 and of the associated portions of the Position Signaling Circuits 21;

FIGS. 51 and 52 are circuit diagrams of a timer circuit and a timer control circuit, respectively, forming part of the Control Signaling Circuit 19;

FIG. 53 is a block diagram of a multifrequency receiver which can be used in both the Control Pulsing Circuit 22 and the Position Display Circuit 23; and FIGS. 54 through 68 are sequence charts helpful in explaining the operation of the circuits of the balance of the drawings.

While the present invention will find use in many central office telephone systems, it will, for the purposes of convenience, be described in connection with the tandem switching center disclosed more fully in the aforementioned copending application of R. B. Curtis.

The following Table of Contents may be of assistance in understanding the following detailed description of the drawings:

TABLE OF CONTENTS

| | Column |
|---|---|
| I. Tandem Switching Center (FIG. 1) | 4 |
| II. Remote Position Signaling, General | 7 |
|    A. Remote Position Signaling Circuits (FIG. 2) | 7 |
|    B. Operator's Keys and Displays (FIG. 3) | 9 |
| III. Loop Circuits to the Remote Position | 12 |
|    A. Speech Circuits (FIG. 4) | 12 |
|    B. Multifrequency Signaling Circuits (FIG. 5) | 13 |
|    C. Direct Current Polar Duplex Signaling Circuits (FIGS. 6-9) | 13 |
| IV. Two-Digit Polar Duplex Signaling Circuits | 18 |
|    A. Coding Relays (FIGS. 10-13) | 18 |
|    B. Decoding, Check and Off Normal Relays (FIGS. 14-23) | 19 |
|    C. Transmitting and Receiving Control, Control Signaling Circuit (FIGS. 24-28) | 21 |
|    D. Transmitting and Receiving Control, Position Signaling Circuit (FIGS. 29-33) | 30 |
|    E. Signaling Codes to Remote Position | 40 |
|    F. Signaling Codes from Remote Position | 42 |
| V. Multifrequency Signaling Circuits | 42 |
|    A. Control Pulsing Circuit | 43 |
|       1. Control Pulsing Seizure (FIGS. 34-37) | 43 |
|       2. Control Pulsing Control (FIGS. 38 and 39) | 45 |
|       3. Control Pulsing Digit Control (FIGS. 40-42) | 49 |
|    B. Position Display Circuits | 50 |
|       1. Position Display Seizure (FIGS. 43-45) | 51 |
|       2. Position Display Control (FIGS. 46-47) | 52 |
|       3. Position Display Digit Control (FIGS. 48-50) | 56 |
|    C. Control Pulsing Time-Out Circuits (FIGS. 51 and 52) | 57 |
|    D. Multifrequency Receiver (FIG. 53) | 59 |
| VI. Sequence Charts | 60 |

Before proceeding with the detailed description of the drawings, it should be first noted that the Curtis tandem switching center is arranged to handle the following types of telephone calls:

CAMA (Central Automatic Message Accounting) calls are calls dialed by the subscriber from a non-coin station and prefixed by the digit "1." They may be either seven digits, for calls within the local dialing area, or ten digits, for calls outside of the local dialing area, and therefore preceded by a three-digit national area code.

These calls are station-to-station calls paid for by the calling party and are normally handled automatically by the switching equipment without the intervention of the operator. However, if the local office is not equipped with ANI (Automatic Number Identification) apparatus, or if the ANI equipment fails, an operator must be called in to secure the calling subscriber's number and keypulse it into the automatic message accounting apparatus.

Special Toll non-coin calls are calls dialed by the customer from a non-coin station and prefixed by the digit "0." They may also be seven or ten digit called numbers. These calls are non-station-to-station calls, or special service calls, such as person-to-person, collect, credit card, charge to a third party, et cetera, and require the intervention of an operator to ascertain the proper billing class. With a lack or failure of ANI equipment, the operator must also secure the calling number.

Coin Class calls are Coin Station calls dialed by the customer from a pay station and prefixed by the digit "1," for station-to-station paid service, or Coin Special Toll calls, customer-dialed from a pay station and prefixed by the digit "0," for special service. They may involve seven or ten digit called numbers and may or may not require operator intervention for obtaining the calling number. In addition to the operator's assistance required for non-coin calls, coin calls also require coin collection or coin return by the operator, notification at the end of the initial period and notification of the charges due when the call goes into overtime. Calculation of the charges are, of course, also necessary.

Dial Zero calls are calls in which the customer dials "0" for operator's assistance in completing a call. In such calls, the operator must complete the call by means of a so-called "delayed call" trunk. Such calls, of course, may involve all of the other functions described above.

I. TANDEM SWITCHING CENTER (FIG. 1)

Referring then to FIG. 1, there is shown a general block diagram of a tandem switching center suitable for handling calls of the type described above and including the signaling arrangements of the present invention. The tandem switching center of FIG. 1 comprises a plurality of Incoming Trunk Circuits 10 from which trunks 11 are extended to all of the local exchanges within the tandem area. In general, each local exchange is serviced by a plurality of trunks 11, and each class of call is received on trunks reserved for that class of call.

When an Incoming Trunk Circuit 10 is seized by an originating office, a bid is made for a Sender 12 by way of Sender Link 13. The Sender Link 13 is essentially a switch for connecting the bidding Trunk Circuit 10 to the selected Sender 12. When the Sender 12 is connected to the Trunk Circuit 10 by way of the Sender Link 13, the originating office pulses the called subscriber's number into the tandem Sender 12. If the originating office is equipped for automatic calling number identification, the calling number is also transmitted to the Sender 12. The prefixed digit "0" or "1" and the particular trunk circuit over which the call is received identify the class of call and the originating office.

On CAMA class calls without automatic calling number identification, a CAMA Position Link 14 is used to connect the Sender 12 to the Position Control Circuit 15. It will be remembered that the only operator assistance required on CAMA class calls is obtaining the calling number. This is done via the CAMA Position Link 14.

On non-CAMA classes of calls, at the same time the Incoming Trunk Circuit 10 bids for a Sender 12; it also bids for an operator's position by way of the Position Link and Controller 16. Position Link and Controller 16 connects a selected Position Control Circuit 15 to the Incoming Trunk Circuit 10 and also serves to regulate the traffic to the various Position Control Circuits to obtain balanced usage. If the tandem switching center of FIG. 1 is equipped for only local traffic service positions, as disclosed in the above-mentioned Curtis application, the Position Circuit 17 and the Traffic Service Position (TSP) 18 are connected directly to the Position Control Circuit 15.

In accordance with the present invention, a Control Signaling Circuit 19 is connected to the Position Control Circuit 15 to accept the multitude of signals from the Position Control Circuit and encode and concentrate this information on only five signaling trunks 20. A Position Signaling Circuit 21 is connected to signaling trunks 20 at the remote location to decode the information on trunks 20 and supply this information to Position Circuit 17. Position Signaling Circuit 21 also encodes and concentrates signals from Position Circuit 17 and transmits them to Control Signaling Circuit 19, where they are decoded and supplied to Position Control Circuit 15, i.e., the signaling trunks 20 are bilateral.

If multifrequency signaling is required on one of the signaling trunks 20, a Control Pulsing Circuit 22 and a Position Display Circuit 23 are seized by the respective Control Signaling and Position Signaling Circuits. The Control Pulsing Circuit 22 and the Position Display Circuit 23 include the multifrequency transmitting and receiving equipment as well as steering and other control circuitry. Due to the relatively high cost of this equipment and the relatively low usage required, a small number of Control Pulsing Circuits 22 and Position Display Circuits 23 are shared by a large number of Traffic Service Positions 18 by way of connector contacts 40 and 41, respectively.

Having seized a Traffic Service Position 18 by way of Position Link and Controller 16, the Position Control Circuit 15 now is connected to the Incoming Trunk Circuit 10 and the tandem Sender 12 by way of the Data Transfer Circuit 24. The Data Transfer Circuit 24 is a universal access, one-at-a-time, multilead interconnection apparatus, and is disclosed in detail in the aforementioned Curtis application.

The Position Control Circuit 15 receives from the Sender 12 and Trunk Circuit 10, via Data Transfer Circuit 24, the calling number, the called number, the class of service, and miscellaneous other information, including whether or not the calling number must be obtained by the operator.

The tandem switching center of FIG. 1 also includes a plurality of Recorders 25 comprising a tape perforator for making automatic records of all calls through the tandem switching center for the ultimate purpose of customer billing. For each call, three entries are made on the tape: An initial entry provides the called and calling numbers, a trunk code number (call identify index) and billing information (message billing index), and is made as soon as this information is available. An answer entry, including the call identity index and the time, is made when the called subscriber answers. Finally, a disconnect entry, again including the call identity index and the time, is made when the connection is terminated. Since the Recorder 25 is common to many trunk circuits, the various entries are collated by means of the call identity indices and the sequence of the three entries.

Master Timer 26 is provided to supply the basic timing information required by Recorder 25. Call Identity Indexer 27 supplies the call identity index for each entry and has continuous access to all of the Incoming Trunks 10.

Initial entries on the tape are made under the control of an operator after the calling number has been obtained. This entry is made via the Transverter 28 which is seized by the Position Control Circuit 15 via the Transverter Connector 29 whenever required. The calling and called numbers are stored in the Position Control Circuit 15 as received from Sender 13. When the required information is obtained by Transverter 28, Billing Indexer 30 is seized to convert this information into codes suitable for the initial tape entry. These codes are recorded in Recorder 25 under the control of Transverter 28 and Call Identity Indexer 27.

While the initial entry is being prepared and made as described above, the Sender 12 seizes a Marker 31 by way of a Marker Connector 32. Marker 31 selects an appropriate Outgoing Trunk Circuit 33 and establishes a connection between the Incoming Trunk Circuit 10 and the selected Outgoing Trunk circuit 33 by way of Trunk Link Frame 34 and Office Link Frame 35. Outgoing Trunk Circuit 33, of course, is connected by way of trunk 36 to the terminating office as specified by the called number.

On coin class calls, it is further necessary to appraise the calling party of the charges for the initial period, monitor the deposit of these charges, notify the calling party of the end of the initial period, and, if the call goes into overtime, the overtime charges.

The Coin Rater 37 is used to determine the rate treatment for the call, i.e., station-to-station, person-to-person, day, evening or night rates, initial period on overtime rates and whether the call is an intrastate or interstate toll call. A Rate Calender 38 supplies the day, evening and night information as well as Sunday and holiday rates. The Coin Rater 37 selects the appropriate rate for the call, which is then transferred to the Position Control Circuit 15 via Data Transfer Circuit 24. The position Control Circuit 15 then seizes an idle Computer 39, also via Data Transfer Circuit 24. Computer 39 computes the initial period charges, including tax, and transfers this information to the Position Control Circuit 15. On coin class calls, this information is automatically relayed to Traffic Service Position 18 for display to the operator.

At the end of the initial period, the Incoming Trunk Circuit 10 is automatically connected to Computer 39 via Data Transfer Circuit 24 to compute the overtime charges. This information is also automatically relayed to the Position Control Circuit 15 and the Traffic Service Position 18 for display. A similar operation takes place when the customer hangs up so that the operator can collect the overtime charges.

As noted above, the entire tandem switching center of FIG. 1, but without remotely located positions, is disclosed in the aforementioned copending application of R. B. Curtis. The details of the remote position signaling circuits, forming the subject matter of the present invention, will now be described.

II. REMOTE POSITION SIGNALING, GENERAL

Before proceeding with a detailed description of the drawings, it will be convenient to first take up a convention which has been followed for all of these drawings. The convention referred to, commonly known as the "detached contact" convention, is based upon the supposition that relay drawings will be easier to follow if the schematic diagrams do not attempt to associate all of the contacts of a relay with the relay structure which actually makes or breaks, i.e., closes or opens, these contacts. This supposition is particularly valid when each relay winding controls a large number of contacts which are specifically related to totally different functions. The convention used herein follows the drawing analysis described by F. T. Meyer in "An Improved Detached-Contact Type of Schematic Circuit Drawing," published in Communications and Electronics, No. 20, pages 505 to 513, September 1955.

In accordance with this convention, a rectangle is used to represent each relay winding. A set of normally open, or make, contacts is shown as two short cross lines through the center of which passes a solid line representing the connecting leads to the set of make contacts. A set of normally closed, or break, contacts is shown by a short line perpendicular to and crossing the solid line which represents the connecting leads to the set of break contacts. A transfer contact, that is, a movable contact moving from one fixed contact to another fixed contact upon the operation of the relay, is shown by two perpendicular lines, one terminating in the other. A make contact is drawn on one of the lines meeting at the intersection; a break contact is drawn on another of the lines meeting at the intersection; and no contact whatever is drawn on the remaining line. In accordance with the convention, the lead with no contact representation thereon is transferred from the lead including the break contact to the lead including the make contact upon actuation of the relay.

Capital letters and numerals or combinations thereof are used to identify each particular relay coil. The same letters and numerals are placed adjacent to each set of contacts which are actuated by the relay coil bearing the corresponding indices. Other circuit elements are shown in the conventional manner.

For ease in reading the drawings, whenever possible, the relays have been shown as being operated from a negative voltage source connected to a bus at the right of the drawing. The winding is normally connected directly to this bus and immediately to the left thereof. The ground necessary to compete a circuit for current flow from this source of potential is shown as a bus at the extreme left of the drawing. The combination of make, break, and transfer contacts which complete the circuit for energization of the relay winding is shown on conductors extending from the relay winding to the ground bus.

A. *Remote Position Signaling Circuits (FIG. 2)*

Figure 2:
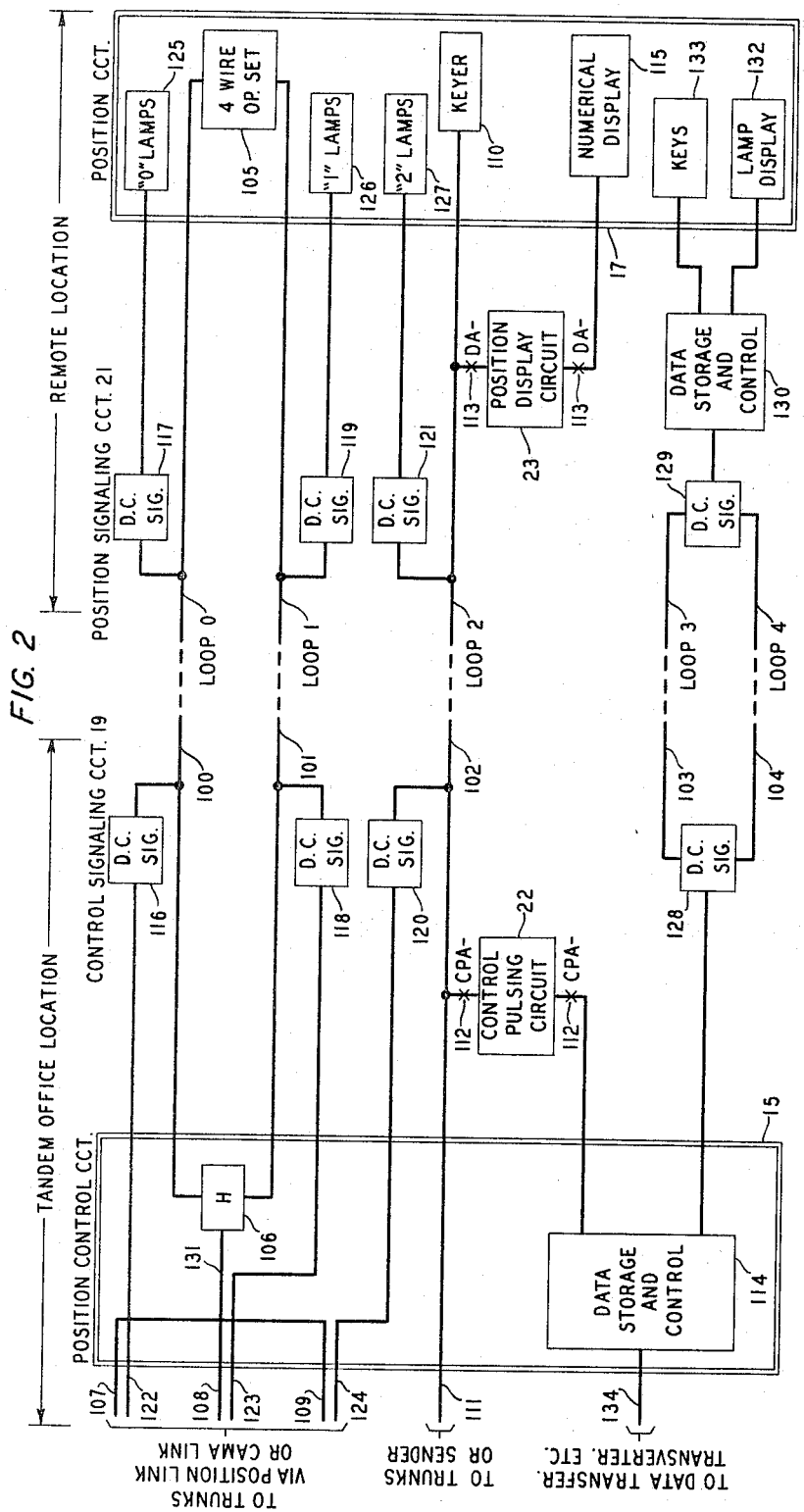
FIG. 2 is a more detailed block diagram of the remote position signaling circuits in accordance with the present invention.

Turning then to FIG. 2, there is shown a general block diagram of a remote position signaling system in accordance with the present invention which includes in more detailed form elements 15, 19, 21, 17, 18, 22, and 23 of FIG. 1. That is, the block diagram of FIG. 2 illustrates in greater detail the remote position signaling system and the connecting circuits which are to be used in combination with a tandem switching center such as that shown in block form in FIG. 1. Since Position Control Circuit 15 and Position Circuit 17 of FIG. 1 are disclosed in detail in the aforementioned copending application of R. B. Curtis, the elements included within these circuits have been enclosed within double-line boxes in the remainder of the present drawings. In order to secure a more detailed description of these portions of the circuits, it is therefore only necessary to refer to the Curtis application, incorporated herein by reference.

As noted above, the Position Control Circuit 15 of FIG. 1 is connected to a Control Signaling Circuit 19, shown in more detail in the left-hand portion of FIG. 2. Similarly, the Position Circuit 17 of FIG. 1 is connected to a Position Signaling Circuit 21, shown in more detail in the right-hand portion of FIG. 2. Connected between the Control Signaling Circuit 19 of FIG. 2 and the Position signaling Circuit 21 are five signaling paths or loops 100, 101, 102, 103, and 104 which form the only interconnections between the tandem switching center location and the remote Traffic Service Position. In accordance with the present invention, all of the signaling which is required between these two locations takes place over these five loops 100 to 104.

Loops 100 and 101 together form a four-wire transmission path for speech signals between the four-wire operator's set 105 in Position Circuit 17 and a hybrid coil 106 in the Position Control Circuit 15. Conductor pair 100 is used for the transmission of speech signals in the direction from Position Circuit 17 to Position Control Circuit 15. Conductor pair 101 is used for the transmission of speech signals in the driection from Position Control Circuit 15 to Position Circuit 17. In accordance with standard practice, hybrid coil 106 combines signals in both directions from and to a two-wire trunk 110 which may be connected by contacts, not shown, to any one of three two-wire loops 107, 108, or 109.

The third two-wire loop 102 between Control Signaling Circuit 19 and Position Signaling Circuit 21 is used for multifrequency key pulse signaling between these two locations. In particular, loop 102 transmits key pulse signals from the operator's key set 110 in Position Circuit 17 to a key pulsing trunk 111, or through connector contacts 112 to Control Pulsing Circuit 22. Loop 102 may also be used for transmitting multifrequency pulses from Control Pulsing Circuit 22 to Position Display Circuit 23 by way of connector contacts 113. Control Pulsing Circuit 22 connects to data storage and control circuits 114 in Position Control Circuit 15 by way of connector contacts 112. Similarly, Position Display Circuit 23 is connected to a numerical display panel 115 in Position Circuit 17 by way of connector contacts 113. Multifrequency pulsing from the operator's key set is, of course, used to control the setting-up of connections through remote switching trains, not shown, in the conventional manner. Multifrequency pulses from Control Pulsing Circuit 22 are received by Position Display Circuit 23 and utilized to control numerical displays on panel 115. These displays provide inforamtion for the operator such as calling number, called number, time, charges, and rate.

Each of loops 100, 101, and 102 is also provided with direct current polar duplex supervisory signaling apparatus for direct current signaling in both directions between Control Signaling Circuit 19 and Position Signaling Circuit 21. Thus loop 100 includes direct current signaling circuits 116 at Control Signal Circuit 19 and direct current signaling circuits 117 at Position Signaling Circuit 21. Similarly, loop 101 is connected to direct current signaling circuits 118 and 119, and loop 102 is connected to direct current signaling circuits 120 and 121. These direct current signaling circuits on loops 100, 101, and 102 are utilized for conventional off-hook supervision of the subscriber lines connected to trunks 107, 108, and 109 by way of sleeve conductors 122, 123, and 124, respectively. The state of these supervisory signals is indicated at Position Circuit 17 by supervisory lamps 125, 126, and 127, respectively. The direct current signaling circuits associated with loops 100, 101, and 102 are also used for continuous direct current supervision of the state of certain relays at Position Signaling Circuit 21, not shown, but which require more or less constant supervision.

The remaining two loops connecting Control Signaling Circuit 19 and Position Signaling Circuit 21, loops 103 and 104, are used exclusively for direct current polar duplex signaling between Position Control Circuit 15 and Position Circuit 17. In particular, loops 103 and 104 are connected to direct current signaling circuits 128 at Control Signaling Circuit 19 and to direct current signaling circuits 129 at Position Signaling Circuit 21. Circuits 128 and 129, together with loops 103 and 104, provide means for transmitting a plurality of signal conditions, one at a time, in both directions between Position Control Circuit 15 and Position Circuit 17. Any particular information, such as class of call information contained in data storage and control circuit 114 at Position Control Circuit 15, can be transferred to data storage and control circuits 130 at Position Signaling Circuit 21. This information is used to control lamp display 132 in Position Circuit 17. Simultaneously, loops 103 and 104 provide signal paths for transmitting signal conditions, such as the position of operator controlled keys 133 at Position Circuit 17, to data storage and control circuit 114. Data storage and control circuit 114, of course, receives information from, and transmits information to, other portions of the tandem switching center of FIG. 1 via control leads 134.

B. *Operator keys and displays (FIG. 3)*

Figure 3:
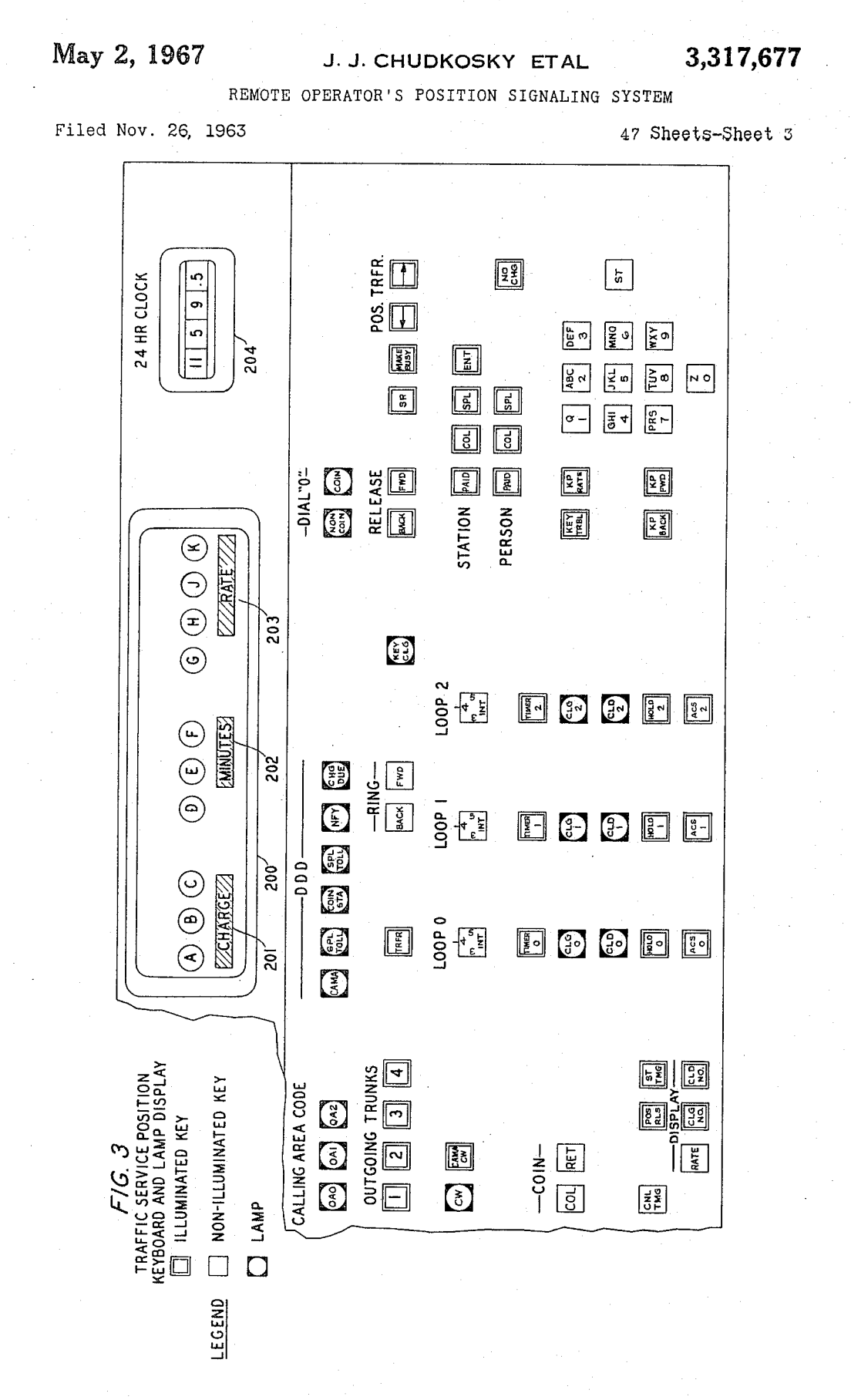

Before proceeding to a detailed description of the circuits of the present invention, it is first convenient to consider the physical layout of the operator's keyboard and lamp display shown in plan view in FIG. 3. The keyboard and lamp display of FIG. 3 provides the operator with displays of all the information required to supervise all types of calls coming to the operator's position and provides all of the keys necessary for the operator to control the connection and all of the ancillary equipment required for supervision and billing.

At the top of the keyboard of FIG. 3 is a numerical display panel 200 having a display capacity of ten decimal digits identified in FIG. 3 by the letters A through K. "Nixie" tubes such as those manufactured by the Burroughs Corporation are suitable for these decimal displays. These digits are divided into three groups, the first two including three digits each and the third group including four digits. When being used for calling and called number displays, the first three digits represent the national area code; the second three digits represent the office code; and the last four digits represent the individual subscriber's line number.

Located below these numerical displays are found three illuminable identification panels 201, 202, and 203. These identification panels have the indicia "CHARGE," "MINUTES" and "RATE" inscribed thereon. These indicia, however, do not become visible until illuminated by appropriate lamps. The first three digits (A, B, C) are used to display the charges due on coin class calls in dollars and cents when such a display is necessary. The fifth and sixth digits (E, F) represent in minutes the initial period, or the overtime elapsed on coin class calls. The MINUTES display always appears at the same time as the CHARGE display. The eighth, ninth, and tenth digits (H, J, K) represent the rate code for the particular call in progress. This rate code appears only when requested by the operator and only when charges must be computed manually. Such manual computations are necessary when Coin Rater 37 in FIG. 1 has not been programmed to determine this rate.

Immediately to the right of the numerical display panel there is a twenty-four hour clock 204. Clock 204 is used to display the current time in tenths of a minute for the use of the operator in timing calls, making tickets, et cetera.

At the upper left corner of the main portion of the key and lamp panel of FIG. 3 there are three display lamps identified as CALLING AREA CODE lamps. In areas where the tandem office switching center is utilized to serve local offices in more than one national area code location, one of these lamps will light to identify the appropriate originating area when originating number displays are requested.

Immediately below the CALLING AREA CODE lamps there are four OUTGOING TRUNKS illuminated keys. When the operator wishes to secure a connection from the operator position to a particular type of outgoing trunk, the appropriate one of these keys is depressed. When the connection has been secured, the key is illuminated.

Immediately to the right of the CALLING AREA CODE lamps there are six Class of Call lamps labeled DDD (Direct Distance Dialing). These lamps, when lit, identify the particular class of call currently being handled by the operator position. These classes include CAMA (Central Automatic Message Accounting), Special Toll (non-coin), Coin Station, Special Toll (coin), Notify and Charges Due.

The first two of these lamps refer to customer-dialed non-coin class calls preceded by the digit "1" (CAMA) or by the digit "0" (SPL TOLL). The balance of these lamps refer to customer-dialed coin class calls preceded by the digit "1" (COIN STA), calls preceded by the digit "0" (SPL TOLL), requests to notify a coin subscriber at the end of the initial period (NFY), and requests to inform the coin subscriber of the charges due at the end of overtime (CHG DUE).

To the right of the DDD lamps are two lamps for DIAL "0" class calls, coin and non-coin, respectively. All of the coin class lamps, in the DIAL "0" display and in the DDD display, are colored red so that they may be easily distinguished from the non-coin class lamps.

Below the OUTGOING TRUNKS keys are a Call Waiting (CW) lamp and a CAMA Call Waiting (CAMA CW) illuminated key. The Call Waiting lamp lights whenever calls requiring operator service have been identified at the Position Link and Controller 16 (FIG. 1), but have not yet received operator service. The CAMA Call Waiting lamp is lit whenever the CAMA Position Link 14 (FIG. 1) has identified CAMA calls requiring service and not yet connected to an operator position.

In connection with CAMA class calls, it should be recalled that the only operator function required on this class of call is the obtaining of a calling subscriber's number when automatic number identification (ANI) equipment does not exist or has failed. Since this operator function requires only a brief interval and a small amount of the position circuitry, the Traffic Service Position 18 is arranged to handle this class of calls on an overlap basis. That is, while the operator is holding another call between operator functions, the CAMA CW key may be depressed to automatically hold the call in progress, allow the operator to obtain the calling number from a different subscriber, and key this number into the CAMA equipment.

Immediately below the Call Waiting lamps and key are Coin Collect (COIN COL) and Coin Return (COIN RET) keys to be used by the operator for the collection and return of coins on coin class calls.

Immediately below the coin control keys are a Cancel Timing (CNL TMG) key, an illuminated Position Release (POS RLS) key and an illuminated Start Timing (ST TMG) key. The Start Timing key is depressed to cause the initial tape entry at Recorder 25 in FIG. 1 and its lamp is lit when this function has been successfully completed. The Cancel Timing key is used to cause a tape entry indicating that a previous initial entry is to be disregarded. In this way, any errors made in the initial entry may be corrected. The Position Release key is used to release the position from calls such as delayed trunk calls after the operator has been assured that the parties have been successfully connected together.

Immediately below these keys are DISPLAY control keys to control the special displays on numerical display panel 200. Whenever the operator so desires, she can depress the Calling Number (CLG NO) or Called Number (CLD NO) key and secure the corresponding display on panel 200.

Immediately below the DDD class lamps there is an illuminated Transfer (TRFR) key used to transfer a particular call to a cord board in those instances when the operator position is not equipped to handle the call (e.g., conference, marine, mobile service). This key becomes illuminated when the transfer is successfully completed.

To the right of the Transfer key are RING signal control keys for ringing back (RING BACK), on a delayed call connection to the calling subscriber, or ringing forward (RING FWD), on the delayed call connection to the called subscriber.

To the right of the RING keys is a Key Calling lamp (KEY CLG) which is illuminated whenever it is required that the operator secure the calling subscriber's number and key it into the tandem office equipment, i.e., ANI failure or no ANI equipment.

Centrally located on the panel of FIG. 3 are three columns of keys and lamps. Each column is identical to the others and each column is used to monitor and control one of the three loops 107, 108, and 109 (FIG. 2) to which the operator may be connected. At the top of each column is a rotatable selector switch by means of which the operator may select a three, four or five minute initial interval on coin class calls received on that loop.

Below the interval selector is an illuminated Timer key which controls a local timer associated with that loop and is used for timing overtime intervals on coin class calls received on that loop.

Below the timer keys are Calling (CLG-) and Called (CLD-) subscriber line supervisory lamps which are illuminated when a connected subscriber is off-hook and are out when the connected subscriber is on-hook.

Below the line supervisory lamps is an illuminated HOLD key which may be depressed to hold the connection of that loop to the Position Control Circuit 15, but which allows the operator to perform other functions on other loops during the hold interval. The HOLD key is illuminated whenever the loop is in the hold condition.

Below the HOLD key is an illuminated Access (ACS-) key which, when depressed, gives the operator access to that particular loop. The Access key can be used to secure access to a loop in the hold condition, or to initiate a bid for a delayed call trunk on that loop. The Access lamp is lit whenever the associated loop is connected to the operator position and that loop is not in a hold condition. The Access lamp will flash if all delayed call trunks are busy.

Immediately below the DIAL "0" supervisory lamps are illuminated Connection Release keys. On operator-originated delayed trunk calls, the Release Back (RELEASE BACK) key is used to release the connection to the originating subscriber and is illuminated when this release is completed. The Release Forward (RELEASE FWD) key is similarly used to release the connection to the terminating subscriber after, for example, the wrong subscriber has been rung.

Immediately to the right of the Release keys there are a Supervisor Request (SR) key, a MAKE BUSY key and Position Transfer (POS TRFR) left and right keys. The SR key is depressed whenever the operator wishes to talk to the supervisor at the supervisor's console at the remote location. This key flashes whenever the supervisor has initiated a request for this connection.

The MAKE BUSY key is used by the operator to mark this position as busy at the associated Position Control Circuit and thus prevent the access of any traffic to this position while the operator is performing other duties. The MAKE BUSY key is illuminated when the make busy function has been successfully completed.

The POS TRFR keys are used to transfer the operator's telephone circuit to the immediately adjacent operator position to the right or to the left of this position. This allows the operator to complete Notify, quote Time and Charges, or Collect Coins on calls held at recently vacated adjacent positions.

Below the release key is a bank of eight Billing Class keys. The billing classes are divided into station-to-station classes and person-to-person classes. These billing classes are PAID, where the calling subscriber is billed for the call, Collect (COL), where the called subscriber is billed for the call, and Special (SPL) where the call is charged to a credit card, to a third party or some other special type of billing. Included in the station-to-station group is an Enterprise (ENT) billing class used for called party bulk billing. Also included in the Billing Class keys is a No Charge (NO CHG) key which is used to prevent the automatic billing equipment from charging the subscriber for calls to wrong numbers, et cetera. Each of the Billing Class keys is illuminated when the appropriate billing class has been registered at the Position Control Circuit 15.

Immediately below the Billing Class keys are a set of four Key Pulse control keys for Key Pulse Trouble (KP TRBL), Key Pulse Rate (KP RATE), Key Pulse Back (KP BACK), and Key Pulse Forward (KP FWD), ten standard digit keys (0–9) and a Start (ST) key. The KP BACK and KP FWD keys are used to set up connections to the appropriate senders in the forward and backward direction. The KP TRBL key is depressed when the operator wishes to key a particular trouble code to trouble recording equipment. The KP RATE key is depressed when the operator wishes to key a manually determined rate to the charge computer. The ST key, of course, is depressed after keying the calling or called numbers by means of the digit keys.

III. LOOP CIRCUITS TO THE REMOTE POSITION

A. *Speech Circuits (FIG. 4)*

In FIG. 4, there is shown a detailed circuit drawing of the speech portion of loops 100 and 101, shown in block form in FIG. 2. As noted in conection with FIG. 2, loops 100 and 101 form the transmitting and receiving paths for speech signals between the Position Circuit 17 and the Position Control Circuit 15.

The polar duplex signaling circuits 116 and 117 are connected to loop 100 by way of balancing transformers 205 and 206, respectively. Similarly, polar duplex signaling circuits 118 and 119 are connected to loop 101 by way of balancing transformers 207 and 208. Transformers 205 to 208 are wound so as to eliminate voice currents in the direct current signaling circuits by balancing these currents in the two windings.

Capacitors 209 and 210 isolate the speech circuits in Position Control Circuit 15 from the direct current signals on loop 100 while Capacitors 211 and 212 isolate the speech circuits in Position Circuit 17 from these direct currents. Similarly, capacitors 213, 214, 215 and 216 serve to isolate the speech circuits from the direct currents on loop 101.

The balance of the speech circuits in Position Control Circuit 15 and Position Circuit 17 are identical to those disclosed in the aforementioned copending application of R. B. Curtis and will not be described in detail. It will be noted, however, that, at Position Circuit 17, the insertion of the operator's headset 105 into jacks 217 and 218 closes contacts 219 and 220 to complete the operate path for Position Occupied (PO) relay 221. When operated, PO relay 221 closes make contacts 222 to complete an operate path for Position Occupied (PO) relay 223 in Position Signaling Circuit 21. PO relay 223 initiates the transmission of signals to Position Control Circuit 15 to mark this position as now available for accepting calls.

In Position Control Circuit 15, contacts 224 or 225 apply a ground to Position Occupied-Transfer (POT) lead 226 which initiates the transmission of a signal to Position Control Circuit 21. This signal causes the simultaneous closing of make contacts 227 on CKR relay 453 (FIG. 20), make contacts 228 on RA6 relay 462 (FIG. 21) and make contacts 229 on RB2 relay 466 (FIG. 23), as will be hereinafter described. The closing of contacts 227, 228 and 229 also causes PO relay 221 to operate. Contacts 224 or 225 close whenever one of the intermediately adjacent operators depresses the appropriate Position Transfer key at her position. In this way, the adjacent position can be used even when no operator is present at that position.

B. *Multifrequency Signaling Circuits (FIG. 5)*

In FIG. 5 there is shown a detailed circuit drawing of the multifrequency signaling paths connected to loop 102. Like loops 100 and 101, loop 102 has connected thereto polar duplex signaling circuits 120 and 121, isolated from speech currents by balancing transformers 230 and 231, respectively. The multifrequency signaling paths are isolated from direct current signaling voltages by capacitors 232 and 233, at Control Signaling Circuit 19, and by capacitors 234 and 235, at Position Signaling Circuit 21.

Multifrequency key pulses originating at the operator's keyset 110 in Position Circuit 17 are transmitted on loop 102 to Position Control Circuit 15, or, by way of one of Control Pulsing connectors 40, 40' or 40", to Control Pulsing Circuit 22, 22' or 22". Similarly, multifrequency key pulse information from one of Control Pulsing Circuits 22, 22' or 22" is transmitted, via loop 202 and one of Position Display connectors 41, 41' or 41", to one of Position Display Circuits 23, 23' or 23".

The Control Pulsing Circuits 22, 22' and 22" are shared in common with a large number of Control Signaling Circuits similar to Control Signaling Circuit 19 of FIG. 5. Similarly, the Position Display Circuits 23, 23' and 23" are shared in common with a large number of Position Signaling Circuits similar to Position Signaling Circuit 21 of FIG. 5. The Control Pulsing Circuit and Position Display Circuit which are actually connected to the corresponding Control Signaling Circuit and Position Signaling Circuit are selected on a preference basis by preference relays, to be hereinafter described, which, in turn, operate the corresponding connector relays 40, 40' or 40" and 41, 41' or 41". Since the Position Display Circuit and the Control Pulsing Circuit are used only for brief intervals, a small number of Control Pulsing Circuits and Position Display Circuits are normally sufficient to handle all of the traffic of this type from a large number of Position Circuits similar to Position Circuit 17 and from a large number of Position Control Circuits similar to Position Control Circuit 15.

Position Display Circuits 23, 23' and 23" are normally connected directly to loop 102. Break contacts 236 and 237 on STPG relay 1335 (FIG. 46) operate to disconnect loop 102 from multifrequency key pulser 110 when multifrequency signals are being received on loop 102.

Similarly, Start Pulsing (STP) contacts 240 and 241 of STP relay 998 (FIG. 28) disconnect Control Pulsing Circuits 22, 22' and 22" from loop 102 only when it is necessary to key pulse directly to Position Control Circuit 15 from the operator's keyset 110 in Position Circuit 17.

C. *Direct Current Polar Duplex Signaling Circuits (FIGS. 6–9)*

In FIG. 6 there is shown a detailed circuit diagram of the direct current polar duplex signaling circuits for loops 100, 101 and 102 (Loops 0, 1 and 2). Since the direct current circuits for these loops are essentially identical, only one has been illustrated in detail in FIG. 6. Thus, in FIG. 6, the Control Signaling Circuit 19 includes two polar relays, -TP relay 250 and -RP relay 251. These relays are connected to the corresponding tip and ring conductors of the associated signaling loops.

Each of relays 250 and 251 has three windings. The first winding is connected directly to the tip or ring conductor. The second winding, which is a compensating winding, is wound in a sense opposite to that of the first winding. The third winding provides a means for applying a direct current bias to each of the polar relays 250 and 251.

Figure 28:
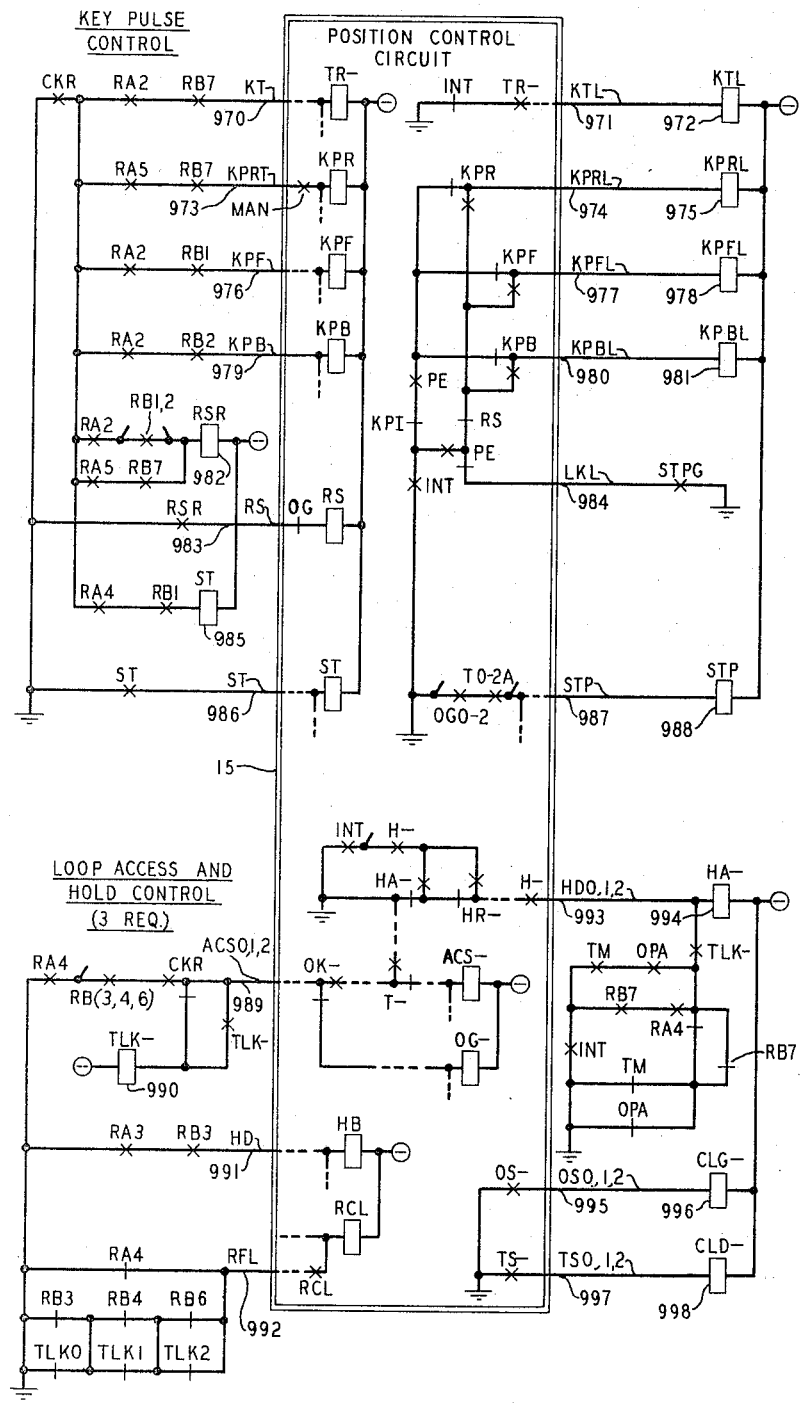

The tip conductor of loops 100, 101, or 102 is arranged to be supplied with positive voltage from source 252, with negative voltage from source 253 or with ground potential by way of coding contacts 297, identified in FIG. 6 as CLG-, CLD- and HA- contacts of corresponding CLG- relay 996 (FIG. 28), CLD- relay 998 (FIG. 28) and HA- relay 994 (FIG. 28). CLG- contacts are the calling line supervisory relay contacts; the CLD- contacts are the called line supervisory relay contacts, and the HA- contacts are hold or access relay contacts to be described in detail hereinafter. At this point it is only necessary to note that, in combination, these contacts and the contacts 298, connected between positive voltage source 255, negative voltage source 254 and ground potential and the ring conductor, encode in polar duplex form the condition of the originating subscriber's line relay, the terminating subscriber's line relay and the hold or access relay for that particular loop.

Similarly, in Position Signaling Circuit 21, there are provided four polar relays: -TP relay 256, -TN relay 257, -RP relay 258, and -RN relay 259. Relays 256 and 257 are connected to the tip conductor of the associated loop and, by way of Q1 transfer contacts, to positive voltage source 260. Polar relays 258 and 259 are similarly connected to the ring conductor of the associated loop and to positive voltage source 261 by way of transfer contacts Q2. Transfer contacts Q1 and Q2 transfer the corresponding tip or ring conductor from ground potential to the positive potential supplied by source 260 or 261. Contacts Q1 and Q2 actually represent contacts on different relays for each of the loops 100, 101 and 102. The following Table I indicates the actual relays which operate the contacts Q1 and Q2 for the various loops.

TABLE I

|  | Q1 | Q2 |
| --- | --- | --- |
| Loop 0 | PO Relay 223 (FIG. 4) | DRT Relay 293 (FIG. 8). |
| Loop 1 | DON Relay 294 (FIG. 8) | DTN Relay 295 (FIG. 8). |
| Loop 2 | FLT Relay 296 (FIG. 8) | STPG Relay 1335 (FIG. 46) |

Like the polar relays at the Control Signaling Circuit end of these loops, polar relays 256 through 259 each have three windings, a main winding connected to the tip or ring conductor, a compensating winding, and a direct current bias winding. The compensating windings in polar relays 256 through 259, similarly to polar relays 250 and 251, are used to balance out direct currents caused by the connection of the corresponding relay to the positive or negative voltage sources 260 and 261, respectively. The third or bias winding is used to compensate for different loop lengths and different loss characteristics of the loops.

The polar duplex signaling circuits shown in FIG. 6 are capable of simultaneously signaling by direct current voltages in both directions. As noted above, the polar relays at each end are prevented from operating from the local voltage supplies due to the compensating winding on these relays. Voltages from the remote end of the signaling loop, however, are not so compensated and hence do operate the appropriate relays.

Relays 256 through 259 at Position Signaling Circuit 21 are each responsive only to a single polarity of voltage on the signaling loop. Thus, -TP relay 256 will operate only when the tip conductor of the associated loop is positive. The -TN relay 257 will operate only when the tip conductor of the associated loop is negative; -RP relay 258 will operate only when the ring conductor of the associated loop is positive; and -RN relay 259 will operate only when the ring conductor of the associated loop is negative.

Using the permutations of positive, negative and ground potentials on each of the tip and ring conductors of the signaling loops 100, 101, 102, it is possible to establish eight distinct signaling conditions on each of loops 100, 101, and 102, in addition to the all ground condition. The combination of CLG-, CLD-, and HA- contacts 297 and 298 to establish seven of these eight signaling conditions is shown in the following Table II. In the table, an X indicates that the relay identified at the top of that column is operated. Where an X does not appear, the relay is unoperated. The combination of operated and unoperated relays provides the noted voltage conditions on the tip and ring conductors. Table II also shows those relays in FIG. 8, to be discussed hereafter, which are operated by the combinations of operations of relays 256 through 259.

TABLE II

[Loops 0, 1, 2]

| HA- | CLG- | CLD- | TIP | RING | OPERATE (FIG. 8) |
|-----|------|------|-----|------|------------------|
|     |      |      | Gnd | Gnd  | None |
| X   |      |      | Gnd | −    | TH- |
|     |      | X    | Gnd | +    | TS- |
| X   |      | X    | −   | +    | TH-, TS- |
| X   | X    | X    | −   | +    | OS-, TH-, TS- |
|     | X    |      | +   | Gnd  | OS- |
| X   | X    |      | +   | −    | OS-, TH- |
|     | X    | X    | +   | +    | OS-, TS- |

Since it is necessary to send only six separate signaling conditions from the Position Signaling Circuit 21 to the Control Signaling Circuit 19, means have been provided to connect only positive voltage sources 260 and 261 to the ring and tip conductors of the associated signaling loops at the position signaling end. For the same reason, only two polar relays 250 and 251 are required for each loop at Control Signaling Circuit 19 to detect these signaling conditions.

Finally, it will be noted that each of voltage sources 252, 253, 254, 255, 260 and 261 is connected to the corresponding tip or ring conductor by way of make contacts on Position Occupied (PO) relay 270 (FIG. 7) or PO relay 223 (FIG. 4) and by way of ballast lamps. The PO contacts insure that the signaling circuits will be operative only when the corresponding position is occupied as described in connection with FIG. 4. The ballast lamps, of course, prevent fast voltage transients from appearing on the tip and ring conductors which might cause interference with speech or multifrequency signaling currents.

In FIG. 7 there are shown the relay circuits responsive to the operation of polar relays 250 and 251. Thus, in FIG. 7, Position Occupied (PO) relay 270 is operated by 0TP contacts 271 when the relay corresponding to relay 250 in loop 100 is operated. Similarly, Display Rate (DRT) relay 272 is operated by 0RP contacts 273 which are, in turn, operated by a relay corresponding to relay 251 in loop 100. Display Originating Number (DON) relay 274 is operated by 1TP contacts 275 which, in turn, are operated by a relay corresponding to relay 250 connected to the tip conductor of loop 101. Display Terminating Number (DTN) relay 276 is operated by 1RP contacts 277 which, in turn, are operated by a relay corresponding to relay 251 but connected to the ring conductor of loop 101. Similarly, a ground is provided on Frame Line Transfer (FLT) conductor 278 by 2TP contacts 279 which, in turn, are operated by a relay corresponding to relay 250 connected to the tip conductor of loop 102. Conductor 278 carries a frame line transfer indication to be used for testing purposes. Finally, GO relay 280 is operated by 2RP contacts 281 which, in turn, are operated by a relay corresponding to relay 251 but connected to the ring conductor of signaling loop 102.

Relays 270, 272, 274 and 276, in turn, operate make contacts 282, 283, 284 and 285, respectively, to provide ground indications on corresponding leads to Position Control Circuit 15. These grounds operate control relays, as shown, in Position Control Circuit 15 which initiate appropriate functions.

In FIG. 8 there is shown a portion of the control relay circuitry at the position signaling end of the signaling loops 100, 101, and 102. In the left-hand portion of FIG. 8, three relays, Originating Supervision (OS-) relay 290, Talk/Hold (TH-) relay 291 and Terminating Supervision (TS-) relay 292, are operated for each loop by combinations of contacts on relays corresponding to relays 256 through 259. The particular relays operated by these contacts are shown in the above Table II. As hereinbefore noted, these relays repeat the calling and called line supervision as well as the hold and access indications at the Control Signaling Circuit 19. Relays 290, 291 and 292 are used, as hereinafter described, to light lamps at the Position Circuit 17 to indicate the appropriate supervisory states.

Also shown in FIG. 8 is a portion of the Position Circuit 17, including four of the operator-controlled keys. The DISPLAY RATE key, shown in plan view in FIG. 3, provides a ground to operate DRT relay 293. DRT relay 293 operates contacts corresponding to contacts Q2 connecting the ring conductor of loop 100 to positive voltage source 261. This ultimately results in the operation of relay 272 in FIG. 7.

Similarly, the operation of the DISPLAY CLG NO. key shown in FIG. 3 operates ON relay 294 which applies a positive voltage to the tip conductor of signaling loop 101. The operation of the DISPLAY CLD NO. key shown in plan view in FIG. 3 operates DTN relay 295 which applies a positive voltage to the ring conductor of loop 101. Finally, the position test contacts in Position Circuit 17 operate FLT relay 296, which applies positive voltage to the tip conductor of loop 102.

Figure 46:
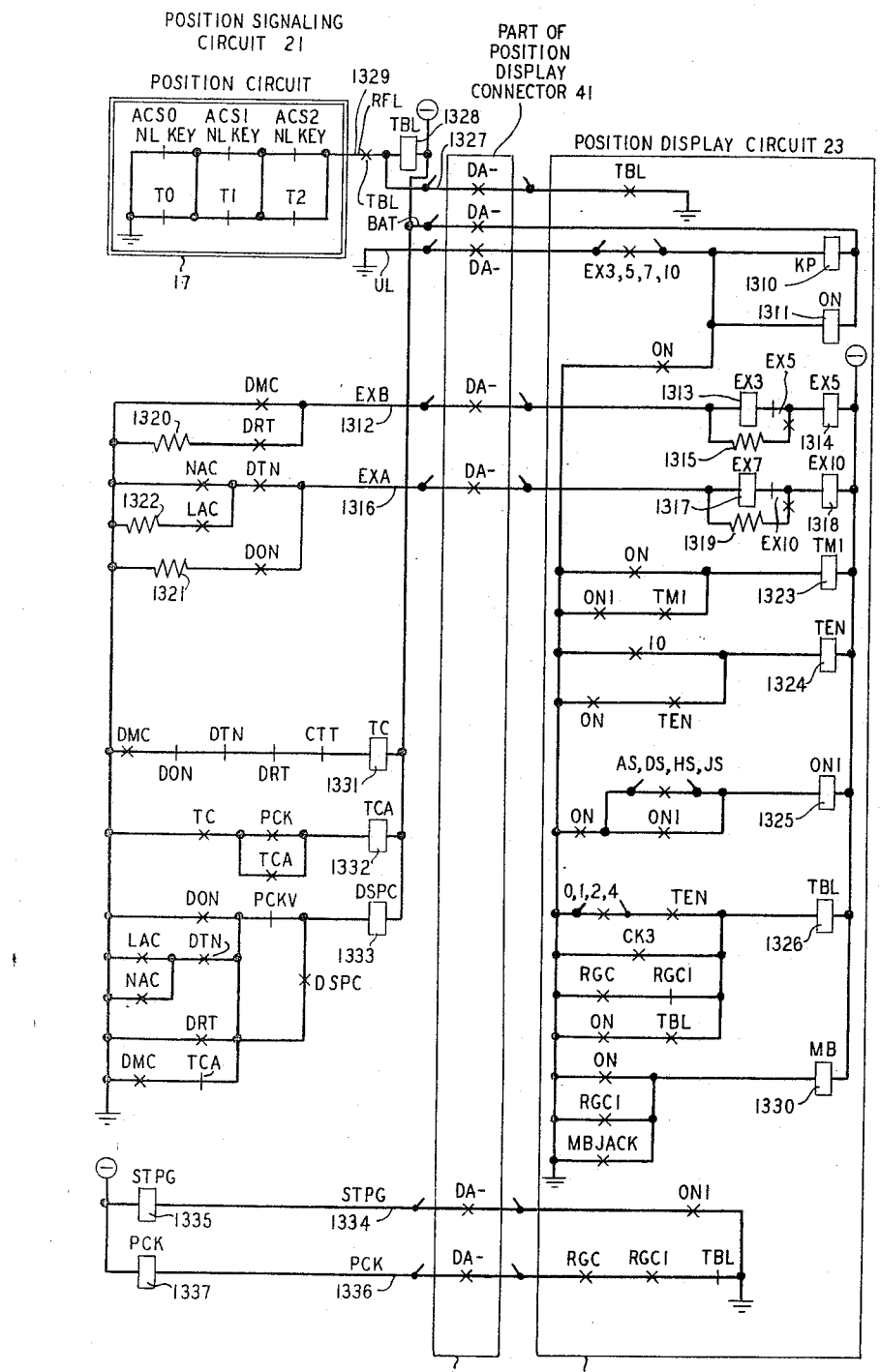

The two remaining signaling conditions applied at Position Signaling Circuit 21 to loops 100 and 102 are supplied from the Position Occupied (PO) relay 223, shown in detail in FIG. 4, and from the Start Pulsing (STPG) relay 1335, shown in detail in FIG. 46.

It can be seen that the signaling circuits of FIG. 6 provide for eight separate and distinct signaling conditions to be signaled on each of loops 100, 101 and 102 (twenty-four altogether) from Control Signaling Circuit 19 to Position Signaling Circuit 21. These loops also provide for the signaling of six separate and disinct signaling conditions (two per loop) from Position Signaling Circuit 21 to Control Signaling Circuit 19. Moreover, these signals can be transmitted simultaneously in both directions.

It will also be noted that, while the direct current signaling takes place on loops 100, 101 and 102, speech currents are also transmitted via loops 100 and 101 and multifrequency pulse signals are transmitted on loop 102. Thus, all three of these loops are used for both direct current signaling and for alternating current speech or multifrequency signals.

In FIG. 9 there is shown the direct current polar duplex signaling circuits used on loops 103 and 104 (loops 3 and 4). At Control Signaling Circuit 19, 3TN polar relay 300, responsive to negative signals on the tip conductor of loop 103, and 3TP polar relay 301, responsive to positive signals on the tip conductor of loop 103, are in series with the tip conductor of loop 103. Similarly, connected in series with the ring conductor of loop 103 at Control Signaling Circuit 19, there are 3RN polar relay 3022 and 3RP polar relay 303, responsive to negative and positive voltages, respectively, on the ring conductor of loop 103.

Similarly, 4TN polar relay 304 and 4TP polar relay 305 are connected in series with the tip conductor of signaling loop 104 and 4RN polar relay 306 and 4RP polar relay 307 are connected in series with the ring conductor of signaling loop 104. Relays 304 and 306 are responsive to negative voltages on the tip and ring conductors, respectively, of loop 104, while relays 305 and 307 are responsive to positive voltages on the tip and ring conductors, respectively, of loop 104.

At Position Signaling Circuit 21, 3TP polar relay 308 and 3TN polar relay 309 are connected in series with the tip conductor of signaling loop 103 and are responsive to positive and negative voltages, respectively, on this tip conductor. Similarly, 3RP polar relay 310 and 3RN polar relay 311 are connected in series with the ring conductor of loop 103 and are responsive to positive and negative voltages, respectively, on this ring conductor. Similarly, 4TP polar relay 312 and 4TN polar relay 313 are connected in series with the tip conductor of loop 104 and are likewise responsive to positive and negative voltages, respectively, on this tip conductor, and 4RP polar relay 314 and 4RN polar relay 315 are connected in series with the ring conductor of loop 104 and are responsive to positive or negative voltages, respectively, appearing on this ring conductor.

Like the polar duplex signaling circuits of FIG. 6, the tip and ring conductors of loops 103 and 104 in FIG. 9 are each adapted to be connected through the polar relays 300 through 315 to positive, negative or ground potential by way of matrices of coding contacts. The coding contacts 316 for loop 103 in Control Signaling Circuit 19 are labeled TA0 to TA7, and the coding contacts 317 at Control Signaling Circuit 19 for signaling loop 104 are labeled TB0 to TB7. The TA- and TB- coding relays providing contacts 316 and 317 will be described in detail hereinafter in connection with FIGS. 10 and 11. It should be noted, however, that the TA- relays are used to encode one digit of a two-digit code, and the TB- contacts are used to encode the second digit. Thus it is possible to signal up to eight different signaling conditions on loop 103 and to simultaneously signal up to eight signaling conditions on loop 104. By utilizing these unique signaling conditions in combination, it is possible to signal up to sixty-four separate and unique signalling conditions by means of the two-digit code transmitted on loops 103 and 104.

The coding contacts at Position Signaling Circuit 21 are arranged similarly to those at Control Signaling Circuit 19. Two-digit signaling is also accomplished from the Position Signaling Circuit 21 to the Control Signaling Circuit 19. It will be noted, however, that the first digit of the code has coding contacts 318 labeled TA0 to TA5 rather than zero to eight. Thus, only forty-eight separate and unique signaling conditions are possible from Position Signaling Circuit 21 to Control Signaling Circuit 19. This restriction is not necessary but has been observed in the present embodiment because less than forty-eight signaling conditions are required. If more unique signaling conditions were required, additional coding relays and coding relay contacts could be used.

It will also be noted that the voltage sources of FIG. 9 are connected to the coding matrices 316 through 319 through Position Occupied (PO) make contacts and ballast lamps similar to those of FIG. 6, and for the same reasons.

The first and second digit coding arrangements can be more readily seen from the following Tables III and IV. In Tables III and IV there are shown the voltage conditions on the tip and ring conductors of loops 3 and 4, respectively, when each of the coding relays TA0 to TA7 and TB0 to TB7 are operated. The coding relays at Position Signaling Circuit 21 are identical to those at Control Signaling Circuit 19 except that the TA- coding relays are only six in number and hence the last two code positions of Table III are not required for the signaling at this end.

TABLE III
[Loop 3]

|     | TIP | RING |
|-----|-----|------|
| TA0 | Gnd | −    |
| TA1 | Gnd | +    |
| TA2 | −   | Gnd  |
| TA3 | −   | −    |
| TA4 | −   | +    |
| TA5 | +   | Gnd  |
| TA6 | +   | −    |
| TA7 | +   | +    |

TABLE IV
[Loop 4]

|     | TIP | RING |
|-----|-----|------|
| TB0 | Gnd | −    |
| TB1 | Gnd | +    |
| TB2 | −   | Gnd  |
| TB3 | −   | −    |
| TB4 | −   | +    |
| TB5 | +   | Gnd  |
| TB6 | +   | −    |
| TB7 | +   | +    |

IV. TWO-DIGIT POLAR DUPLEX SIGNALING CIRCUITS

A. Coding Relays (FIGS. 10–13)

In FIG. 10 there is shown a circuit diagram of the operate paths for the eight first digit coding relays 320 through 327 (TA0–TA7) in Control Signaling Circuit 19. As can be seen, each of these relays is operated from a negative voltage bus such as bus 329 or bus 331 to a ground bus such as bus 328, 330 or 332 by means of a plurality of parallel operate paths including various make, break, and transfer contacts. For convenience, the operate paths for each of the coding relays 320 to 327 in FIG. 10 have been divided into horizontal levels labelled B0 to B7. The operate path found on any particular level for each first digit coding relay of FIG. 10 is the mate of a corresponding operate path on a second digit coding relay (TB0–TB7) to be hereinafter described. Relays 320 through 327, of course, provide the make contacts 316 shown in FIG. 9 to selectively connect the tip and ring conductors of loop 103 to positive, negative and ground potentials.

In FIG. 11 there is shown a circuit diagram of the second digit coding relays 340 through 347 (TB0–TB7) for the Control Signaling Circuit 19. The coding relays of FIG. 11 are arranged similarly to those of FIG. 10 and are energized from a negative voltage bus 349 or 351, through a plurality of parallel operate paths, to ground bus 348, 350 or 352. As in FIG. 10, the operate paths are divided into horizontal levels, labelled A0 to A7 to correspond to the mating first digit coding relays shown in FIG. 10. The contacts of relays 340 through 347 are shown in FIG. 9 as contacts 317.

Taking FIGS. 10 and 11 together, it can be seen that the operation of certain combinations of relay contacts causes one of the first digit coding relays 320 through 327 and one of the second digit relays 340 through 347 to operate. The level designations of FIG. 11, of course, denote corresponding TA- relays in FIG. 10 which are simultaneously operated. The actual coding employed in the present invention and implemented in FIGS. 10 and 11 will be hereinafter discussed more fully when an understanding of the significance of the various relay contacts is had. It should be noted, however, that the first digit relays 320–327 selectively apply direct current potentials to loop 103 while second digit relays 340–347 selectively apply direct current potentials to loop 104.

In FIG. 12 there is shown a circuit diagram of the first digit coding relays 360 through 365 (TA0–TA5) corresponding to the relays of FIG. 10 but which are located at the Position Signaling Circuit 21. As before, these relays are operated from negative voltage bus 367 or 368 to ground bus 366, 369 or 370. Also as before, the operate paths connected to the ground bus are separated into horizontal levels labelled B0 to B7 to indicate the corresponding second digit relay for a particular code. The contacts of relays 360–365 are shown at 318 in FIG. 9.

Figure 13:
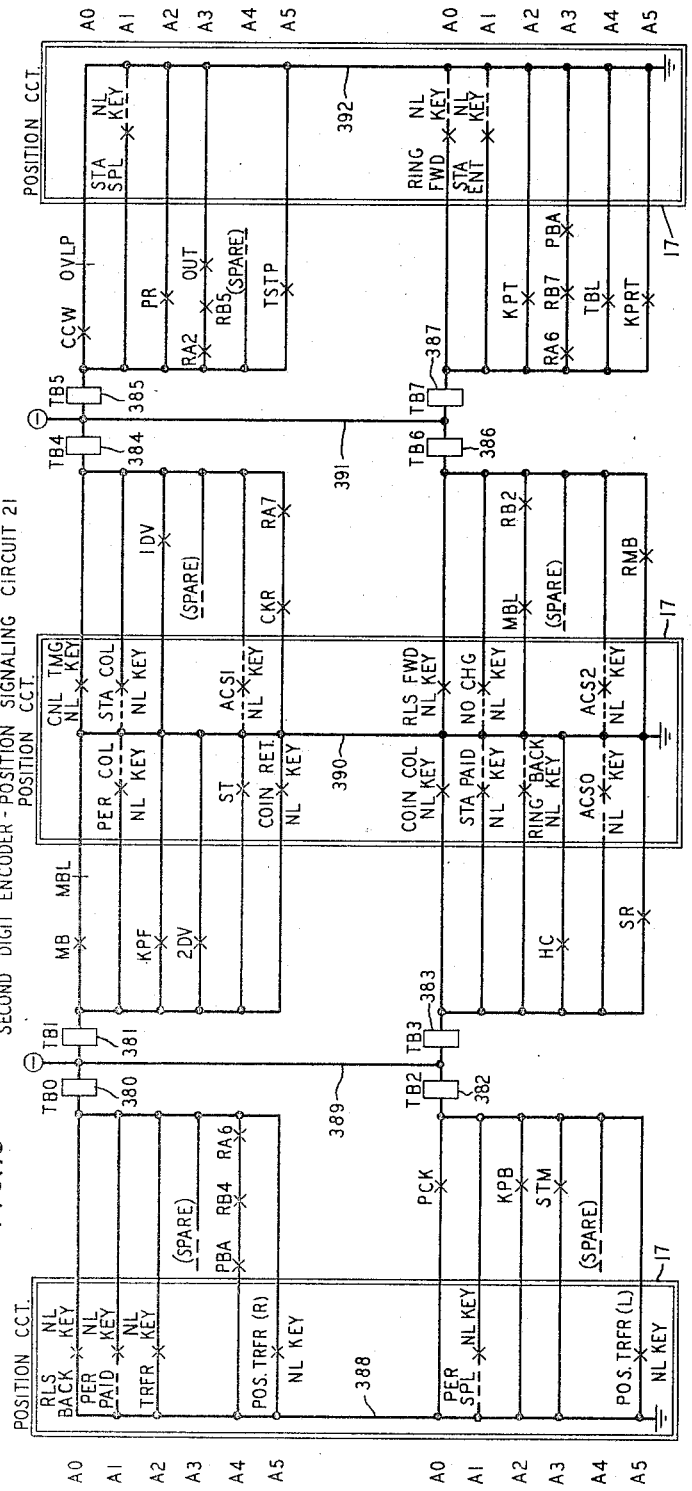

In FIG. 13 there is shown a circuit diagram of the second digit coding relays 380 through 387 (TB0–TB7) which are operated from negative voltage bus 389 or 391 to ground bus 388, 390 or 392 through a plurality of parallel operate paths. These operate paths are divided into horizontal levels labelled A0 through A5 to indicate the corresponding one of the first digit coding relays. The contacts of relays 380–387 are shown at 319 in FIG. 9.

FIGS. 12 and 13, when taken together, permit two-digit encoding of up to forty-eight separate and distinct signal conditions. The particular codes will be taken up in more detail hereinafter, following a discussion of the various relays and keys operating the contacts in the operate paths of the coding relays.

B. Decoding, Check and Off-Normal Relays (FIGS. 14–23)

In FIG. 14 there is shown a circuit diagram of the transmitting check circuit in Control Signaling Circuit 19. In order to insure that one and only one of the first digit coding relays of FIG. 10 and one and only one of the second digit coding relays of FIG. 11 are operated simultaneously, the circuit of FIG. 14 includes contacts of these coding relays arranged such that Transmitting Check (CKT) relay 400 will operate only when this condition prevails. The relay contacts 401, for example, which are operated by the first digit TA- relays of FIG. 10, provide a complete operate path when one and only one of these relays is operated. Similarly, the contacts 402 provide a complete operate path when one and only one of the second digit TB-coding relays of FIG. 11 is operated. Since these two paths are placed in series, relay 400 will operate only when one first digit relay and one second digit relay is operated. CKT relay 400 can also be operated by OVLP make contacts 404 for reasons to be hereinafter described.

Before proceeding to the description of FIG. 15, the first and second digit decoding relays of FIGS. 16 and 18 will be described. In FIG. 16 there are shown six decoding relays 406 to 411 (RA0–RA5) which are operated by combinations of contacts of the polar relays 300 through 303 of FIG. 9. The decoding scheme is arranged, as can be seen from Tables III and IV and the arrangements of the coding and decoding contacts, such that the first digit decoding rely 406 (RA0) operates at Control Signaling Circuit 19 when the corresponding coding relay 360 (TA0, FIG. 12) operates at Position Signaling Circuit 21. Similarly, each of decoding relays 407 through 411 operates when the corresponding one of coding relays 361 through 365 (FIG. 12) operates at the Position Signaling Circuit 21.

Similarly, in FIG. 18 there are shown eight second digit decoding relays 412 through 419 (RB0–RB7) which are operated by combinations of contacts of polar relays 304 through 307 in FIG. 9. The coding scheme is likewise arranged such that each of the second digit decoding relays 412 through 419 (RB0–RB7) operates when the corresponding one of the second digit coding relays 380 through 387 (TB0–TB7, FIG. 13) operates.

Returning then to FIG. 15, there is shown a circuit diagram of a receiving check circuit which insures that one and only one first digit and one and only one second digit have been received at the Control Signaling Circuit 19. Relay contacts 404, operated by the first digit decoding relays 406 through 411 (RA0–RA5), provide a complete conduction path when only one of these decoding relays is operated. Similarly, relay contacts 405 are operated by the second digit decoding relays 412 through 419 (RB0–RB7) and provide a complete conduction path when one and only when one of these second digit decoding relays is operated. Thus, the operate path for Receiving Check (CKR) relay 403 is complete only when one first digit and one second digit have been received.

In FIG. 17 there is shown a circuit diagram of the Off-Normal (ON) relay 420 at the Control Signaling Circuit 19. ON relay 420 is operated whenever it is desired to transmit two-digit codes on loops 103 and 104 from Control Signaling Circuit 19 to Position Signaling Circuit 21. On calls coming into the operator position, ON relay 420 is operated by a ground on LL lead 421 from Position Control Circuit 15. On calls originating at the operator position, make contacts 422 on OUT relay 570 (FIG. 25) are closed to operate ON relay 420.

In FIG. 19 there is shown a transmitting check circuit for the two-digit signaling circuits at the Position Signaling Circuit 21. Like the transmitting check circuit of FIG. 14, that of FIG. 19 includes Transmitting Check (CKT) relay 450, having an operate path including contacts 451 of the first digit coding relays 360–365 in FIG. 12 and contacts 452 of the second digit coding relays 380–387 of FIG. 13, arranged such that CKT relay 450 will operate only when one and only one first digit and one and only one second digit are transmitted.

Similarly, in FIG. 20 there is shown a receiving check circuit including a Receiving Check (CKR) relay 453 having an operate path including contacts 454, operated by the first digit decoding relays 456–463 shown in FIG. 21, and contacts 455, operated by the second digit decoding relays 464–471 of FIG. 23. Contacts 454 and 455 are arranged such that CKR relay 453 will operate only when one and only one first digit decoding relay and one and only when one second digit decoding relay are operated.

In FIG. 21 there is shown a circuit diagram of first digit decoding relays 456 through 463 (RA0–RA7) operated by a combination of contacts of the polar relays 308 through 311 in FIG. 9. The signaling system is arranged such that each of first digit decoding relays 456 through 463 operate when the corresponding one of first digit coding relays 320 through 327 (TA0–TA7, FIG. 10) is operated.

In FIG. 23 there are shown the second digit decoding relays 464 through 471 (RB0–RB7) at the Position Signaling Circuit 21. These relays are operated by combinations of contacts of polar relays 312 through 315 in FIG. 9. The signaling system is arranged such that each one of decoding relays 464 through 471 operates at the Position Signaling Circuit 21 whenever the corresponding one of the second digit encoding relays 340 through 347 (FIG. 11) is operated.

Figure 30:
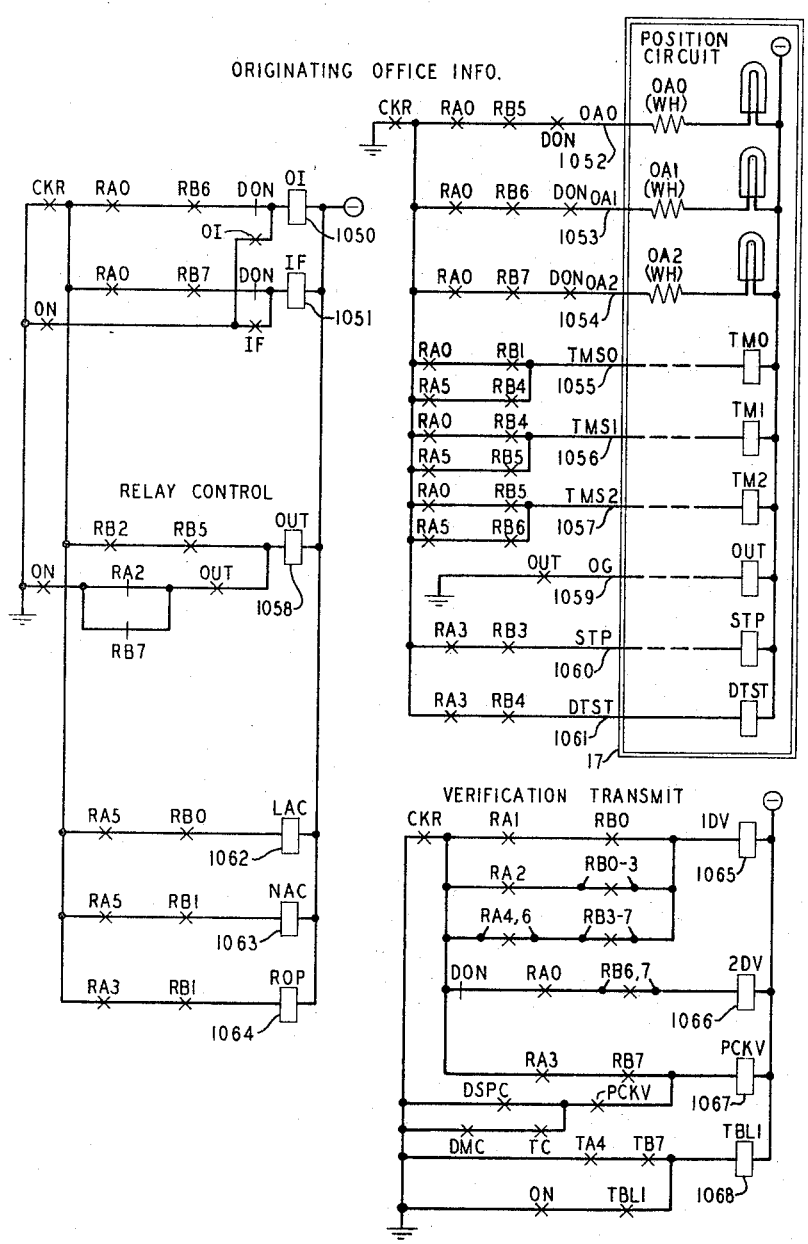
Figure 31:
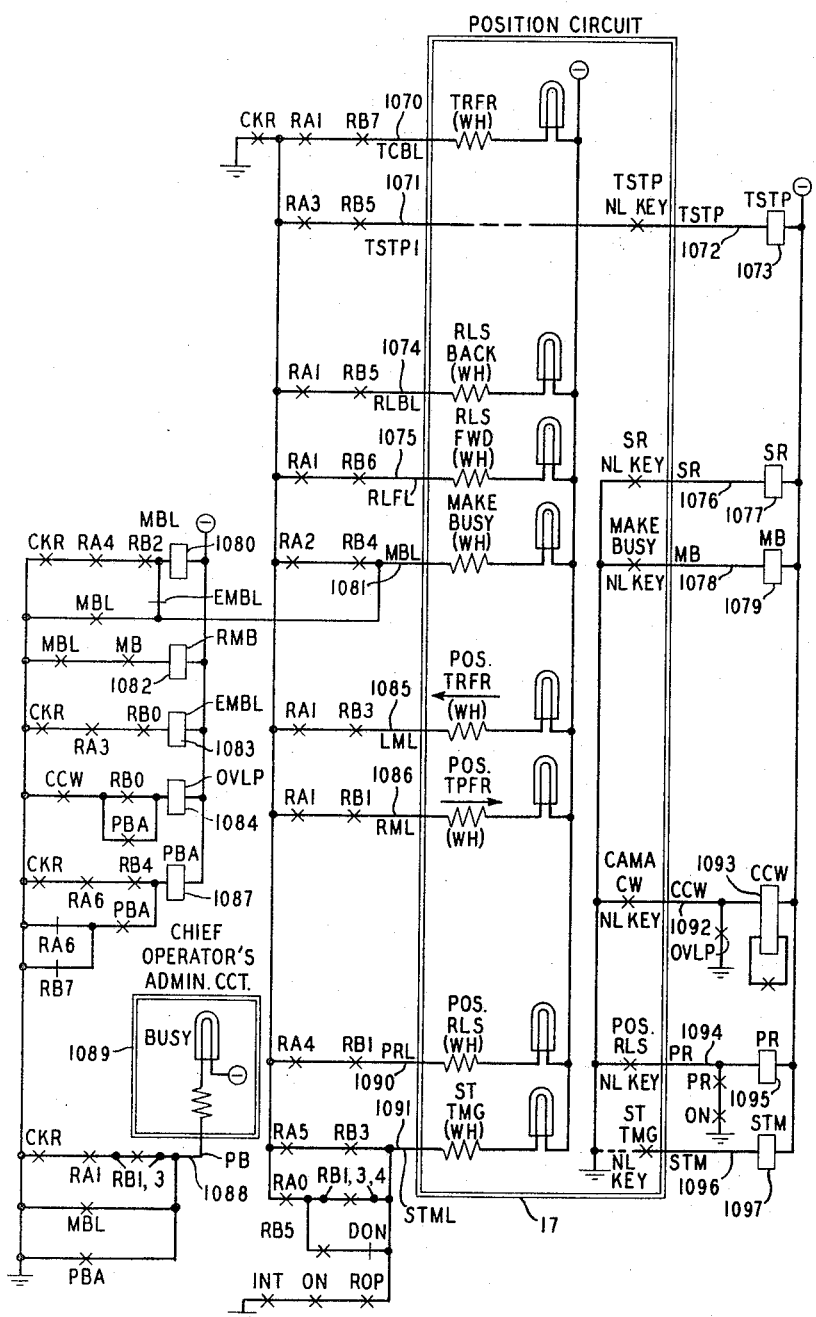

In FIG. 22 there is shown the Off-Normal (ON) relay 472 located at Position Signaling Circuit 21 and used to indicate the off-normal condition of the two-digit signaling circuits at Position Signaling Circuit 21. ON relay 472 is operated on calls originating at the operator's position by make contacts 473 on OUT relay 1058 (FIG. 30). On customer initiated calls routed to the operator position, ON relay 472 is operated by make contacts 473 on 1DV relay 1065 (FIG. 30) upon receipt of the automatically transmitted class of call information from the Position Control Circuit 15. When operated, ON relay 472 locks through ON make contacts 475 to the break contacts 476 of Position Release (PR) relay 1095 (FIG. 31). Break contacts 476 are opened when the operator position is no longer required on the current call in progress by the depression of a key by the operator. A temporary hold path around PR break contacts 476 is provided by make contacts on RA5 461 (FIG. 21) and RB3 relay 467 (FIG. 23).

It can be seen from the above description of the signaling circuits of FIGS. 9 through 23 that the signaling loops 103 and 104 are arranged for parallel, two-digit, direct current inter polar duplex signaling. The particular signals transmitted in each direction are controlled by the relay contacts and keys shown in FIGS. 10 through 13. The two-digit signaling system, moreover, is equipped for automatic transmitting and receiving checks at both ends. These signaling circuits are used for all of the one-at-a-time signaling carried on between Position Control Circuit 15 and Position Circuit 17. Included in the information signaled in this manner are signals to light the DDD, the Dial "0," and other lamps of the display panel of FIG. 3. The operation of the various keys shown in the panel of FIG. 3 is represented by similar codes for transmission in the opposite direction from Position Circuit 17 to Position Control Circuit 15. As has been noted above, up to sixty-four different signals can be transmitted in the direction toward Position Circuit 17 and up to forty-eight different signals can be transmitted in the direction away from Position Circuit 17. By far the largest amount of information exchanged between these two locations is handled on a one-at-a-time basis by these two-digit signaling circuits associated with loops 103 and 104.

C. *Transmitting and Receiving Control, Control Signaling Circuit (FIGS. 24–28)*

Figure 24:
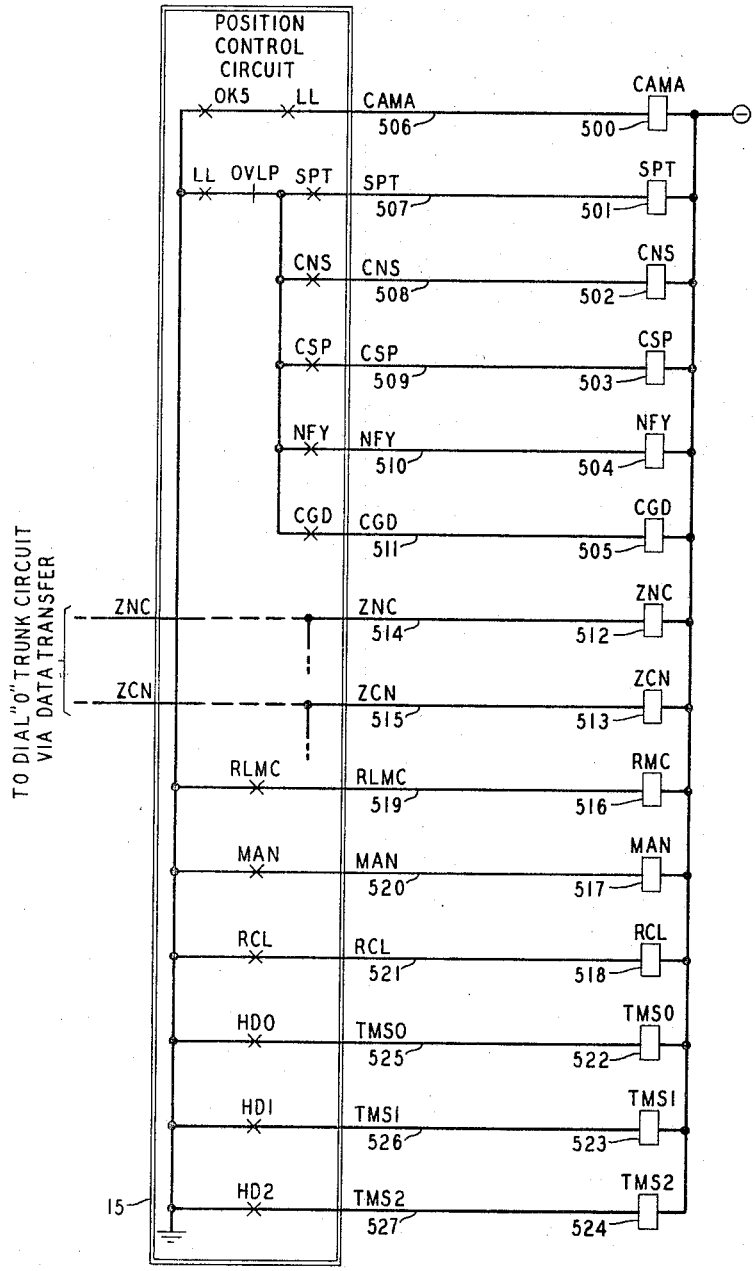

In FIG. 24 there is shown a circuit diagram of a portion of the transmitting relay control circuits of the Control Signaling Circuit 19. These relays, when operated in combination with other relays to be described, secure the transmission of particular one-at-a-time two-digit codes from Control Signaling Circuit 19 to Position Signaling Circuit 21. The first six of these relays, CAMA relay 500, Special Toll (SPT) relay 501, Coin Station (CNS) relay 502, Coin, Special Toll (CSP) relay 503, Notify (NFY) relay 504, and Charges Due (CGD) relay 505, are class of call relays corresponding to the DDD class of call lamps in the operator lamp display of FIG. 3.

On CAMA class calls, a ground on CAMA lead 506 operates CAMA relay 500. On non-coin special toll calls, a ground on SPT lead 507 operates SPT relay 501. On coin class calls, a ground on CNS lead 508, lead 509, NFY lead 510 or CGD lead 511 operates one of relays 502 through 505, respectively. As may be surmised, the operation of any particular one of these relays will eventually result in the lighting of the corresponding class lamp at the operator's lamp display.

For Dial "0" class calls, the Dial "0," Non-Coin, (ZNC) relay 512 and the Dial "0," Coin, (ZCN) relay 513 are provided. These relays are operated respectively, by grounds on ZNC lead 514 and ZNC lead 515, obtained from the Dial "0" trunk circuits via Data Transfer Circuit 24 (FIG. 1) and Position Control Circuit 15. Again, the operation of one of these relays ultimately results in the lighting of the corresponding display lamp at the operator's keyboard.

Ancillary class of call relays are also shown in FIG. 24. These comprise Release Minutes and Charge (RMC) relay 516, Manual (MAN) relay 517 and Recall (RCL) relay 518. On coin class calls, erroneous automatic displays of the time and charges are released by the appearance of a ground on RLMC lead 519 to operate RMC relay 516. On those calls for which the Rater 37 (FIG. 1) is not equipped to determine the rate, a ground on MAN lead 520 operates MAN relay 517, resulting in the flashing of the RATE lamp 203 on the numerical display panel 200 in FIG. 3. Finally, on calls in progress, and from which the operator has released the position, recall of the operator is effected by the placement of a ground on RCL lead 521 to operate RCL relay 518. This ultimately results in flashing the appropriate class of call lamp at the operator position.

Also shown in FIG. 24 are the Timer Start relays TMS0 relay 522, TMS1 relay 523, TMS2 relay 524, one for each speech loop. When operated, these relays start the operation of the initial period timer associated with the corresponding speech loop 0, 1, or 2. Since initial period timing is done at the operator position only on those calls which no not come in on coin trunks equipped for such timing (and hence are handled by the operator on a held loop basis), these relays are operated by ground on TMS0 lead 525, TMS1 lead 526, and TMS2 lead 527, respectively, only when the corresponding loop is on HOLD, as indicated by the HD– contacts in Position Control Circuit 15.

Figure 25:
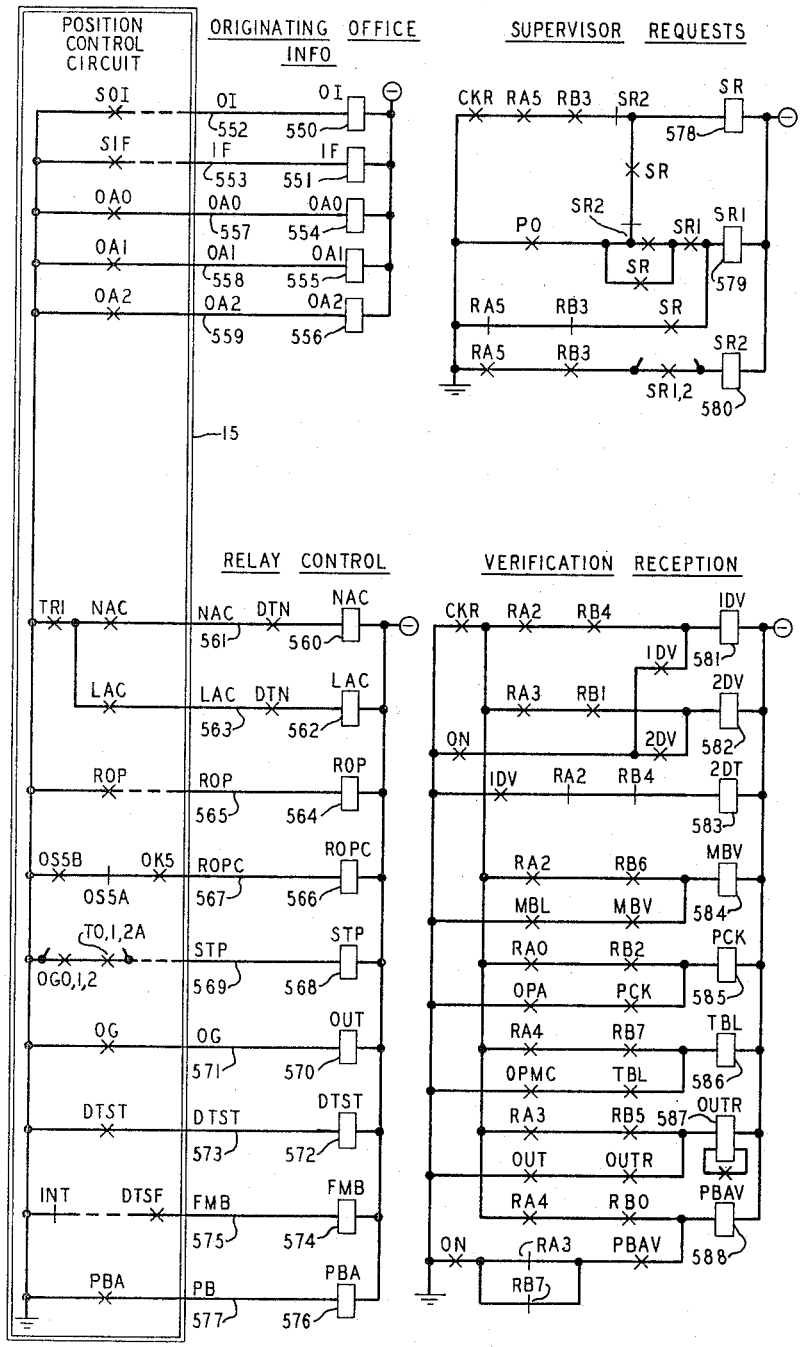

In FIG. 25 there are shown further transmitting control relay circuits as well as receiving control relay circuits for Control Signaling Circuit 19. These circuits include Operator Identified (OI) relay 550 and Identification Failure (IF) relay 551. On calls from local exchanges not equipped with ANI apparatus, or when the ANI apparatus fails, a ground is placed on OI lead 552 or IF lead 553, respectively, from Position Control Circuit 15 to operate the corresponding relay.

In those tandem offices servicing local exchanges in a plurality of national area code areas, a plurality of Originating Area relays 554, 555, and 556 are provided. A ground on OA0 lead 557, OA1 lead 558 or OA2 lead 559, from Position Control Circuit 15, operates the appropriate one of these relays. These relays, when operated, ultimately result in lighting the appropriate CALLING AREA CODE lamp on the display board of FIG. 3. Calling Area Code relays 554–556 are used only during displays of originating numbers.

A plurality of ancillary control relays are also shown in FIG. 25 which are operated by ground signals from Position Control Circuit 15 and are utilized to control the transmission of particular signals to the remote Position Circuit 17. Thus, National Area Code (NAC) relay 560 is operated by a ground on NAC lead 561, but only when a request for a display of a terminating number has been made, as indicated by the closure of the make contacts of DTN relay 276 (FIG. 7). Similarly, Local Area Code (LAC) relay 562 is operated by a ground on LAC lead 563, but only when make contacts of DTN relay 276 (FIG. 7) are operated.

Reorder Position (ROP) relay 564 is operated by a ground on ROP lead 565 when a failure occurs in the keying or registration of the calling or called number on non-CAMA class calls. At the operator display board, it results in flashing the KEY CLG lamp, the KP BACK lamp and the ST TMG lamp. Similarly, on CAMA class calls, the Reorder Position, CAMA (ROPC) relay 566 is operated by a ground on ROPC rlead 567 when a similar failure occurs on CAMA calls, and results in flashing the KEY CLG lamp and the KP BACK lamp, as before, and additionally causes the CAMA lamp to light. Since this is a CAMA class call, the ST TMG lamp does not flash.

On delayed calls initiated by the operator, Start Pulsing (STP) relay 568 is operated by a ground on STP lead 569 when the connection has been completed through to the delayed call trunk. The operation of STP relay 568 indicates that the operator may now begin key pulsing the calling and called numbers, and at the remote position results in the enablement of the key pulsing circuits. Also, as can be seen in FIG. 5, STP transfer contacts 240 and 241 transfer the multifrequency signaling loop 102 from the Control Pulsing Circuit 22 to key pulse trunks 111.

Similarly, OUT relay 570 is operated by ground on OG Lead 571 whenever the operator position is connected through to an outgoing trunk, and also results in the enablement of the key pulsing circuits. In this case, however, the operator-keyed number is transmitted to Control Pulsing Circuit 22 to be registered at Position Control Circuit 15, i.e., STP contacts 240 and 241 in FIG. 5 are not operated.

During periods when the Data Transfer Circuit 24 of FIG. 1 is actively transferring data to Position Control Circuit 15, certain keys are disabled at the Position Circuit 17 to prevent interference with the data transfer. To this end, a ground is applied to DTST lead 573 from Position Control Circuit 15 to operate Data Transfer Start (DTST) relay 572. If a failure occurs in the data transfer, an intermittent ground is applied to FMB lead 575 to intermittently operate Flash Make Busy (FMB) relay 574. This ultimately results in the flashing of the MAKE BUSY lamp at the position circuit to alert the operator to this condition.

When a position is to be marked as busy at the Chief Operator's Administration Circuit, a ground is applied to PB lead 577 to operate Position Busy "A" (PBA) relay 576.

Also shown in FIG. 25 are some of the receiving control relay circuits at Control Signaling Circuit 19. Thus, the operation of the Supervisor Request (SR) key at the remote position initiates a signaling sequence on loops 103 and 104 (FIG. 9) which ultimately results in the simultaneous operation of CKR relay 403 (FIG. 15), RA5 relay 411 (FIG. 16), and RB3 relay 415 (FIG. 18) to operate Supervisor Request (SR) relay 578. When so operated, SR relay 578 locks through its own make contacts, break contacts of SR2 relay 580 and make contacts of PO relay 270 (FIG. 7). When the SR key is released and this signal terminates, SR1 relay 579 operates through make contacts of SR relay 578 and the released break contacts of RA5 relay 411 and RB3 relay 415. The connection is now made from the operator's position to the supervisor and, at the same time, the position is made busy to all incoming calls.

Upon a second operation of the SR key at the Position Circuit 17, RA5 relay 411 and RB3 relay 415 are again operated and, together with make contacts of SR1 relay 579, operate SR2 relay 580, which locks through its own make contacts and the make contacts of RA5 relay 411 and RB3 relay 415. The operation of SR2 relay 580 releases SR relay 578. The circuit to the supervisor is now taken down and the make busy is removed from the Position Control Circuit 15. When the SR key is again released, SR2 relay 580 releases, releasing SR1 relay 579. The supervisor request relays have now all returned to normal and the above cycle of operation can be repeated upon the next operation of the SR key.

Also shown in FIG. 25 is another portion of the receiving relay circuits at the Control Signaling Circuit 19. Included among these relays are First Digit Verification (1DV) relay 581, Second Digit Verification (2DV) relay 582 and Second Digit Transmit (2DT) relay 583. The operate path of 1DV relay 581 includes make contacts of CKR relay 403 (FIG. 15), RA2 relay 408 (FIG. 16), and RB4 relay 416 (FIG. 18). The operation of these particular decoding relays indicates that the first code of a two-code class of call signal has been received at the remote position Circuit 17 and transmission of the second code can begin.

Similarly, make contacts on CKR relay 403, RA3 relay 409 (FIG. 16), and RB1 relay 413 (FIG. 18) cause the operation of 2DV relay 582. The operation of these decoding relays indicates the reception of the second code of the two-code class of call signal at the remote position. The 1DV relay 581 and 2DV relay 582 each locks through its own make contacts and make contacts of ON relay 420 (FIG. 17).

When operated, 1DV relay 581 closes make contacts in the operate path of 2DT relay 583. The operate path of 2DT relay 583 is completed when break contacts of RA2 relay 408 and RB4 relay 416 drop back following the termination of the first digit verification signal. When thus operated, 2DT relay 583 permits the transmission of the second code. This can be seen at level B7 of TA0 relay 320 (FIG. 10) and level A0 of TB6 relay 346 and TB7 relay 347 (FIG. 11).

Figure 26:
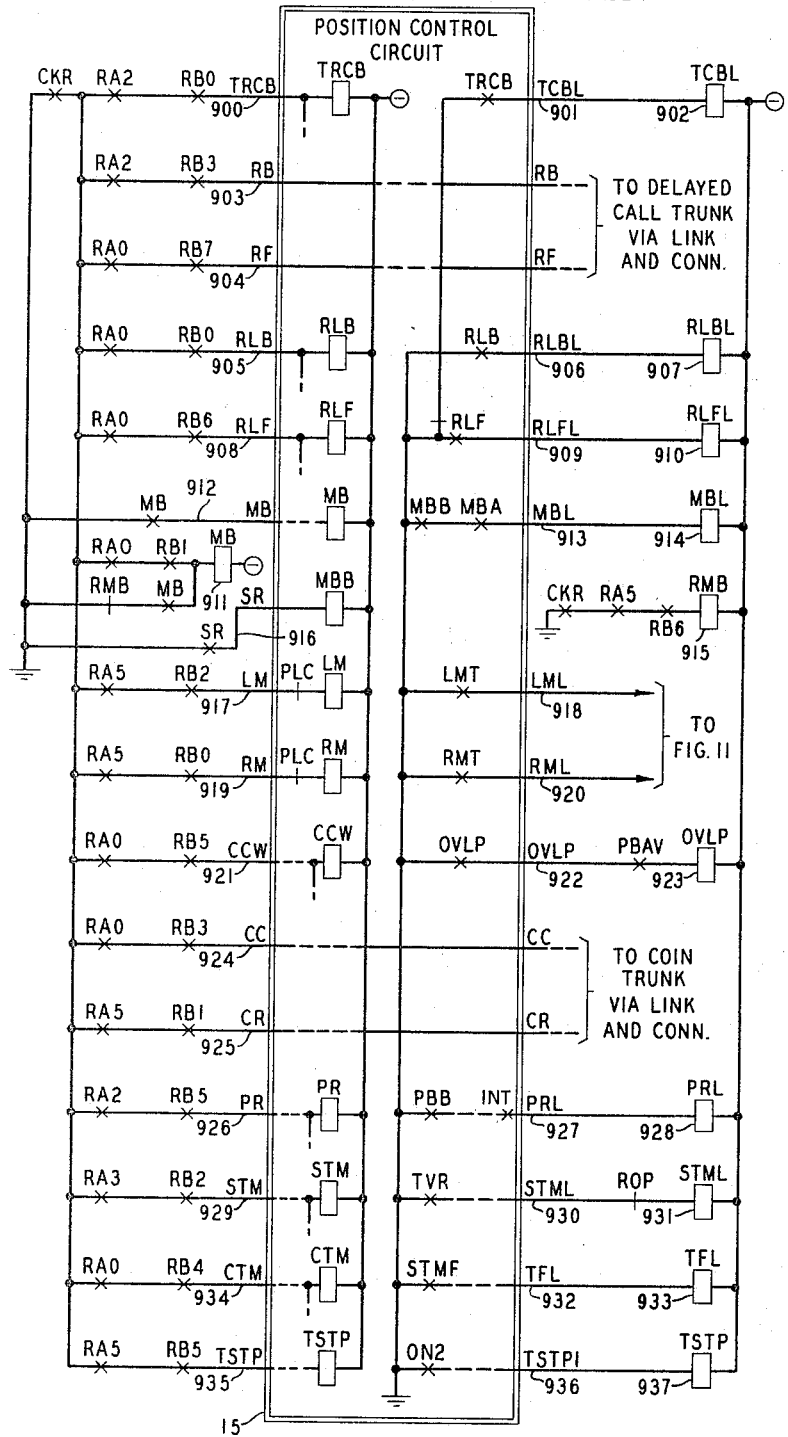

Make contacts on CKR relay 403 (FIG. 15), RA2 relay 408 (FIG. 16), and RB6 relay 418 (FIG. 18) operate Make Busy Verification (MBV) relay 584, which locks through its own make contacts and make contacts of MBL relay 914 (FIG. 26). MBV relay 584 is operated to indicate that the MAKE BUSY lamp has been successfully lit at the remote position as will be described in detail hereinafter.

Figure 38:
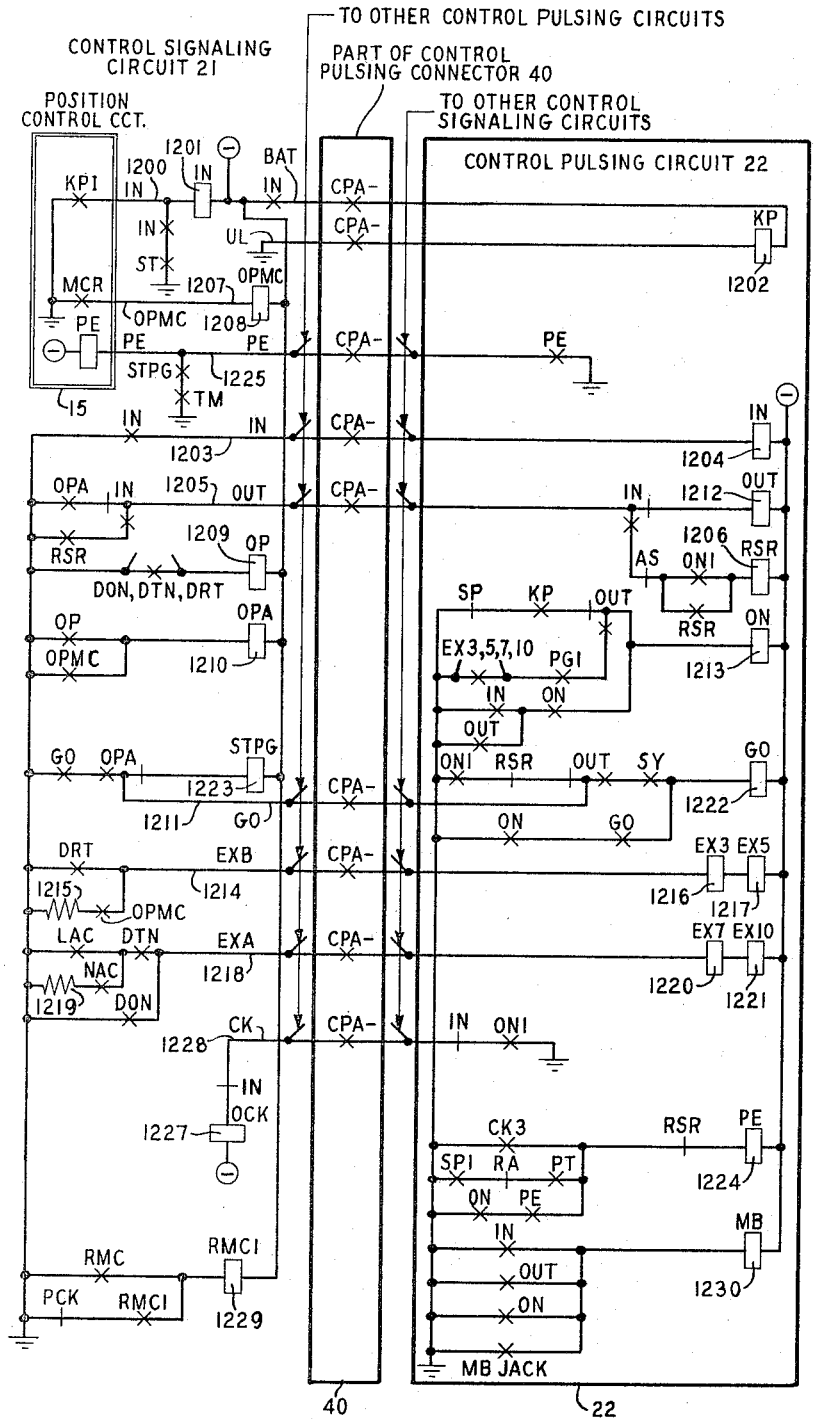

The simultaneous operation of make contacts on CKR relay 403, RA0 relay 406, and RB2 relay 414 operates Pulsing Check (PCK) relay 585, which locks through its own make contact and make contacts on OPA relay 1210 (FIG. 38). The operation of PCK relay 585 indicates that a multifrequency pulse code sequence has been successfully received at the Position Display Circuit 23, as will be described in detail hereinafter.

The simultaneous operation of make contacts on CKR relay 403, RA4 relay 410, and RB7 relay 419 operates Trouble (TBL) relay 586, which locks through its own make contact and make contacts on OPMC relay 1208 (FIG. 38). TBL 586 is operated whenever there is a failure or error in the reception of a multifrequency pulse code group at the remote Position Display Circuit 23, as will be described in detail hereinafter.

The simultaneous operation of make contacts on CKR relay 403, RA3 relay 409, and RB5 relay 417 operates OUT Received (OUTR) relay 587, which locks through its own make contacts and make contacts of OUT relay 570. An auxiliary winding on OUTR relay 587 is short-circuited by its own make contacts so that OUTR relay 587 is slow to release. This relay, when operated, indicates that an OUT signal (request for an Outgoing trunk) has been successfully received at the remote Position Circuit 17 and prepares the Control Signaling Circuit 19 for the signaling necessary to release OUT relay 1058 (FIG. 30) as will be described hereinafter.

Finally, the closure of make contacts on CKR relay 403, RA4 relay 410 and RB0 relay 412 operates Position Busy "A" Verification (PBAV) relay 588, which locks through its own make contacts, parallel break contacts of RA3 relay 409 and RB7 relay 419, and make contacts of ON relay 420. PBAV relay 588 will, of course, release upon the reception of the code operating RA3 relay 409 and RB7 relay 419. The operation of PBAV relay 588 indicates that the Positioned Busy "A" signal has been successfully received at the remote position and, when again released, indicates the successful reception of the Position Busy "A" release signal at the remote position.

In FIG. 26 there are shown control relay circuits for the reception of signals from the remote position and for the transmission of corresponding verification signals from the Control Signaling Circuit 19. In particular, each of the received signals is representative of the operation of a corresponding key at the operator's keyboard and each verification signal is, in general, used to light the lamp under the corresponding key. Thus, the simultaneous operation of make contacts on CKR relay 403, RA2 relay 408, and RB0 relay 412 places a ground on Transfer to Cord Board (TRCB) lead 900 which, in turn, operates the corresponding relay in Position Control Circuit 15. When this signal is thus registered at Position Control Circuit 15, a ground is placed on Transfer to Cord Board Lamp (TCBL) lead 901 to operate TCBL relay 902. Lead 900, of course, is grounded when the TRFR key is depressed at the remote position. The operation of TCBL relay 902 causes transmission of a signal to the remote position to light the lamp under the TRFR key.

The depression of the RING BACK key at the remote position results in the simultaneous operation of CKR relay 403, RA2 relay 408, and RB3 relay 415 to ground Rink Back (RB) lead 903. This ground is relayed on to a delayed call trunk, via Position Control Circuit 15 and Position Link and Controller 16, to cause a ringing signal to be applied to the originating party's line.

Similarly, the depression of the RING FWD key at the remote position causes the simultaneous closure of make contacts on CKR relay 403 RA0 relay 406, and RB7 relay 419 to apply a ground to Ring Forward (RF) lead 904. This ground is likewise relayed to the delayed call trunk, via Position Control Circuit 15 and Position Link and Controller 16, and causes ringing signals to be applied to the terminating subscriber's line.

The depression of the RELEASE BACK key at the remote position causes the simultaneous closure of make contacts on CKR relay 403, RA0 relay 406, and RB0 relay 412 to place a ground on Release Back (RLB) lead 905. This ground operates a corresponding relay in Position Control Circuit 15 which, in turn, applies a ground to Release Back Lamp (RLBL) lead 906 to operate RLBL relay 907. RLBL relay 907 causes the transmission of a signal to the remote position which results in the lighting of the lamp under the RELEASE BACK Key. The RLB relay in Position Control Circuit 15, of course, effects the release of the backward connection to the calling subscriber's line.

Similarly, the depression of the RELEASE FWD key at the remote position results in the simultaneous operation of make contacts on CKR relay 403, RA0 relay 406, and RB6 relay 418 to apply ground to Release Forward (RLF) lead 908. The ground on RLF lead 908 operates a corresponding relay in Position Control Circuit 15, which, in turn, applies a ground to Release Forward Lamp (RLFL) lead 909 to operate RLFL relay 910. The RLF relay in Position Control Circuit 15, of course, effects the release of the forward connection to the called subscriber's line.

The depression of the MAKE BUSY key at the remote position results in the simultaneous operation of make contacts on CKR relay 402, RA0 relay 406, and RB1 relay 413 to operate Make Busy (MB) relay 911, which locks through its own make contacts and break contacts of RMB relay 915. When operated, MB relay 911 applie a ground to Make Busy (MB) lead 912 which operates the corresponding relay in the Position Control Circuit 15 to mark the position as busy and prevent any new calls from coming in.

When the position has been successfully so marked, a ground is placed on Make Busy Lamp (MBL) lead 913 to operate MBL relay 914. MBL relay 914 causes a signal to be transmitted which lights the lamp under the MAKE BUSY key at the remote position.

A second operation of the MAKE MUSY key at the remote position causes the simultaneous operation of make contacts on CKR relay 403, RA5 relay 411, and RB6 relay 418, to operate Release Make Busy (RMB) relay 915. As noted above, the operation of RMB relay 915 opens break contacts in the hold path of MB relay 911 to release the Make Busy indication.

Finally, and as noted above, the operation of SR relay 578 in FIG. 25 applies ground to SR lead 916 which also marks the position as busy when it is desired to talk to the supervisor.

The depression of the POS TRFR (Left) key at the remote position results in the simultaneous operation of make contacts on CKR relay 403, RA5 relay 411, and RB2 relay 414 to place a ground on Left Mate (LM) lead 917 and operate the corresponding relay in Position Control Circuit 15. This relay transfers the operator's speech circuits to the immediately adjacent position to the left and results in a ground being applied to Left Mate Lamp (LML) lead 918 to light the lamp under the POS TRFR (Left) key at the remote position. Similarly, the depression of the POS TRFR (Right) key at the remote position results in the simultaneous operation of make contacts on CKR relay 403, RA5 relay 411, and RB0 relay 412 to place a ground on Right Mate (RM) lead 919. This ground causes the corresponding relay to operate in Position Control Circuit 15, transferring the operator's speech circuits to the immediately adjacent position to the right. A ground thereupon appears on Right Mate Lamp (RML) lead 920 which, in turn, lights the lamp under the POS TRFR (Right) key at the remote position.

The depression of the CAMA CW key at the remote position results in the simultaneous operation of make contacts on CKR relay 403, RA0 relay 406, and RB5 relay 417 to place a ground on CAMA Call Waiting (CCW) lead 921. This ground causes a corresponding relay to operate in Position Control Circuit 15 which ultimately results in the placement of a ground on Overlap (OVLP) lead 922. The operation of the CCW relay at the Position Control Circuit 15 indicates that the position is able to accept one CAMA call on an overlap basis, that is, while another loop is being held for further operator supervision. The ground on OVLP lead 922 operates OVLP relay 923 only when make contacts on PBAV relay 588 (FIG. 25) are closed. This position must therefore be busy before a CAMA call can be accepted on an overlap basis.

The depression of the COIN COL key at the remote position causes the simultaneous operation of make contacts on CKR relay 403, RA0 relay 406, and RB3 relay 415 to place a ground on Coin Collect (CC) lead 924. This ground is relayed to the coin trunk via Position Control Circuit 15 and Position Link and Controller 16 to effect the collection of coins at the paystation connected to that coin trunk. Similarly, the depression of the COIN RET key at the remote position results in the simultaneous operation of make contacts on CKR relay 403, RA5 relay 411, and RB1 relay 413 to place a ground on Coin Return (CR) lead 925. This ground is likewise relayed via Position Control Circuit 15 and Position Link and Controller 16 to the coin trunk to effect the return of coins at the connected paystation.

The depression of the POS RLS key at the remote position results in the simultaneous operation of make contacts on CKR relay 403, RA2 relay 408, and RB5 relay 417 to place a ground on Position Release (PR) lead 926. This ground operates a corresponding relay in Position Control Circuit 15 which ultimately results in the position releasing from the current call in progress. When the operator is to be signaled that the position should be released, an intermittent ground is applied to Position Release Lamp (PRL) lead 927 to operate PRL relay 928. The intermittent operation of PRL relay 928 causes the lamp under the POS RLS key to flash.

The depression of the ST TMG key at the remote position causes the simultaneous operation of make contacts on CKR relay 403, RA3 relay 409, and RB2 relay 414 to place a ground on Start Timing (STM) lead 929. This ground operates a corresponding relay in Position Control Circuit 15 which causes the initial entry to be made on the tape in Recorder 25 (FIG. 1).

Following the completion of this initial entry, a ground appears on Start Timing Lamp (STML) lead 930 to operate STML relay 931. STML relay 931 lights the lamp under the ST TMG key at the remote position. It will be noted that STML relay 931 will operate only if break contacts on ROP relay 564 (FIG. 25) are not opened. Since the ST TMG lamp is flashed when the position is reordered on non-CAMA calls, these break contacts prevent the ST TMG lamp from remaining continuously on.

If the initial entry cannot be made for one reason or another, an intermittent ground is placed on Trouble Flash (TFL) lead 932 to operate TFL relay 933. TFL relay 933 causes the flashing of the ST TMG lamp as well as the NO CHG lamp at the remote position.

The depression of the CNL TNG key at the remote position results in the simultaneous operation of make contacts on CKR relay 403, RA0 relay 406, and RB4 relay 416 to place a ground on Cancel Timing (CTM) lead 934. This ground operates a corresponding relay in Position Control Circuit 15 which places a special mark on the tape in Recorder 25 (FIG. 1) indicating that the previous initial entry is to be disregarded.

Finally, the depression of the TSTP key at the remote position results in the simultaneous operation of make contacts on CKR relay 403, RA5 relay 411, and RB5 relay 417 to place a ground on Test Position (TSTP) lead 935. This ground operates a corresponding relay in Position Control Circuit 15. Similarly, a ground placed on TSTP1 lead 936 operates TSTP relay 937, which results in the transmission of a test signal to the remote position. The TSTP key at the remote position completes a loop for these test signals, resulting in the application of the ground to TSTP lead 935. This circulated test signal insures the operation of the majority of the signaling circuits used for remote position signaling.

Figure 27:
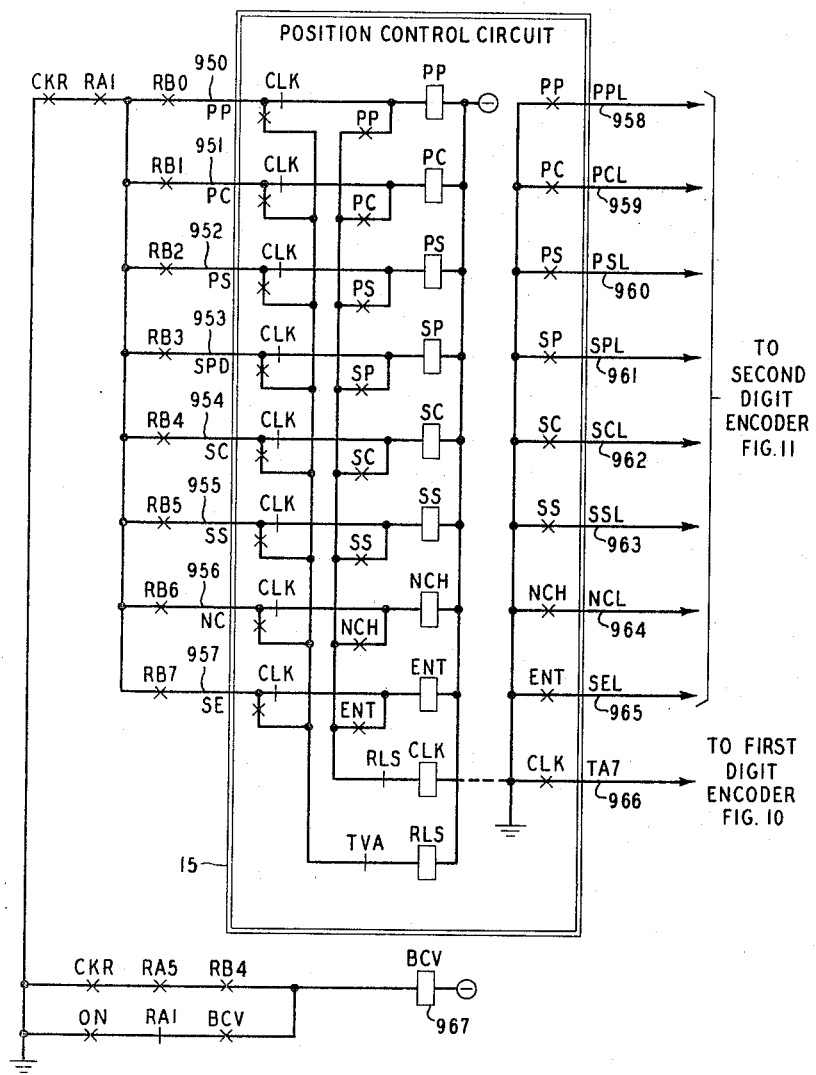

In FIG. 27 there are shown the billing class registration circuits at Position Control Circuit 15 and the ancillary circuits in Control Signaling Circuit 19. In general, these circuits operate as follows: A billing class key is depressed at Position Circuit 17, resulting in the transmission of a particular code to Control Signaling Circuit 19. This code results in the application of a ground to one of the billing class leads 950 through 957 to Position Control Circuit 15, actuating the corresponding billing class register relay. When so operated, the billing class register relay applies a ground to a corresponding one of the billing class lamp leads 958 through 965 which, in turn, effects the transmission of a code to the remote position to light the appropriate billing class lamp.

As can be seen in FIG. 27, for example, the depression of the PERSON PAID key at the remote position results in the simultaneous operation of make contacts on CKR relay 403 (FIG. 15), RA1 relay 407 (FIG. 16), and RB0 relay 412 (FIG. 18), applying a ground to Person Paid (PP) lead 950. This ground results in the operation of a corresponding PP relay in Position Control Circuit 15 which establishes a locking path through its own make contacts, break contacts of a billing class Release (RLS) relay in Position Control Circuit 15, and the operating coil of a Class Check (CLK) relay.

Similarly, the depression of any of the other billing class keys at the remote position results in the application of a ground to the appropriate one of leads 951 through 957 to Position Control Circuit 15. Each of these grounds operates the appropriate billing class registration relay in Position Control Circuit 15 which establishes a locking path through its own make contacts, the RLS break contacts, and the operate coil of the CLK relay. When the billing class key is released to terminate the ground on the billing class leads 950–957, the CLK relay is free to operate, transferring leads 950 through 957 to the operate path of a Release (RLS) relay in Position Control Circuit 15. A correction in billing class can now be made merely by depressing the new billing class key to operate the RLS relay, release the previously operated billing class relay, and allow the new billing class relay to operate.

The operate path for the RLS relay includes break contacts of the Transverter Attached (TVA) relay, not shown. The operation of this relay indicates that a Transverter 28 has been connected to Position Control Circuit 15 by way of Transverter Connector 29 and hence the Transverter is in the process of making the initial tape entry for this call. Thus, after the Transverter 28 has been connected, a billing class change can no longer be made.

The operation of any one of the billing class registration relays results in the application of a ground to the appropriate one of billing class lamp leads 958 through 965. Similarly, when the CLK relay in Position Control Circuit 15 operates, a ground is applied to TA7 lead 966 which operates TA7 coding relay 327 in FIG. 10. As can be seen in FIG. 11, the grounds on these leads effect the transmission of the appropriate billing class lamp signal to the remote position.

As an indication that the billing class lamp signal has been successfully received at the remote position, a billing class lamp verification signal is transmitted to Control Signaling Circuit 19. This signal results in the simultaneoues operation of make contacts on CKR relay 403, RA5 relay 411, and RB4 relay 416 to operate Billing Class Verification (BCV) relay 967. BCV relay 967 locks through its own make contact, break contacts of RA1 relay 407, and make contacts of ON relay 420 (FIG. 17). As can be seen in FIG. 10, the operation of BCV relay 967 releases TA7 relay 327 to terminate the transmission of the billing class lamp signal. Once operated, BCV relay 967 remains operated until the billing class key at the remote position is released, as indicated by the opening of the break contacts of RA1 relay 407.

In FIG. 28 there is shown the balance of the transmitting and receiving control relays at Control Signaling Circuit 19. These circuits include the key pulse control relays for the control of the reception of two-frequency signals associated with the operator's key set. Thus, the depression of the KP TRBL key at the remote position results in the simultaneous operation of make contacts on CKR relay 403 (FIG. 15), RA2 relay 408 (FIG. 16), and RB7 relay 419 (FIG. 18) to apply a ground to Key Trouble (KT) lead 970. This ground operates an appropriate Trouble Recording (TR-) relay Position Control Circuit 15 which prepares this circuit for the reception of a two-digit multifrequency trouble code, to be keyed by the operator at the remote position. Trouble conditions detected at Position Control Circuit 15 results in the placement of an intermittent ground on Key Trouble Lamp (KTL) lead 971 to operate KTL relay 972. KTL relay 972 causes a signal to be transmitted to the remote position to flash the KP TRBL lamp.

The depression of the KP RATE key at the remote position causes the simultaneous operation of make contacts on CKR relay 403, RA5 relay 411, and RB7 relay 419 to place a ground on Key Pulse Rate (KPRT) lead 973. This ground causes the operation of a corresponding relay in Position Control Circuit 15 which, in turn, results in the placement of a ground on Key Pulse Rate Lamp (KPRL) lead 974 to operate KPRL relay 975 after the KP RATE key is released. It will be noted that the KPR relay in Position Control Circuit 15 can operate only if make contacts on the MAN relay in Position Control Circuit 15 (see FIG. 24) are closed. Since the KPR relay in Position Control Circuit 15 prepares this circuit for the reception of a manually computed rate code, these contacts insure that such a code can be received only when manual rating has been requested.

The depression of the KP FWD key at the remote position results in the simultaneous operation of make contacts on CKR relay 403, RA2 relay 408, and RB1 relay 413 to place a ground on Key Pulse Forward (KPF) lead 976. This ground operates a corresponding relay in Position Control Circuit 15 which prepares a connected sender for the reception of the called subscriber's number, to be key-pulsed by the operator. The operation of this relay also results in the placement of a ground on Key Pulse Forward Lamp (KPFL) lead 977 to operate KPFL relay 978 after the KP FWD key is released. KPFL relay 978 causes a signal to be transmitted to the remote position to light the lamp under the KP FWD key.

Similarly, the operation of the KP BACK key at the remote position results in the simultaneous operation of make contacts on CKR relay 403, RA2 relay 408, and RB2 relay 414 to place a ground on Key Pulse Back (KPB) lead 979. This ground operates a corresponding relay in Position Control Circuit 15 to prepare an attached sender for receiving the originating subscriber's number, to be key-pulsed by the operator. This relay likewise ultimately causes a ground to be placed on Key Pulse Back Lamp (KPBL) lead 980 to operate KPBL relay 981 after the KP BACK key is released. KPBL relay 981 causes a signal to be sent to the remote position to light the lamp under the KP BACK key.

The reception of a KPRT, KPF, or KPB signal from the remote position also operates Reset Register (RSR) relay 982 which, by way of its make contacts, applies a ground to Reset (RS) lead 983. This ground operates the RS relay in Position Control Circuit 15.

The ground for operating KPRL relay 975, KPFL relay 978, and KPBL relay 981 is obtained through transfer contacts to the KPR, KPF, and KPB relays, respectively, in Position Control Circuit 15. When these transfer contacts are not operated, a ground path may be completed through Pulsing Error (PE) make contacts, Key Pulsing In (KPI) break contacts, and interrupter contacts. Thus, an error in key pulsing will cause the appropriate key pulse lamp to flash even without the operation of one of the key pulse control keys.

Similarly, when one of these transfer contacts is operated, the ground path is completed through break contacts of the RS relay, PE transfer contacts, and a ground on Light Key Lamps (LKL) lead 984, supplied by make contacts of STPG relay 1223 (FIG. 38). This ground is available for steady operation of the appropriate key pulse lamp after release of the RS relay reelases, as long as there is no pulsing error, and as long as key pulsing continues in progress. A pulsing error, however, will change this steady lamp signal to a flashing signal by way of the PE transfer contacts. The receipt of a new key pulse control signal which operates RSR relay 982 will result in the termination of the previous key pulse lamp signal and prepare the circuits for the registration of the new key pulse control signal.

Finally, the depression of the ST key adjacent the operator's keyset at the remote position results in the simultaneous operation of CKR relay 403, RA4 relay 410, and RB1 relay 413 to operate Start (ST) relay 985. Make contacts of ST relay 985 apply a ground to Start (ST) lead 986 to operate a corresponding relay in Position Control Circuit 15. The reception of this start indication indicates the end of the key pulse signals and results in the disconnection of the multifrequency circuits and release of the control relays.

On delayed calls, where the operator has depressed an access key to obtain a delayed call trunk, when this trunk is connected, a ground is placed on Start Pulsing (STP) lead 987 to operate STP relay 988. The operation of STP relay 988 causes a signal to be transmitted to the remote position which enables the key pulsing circuits. Prior to the reception of this signal, the operator's keyset is not effective to transmit multifrequency key pulse signals.

The balance of the relay control circuits shown in FIG. 28 are loop access and hold control circuits and are used in connection with steady state direct current polar duplex signaling on loops 100, 101, and 102 (FIG. 6). Most of this circuitry must be provided on a separate basis for each of the three loops capable of connection to the operator's position. Only one set of the control relays for one of these loops has been shown in FIG. 28, since the control circuitry for each of the other loops is identical to the one shown.

The depression of one of the access (ACS0, ACS1, or ACS2) keys at the remote position results in the simultaneous operation of make contacts on CKR relay 403, (FIG. 15), RA4 relay 410 (FIG. 16), and one of the relays including RB3 relay 415, RB4 relay 416, or RB6 relay 418, to apply a ground to the corresponding one of Access (ACS0, -1, -2) leads 989. This ground operates one of two relays in Position Control Circuit 15, depending on whether or not the associated loop is in the hold condition. The OK- transfer contacts in Position Control Circuit 15 are operated when the associated loop is being held and hence cause the associated access (ACS-) relay to operate. This relay reconnects the held loop to the operator's position.

If the loop is not in a hold condition, the OK- transfer contacts are not operated and, instead, the appropriate Outgoing Trunk (OG-) relay operates. This relay initiates a search for a delayed call trunk to be connected to this loop.

When a delayed call trunk has been obtained and has been connected to Position Control Circuit 15, or on any incoming call, the Talk (T-) transfer contacts are operated to apply a ground to lead 989 to operate the corresponding Talk (TLK-) relay 990 through the break portion of the CKR transfer contacts. The TLK- relay 990 locks through its own make contacts to the ground on lead 989. The TLK- relay 990 causes the transmission of a signal to the remote position to light the appropriate ACS- lamp.

The depression of any one of the HOLD keys (HOLD 0, 1, 2) at the remote position results in the simultaneous operation of make contacts on RA3 relay 409 and RB3 relay 415 to apply a ground to a common Hold (HB) lead 991. This ground operates the HB relay in Position Control Circuit 15 to indicate the request for a hold. The HB relay is common to all of the loops and the loop which is actually held is determined by the condition of the T- relays.

Finally, the Recall (RCL) relay in Position Control Circuit 15, which provided the ground on RCL lead 521 in FIG. 24, is locked through its own make contacts and a ground on RFL lead 992. This ground is obtained through parallel break contacts of RA4 relay 410 and serial break contacts of RB3 relay 415, RB4 relay 416, and RB6 relay 418, each of the latter in parallel with corresponding break contacts of the three TLK- relays corresponding to TLK- relay 990. These break contacts are arranged to remove the hold ground for the RCL relay on lead 992 whenever the access key for the corresponding loop is depressed and the TLK- relay for that loop operates. Thus, the recall flashing lamp signal will continue until the operator has depressed the appropriate access key and the appropriate loop has actually been connected to the operator's speech circuits.

Hold relays, not shown, in Position Control Circuit 15 provide a ground on one of three Hold leads 993 (HD0, 1, 2) to operate the corresponding Hold or Access (HA-) relay 994. Contracts of this HA- relay 994 are shown at the Control Signaling Circuit end of the polar duplex signaling circuits of FIG. 6. They are used in combination with contacts of CLG- relay 996 and CLD- relay 998 to control the hold, access and line supervisory lamps at the remote position. HA- relay 994 may also be operated by way of make contacts on TLK- relay 990, parallel break contacts of RA4 relay 410 and RB7 relay 419, and parallel break contacts on TM relay 1419 (FIG. 51) and OPA relay 1210 (FIG. 38). The operate path for HA- relay 994 is normally through the break contacts of these relays. If a trouble condition occurs at the Position Display Circuit 23, however, RA4 relay 410 and RB7 relay 419 operate to transfer HA- relay 994 to an intermittent ground through interrupter contacts. This results in the flashing of the appropriate hold or access lamp. Similarly, when an outpulsing time-out occurs in the use of a Control Pulsing Circuit 22, as will be hereinafter described, the contacts of TM relay 1419 and OPA relay 1210 are operated to provide the same intermittent ground for flashing the hold or access lamp.

D. *Transmitting and Receiving Control, Position Signaling Circuit (FIGS. 29–33)*

In FIGS. 29 through 33 there are shown the transmitting and receiving control relays located at Position Signaling Circuit 21 and used to control the transmission and reception of parallel two-digit codes on the polar duplex signaling circuits of loops 103 and 104. These circuits correspond in many respects to the transmitting and receiving control relay circuits at the Control Signaling Circuit 19 (i.e., FIGS. 24 through 28) and have been arranged in a similar manner in the drawings whenever possible.

Figure 29:
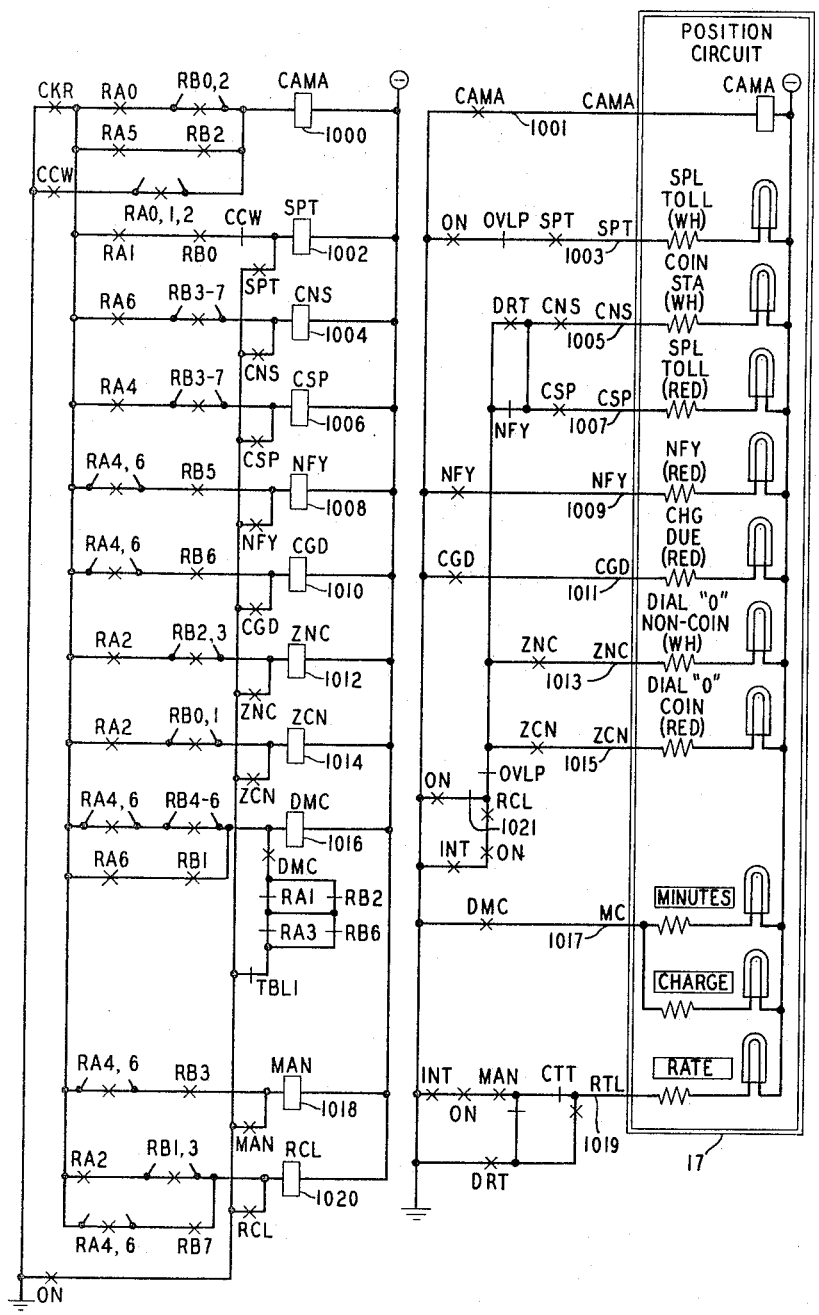

In FIG. 29 there are shown class of call receiving relays together with the corresponding lamp circuits. Thus, on CAMA class calls, one of the several operate paths for CAMA relay 1000 is completed to operate this relay. Make contacts on CAMA relay 1000 place a ground on CAMA lead 1001 to Position Circuit 17 to operate a corresponding CAMA relay in the position circuit. The CAMA relay in Position Circuit 17 lights a CAMA lamp (not shown) as well as performing other functions.

The operate paths for CAMA relay 1000 correspond to all of the CAMA class signals which can be received at Position Signaling Circuit 21. Thus, on CAMA class, Operator Identified, calls, make contacts on CKR relay 453 (FIG. 20), RA0 relay 456 (FIG. 21), and RB0 relay 464 (FIG. 23) are operated to complete an operate path for CAMA relay 1000. Similarly, on CAMA class, Identification Failure, calls, make contacts on CKR relay 453, RA0 relay 456, RB2 relay 466 are operated to complete an operate path for CAMA relay 1000. The operation of make contacts on CKR relay 453, RA5 relay 461, RB2 relay 466 represent a CAMA class call for which the position has been reordered due to a failure or error in key pulsing the calling subscriber's number.

These three CAMA class signals, i.e., Operator Identified Identification Failure and Reorder are duplicated by separate signals for CAMA class calls taken on an overlap basis. As can be seen in FIG. 14 make contacts 404 on OVLP relay 923 (FIG. 26) operate CKT relay 400. When thus operated on overlap CAMA calls CKT relay 400 permits the transmission of single digit codes. As can be seen in FIG. 10 separate OVLP operate levels are provided for TA0 relay 320 TA1 relay 321 and TA2 relay 322. The contacts included in these operate paths correspond to the CAMA class signals described above but require the transmission of only a single digit corresponding to these three coding relays in FIG. 10.

Returning to FIG. 29 the simultaneous operation of make contacts on CCW relay 1093 (FIG. 31) and one of decoding relays RA0 relay 456 RA1 relay 457 or RA2 relay 458 corresponding to Operator Identification Identification Failure and Reorder Position CAMA likewise complete operate paths for CAMA relay 1000.

On non-coin class Special Toll calls the simultaneous operation of make contacts on CKR relay 453 RA1 relay 457 and RB0 relay 464 complete the operate path for Special Toll (SPT) relay 1002. This operate path however is completed through break contacts on CCW relay 1093 (FIG. 31) to prevent this class signal from being received when an overlap CAMA call is expected. SPT relay 1002 when operated locks through its own make contacts and make contacts on ON relay 472 (FIG. 22). When thus operated SPT relay 1002 places a ground on SPT lead 1003 to light the SPL TOLL lamp through make contacts on ON relay 472 and break contacts on OVLP relay 1084 (FIG. 31).

On station paid coin class calls the simultaneous operation of make contacts on CKR relay 453 RA6 relay 462 and any one of RB3 relay 467 RB4 relay 468 RB5 relay 469 RB6 relay 470 or RB7 relay 471 causes the operation of Coin Station (CNS) relay 1004. This relay locks through its own make contacts and make contacts on ON relay 472 and provides a ground on Coin Station (CNS) lead 1005 to light the COIN STA lamp at Position Circuit 17.

Similarly on coin class special toll calls make contacts on CKR relay 453 RA4 relay 460 and any one of RB3 relay 467 through RB7 relay 471 are operated to complete the operate path for Coin Special Toll (CSP) relay 1006. This relay when operated locks through its own make contacts and make contacts on ON relay 472 and provides a ground on CSP lead 1007 to light the red SPL TOLL (COIN) lamp at Position Circuit 17.

On Notify class of coin calls make contacts on CKR relay 453 RB5 relay 469 and either one of RA4 relay 460 or RA6 relay 462 are simultaneously operated to operate Notify (NFY) relay 1008. This relay when operated locks through its own make contacts and make contacts on ON relay 472 and provides a ground on NFY lead 1009 to light the red NFY lamp at Position Circuit 17.

It will be noted that break contacts on NFY relay 1008 interrupt the ground on CNS lead 1005 and CSP lead 1007 to prevent the lighting of the COIN STA lamp or the SPL TOLL lamp at Position Circuit 17. Thus on coin class calls when the operator is to notify the paystation customer that the initial period is over only the NFY lamp is lit. If however it is necessary for the operator to secure the rate code at this time make contacts on DRT relay 293 (FIG. 8) restore the ground to CNS lead 1005 or CSP lead 1007 so that one of these two lamps will light to tell the operator whether this is a station paid call or some other special billing class call.

At the end of an overtime period on coin class calls, when the calling or called party hangs up, or the calling party flashes the operator, a Charges Due signal is received, resulting in the simultaneous operation of make contacts on CKR relay 453, RB6 relay 470 and one of RA4 relay 460 or RA6 relay 462 to complete the operate path for Charges Due (CGD) relay 1010. This relay, when operated, locks through its own make contacts and make contacts on ON relay 472 and places a ground on CGD lead 1011 to light the CHG DUE lamp. At this time, the operator advises the paystation customer of the overtime charges which are due and monitors the collection of these charges.

On Dial "0" calls from non-coin phones, a signal is received resulting in the simultaneous operation of CKR relay 453, RA2 relay 458 and one of RB2 relay 466 or RB3 relay 467 to operate Dial "0," non-coin (ZNC) relay 1012. The signal which completes the operate path through the make contacts of RB2 relay 466 is received upon the initial appearance of the Dial "0" call at the operator position. Recall of the operator on this same Dial "0" call results in the operation of RB3 relay 467. When thus operated, ZNC relay 1012 locks through its own make contacts and make contacts on ON relay 472 and provides a ground on ZNC lead 1013 to light the DIAL "0," NON-COIN lamp at Position Circuit 17.

Similarly, on Dial "0" calls from coin stations, a signal is received resulting in the simultaneous operation of make contacts on CKR relay 453, RA2 relay 458 and one of RB0 relay 464 or RB1 relay 465. This completes the operate path for Dial "0," Coin (ZNC) relay 1014 which locks through its own make contacts and make contacts on ON relay 472. When operated, ZNC relay 1004 provides a ground on ZNC lead 1015 to light the red DIAL "0" COIN lamp at Position Circuit 17.

It will be noted that all of the coin class lamps described above are extinguished by break contacts on OVLP relay 1084 (FIG. 31), except for the NFY lamp and the CHG DUE lamp. The corresponding relays, however, remain locked to the make contacts of ON relay 472. In this way, the class indication of the call in progress is held while the operator handles a CAMA call on an overlap basis, and continues to be stored at Position Signaling Circuit 21, although the class of call lamp indication terminates. The exceptions are made for the Notify and Charges Due indications because requests for these operator services never require the holding of the loop and hence never permit overlap CAMA service.

On certain types of coin class calls, an operate path is provided for Display Minutes and Charges (DMC) relay 1016. These various operate paths include make contacts of CKR relay 453, RA4 relay 460, RA6 relay 462, RB1 relay 464, and RB4 relay 468 through RB6 relay 470. When operated, DMC relay 1016 locks through its own make contacts, parallel break contacts on RA1 relay 457 and RB2 relay 466, a parallel combination of break contacts on RA3 relay 459 and RB6 relay 470, and break contacts on TBL1 relay 1068 (FIG. 30). The RA1 and RB2 break contacts release DMC relay 1016 and indicate the operation of RMC relay 516 (FIG. 24) at Control Signaling Circuit 19. The RA3 and RB6 break contacts release DMC relay 1016 and indicate a time-out in the search for or use of a Control Pulsing Circuit 22 at the Control Signaling Circuit 19. Finally, the release of the break contacts on TBL1 relay 1068 indicates a trouble condition at the Position Display Circuit 23. In each of the above cases, DMC relay 1016 is released and the minutes and charge display is terminated.

When operated, DMC relay 1016 places a ground on MC lead 1017 to light the lamps under the Minutes Indicator Panel 202 and the Charge Indicator Panel 201 in FIG. 3. At the same time, make contacts on DMC relay 1016 initiate a search for a Position Display Circuit 23 as shown in FIG. 43. Once a Control Pulsing Circuit 22 has been seized by Control Signaling Circuit 19 and a Position Display Circuit 23 has been seized by Position Signaling Circuit 21, the minutes and charge information can be transmitted from register relays in Position Control Circuit 15 to register relays in Position Signaling Circuit 21 (FIG. 47) via multifrequency pulses on loop 102. This operation will be described in detail hereinafter.

On coin class calls, when the operator must manually compute the rate to be used, a class signal is received which operates make contacts on CKR relay 453, RB3 relay 467 and one of RA4 relay 460 (special billing class) or RA6 relay 462 (station paid billing class). This completes an operate path for Manual (MAN) relay 1018 which locks through its own make contacts and make contacts on ON relay 472. When operated, MAN relay 1018 connects the Rate Lamp (RTL) lead 1019 to an intermittent ground via make contacts on ON relay 472. Thus, when a rate must be manually computed by the operator, the lamp under the Rate Indicator Panel 203 (FIG. 3) flashes. This rate lamp is steadily lit by make contacts on DRT relay 293 (FIG. 8) when the operator requests a display of the rate stored at the Position Control Circuit 15.

On all but calling party paid coin class calls, transfer contacts on CTT relay 1116 (FIG. 32) transfer the ground on RTL lead 1019 from the intermittent path provided by the transfer contacts of MAN relay 1018. Thus, it is only when the operator has keyed a paid billing class to the tandem office that the rate must be computed manually. On other billing classes, the rate and charges can be computed later from the tape entries for appropriate billing.

On paid class calls, and on all coin class calls, when the calling subscriber flashes the switchhook, a signal is generated resulting in the operation of make contacts on CKR relay 453 and the appropriate ones of RA2 relay 458, RA4 relay 460 or RA6 relay 462, and RB1 relay 465, RB3 relay 467 or RB7 relay 477. These contacts operate Recall (RCL) relay 1020 which locks through its own make contacts and make contacts on ON relay 472. When operated, RCL relay 1020 flashes the appropriate class of call lamp by way of transfer contacts 1021 to connect the class lamp leads to an intermittent ground through make contacts on ON relay 472.

In FIG. 30 there are shown additional receiving control relays corresponding to the transmitting control relays of FIG. 25. Also shown in FIG. 30 is a portion of the lamp circuits and relay control circuits in Position Circuit 17.

Thus, the operation of OI relay 550 (FIG. 25) at Control Signaling Circuit 19 results in the simultaneous operation of make contacts on CKR relay 453 (FIG. 20), RA0 relay 456 (FIG. 21) and RB6 relay 470 (FIG. 23) to operate Operator Identified (OI) relay 1050. The operate path of OI relay 1050 is completed through break contacts of DON relay 294 (FIG. 8) in order to insure that this signal is not received during displays of originating numbers. OI relay 1050 locks through its own make contacts and make contacts on ON relay 472 (FIG. 22).

Similarly, the operation of IF relay 551 in FIG. 25 results in the simultaneous closure of make contacts on CKR relay 453, RA0 relay 456, and RB7 relay 471 to operate Identification Failure (IF) relay 1051. IF relay 1051 also operates through break contacts of DON relay 294 and also locks through its own make contacts and make contacts on ON relay 472.

The operation of OA0 relay 554, OA1 relay 555, or OA2 relay 556 in FIG. 25 results in the simultaneous closure of make contacts on CKR relay 453, RA0 relay 456, and one of RB5 relay 469, RB6 relay 470, or RB7 relay 471. When thus operated, and provided that DON relay 294 is operated, these relays place a ground on the corresponding one of the Originating Area leads 1052 (OA0), 1053 (OA1), or 1054 (OA2). Grounds on these leads light the appropriate CALLING AREA CODE lamps in Position Circuit 17.

As can be more clearly seen in FIG. 10, the code levels B5, B6, and B7 of TA0 relay 320 provide alternate operate paths depending upon whether or not DON relay 294 (FIG. 8) is operated. When DON relay 294 is operated, these three levels provide operate paths for TA0 relay 320 and the corresponding TB- relays to light the CALLING AREA CODE lamps. When DON relay 294 is not operated, these same codes are used at levels B6 and B7 to indicate Operator Identified or Identification Failure in non-CAMA calls. Since the CALLING AREA CODE lamps are lit only when a display of an originating number has been requested, and since such a request will never be made on CAMA calls requiring operator identification of the calling number, or when automatic identification has failed, no ambiguities arise in the use of these three codes.

When it is desired to start one of the initial period timers associated with the three loops terminating at the Position Control Circuit 15, a signal is transmitted to Position Signaling Circuit 21 resulting in the simultaneous operation of make contacts on CKR relay 453 and selected ones of RA0 relay 456, RA5 relay 461, RB1 relay 464, RB4 relay 468, RB5 relay 469, and RB6 relay 470. The simultaneous operation of appropriate pairs of these make contacts places a ground on the selected one of the Timer Start leads 1055 (TMS0), 1056 (TMS1), or 1057 (TMS2) to operate the corresponding Timer relay in Position Circuit 17.

The operation of OUT relay 570 (FIG. 25) results in the transmission of a signal causing the simultaneous operation of make contacts on CKR relay 453, RA2, relay 458, and RB5 relay 469 to operate OUT relay 1058. OUT relay 1058 locks through its own make contacts, parallel break contacts on RA2 relay 458 and RB7 relay 471, and make contacts on ON relay 472. When so operated, OUT relay 1058 effects the transmission of a verification signal to Control Signaling Circuit 19 which results in the operation of OUTR relay 587 (FIG. 25).

When OUT relay 570 in FIG. 25 is subsequently released, a second signal is sent to the Position Signaling Circuit 21 which results in the simultaneous operation of RA2 relay 458 and RB7 relay 471 to interrupt the hold path for OUT relay 1058. OUT relay 1059, when operated, applies a ground to OG lead 1059 to operate a corresponding relay in Position Circuit 17.

When STP relay 568 in FIG. 25 is operated, a signal is transmitted to Position Signaling Circuit 21 resulting in the simultaneous operation of make contacts on CKR relay 453, RA3 relay 459, and RB3 relay 467 to apply a ground to STP lead 1060. This ground operates a corresponding relay in Position Circuit 17 to enable the operator's key pulsing circuits.

The operation of DTST relay 572 in FIG. 25 results in the simultaneous operation of make contacts on CKR relay 453, RA3 relay 459, and RB4 relay 468 to apply a ground to DTST lead 1061. This ground operates a corresponding relay in Position Circuit 17 to disable certain of the operator's key circuits during data transfer.

The operation of LAC relay 562 (FIG. 25) results in the simultaneous operation of make contacts on CKR relay 453, RA5 relay 461, and RB0 relay 464 to operate LAC relay 1062. As will be described in detail hereafter, LAC relay 1062 prepares the Position Display Circuit 23 for the reception of a seven-digit, local area code, terminating number. Similarly, the operation of NAC relay 560 in FIG. 25 results in the simultaneous closure of make contacts on CKR relay 453, RA5 relay 461, and RB1 relay 465 to operate NAC relay 1063. NAC relay 1063, of course, prepares the Position Display Circuit 23 for the reception of a ten-digit, national area code, terminating number. These two relays are effective only during requests for displays of terminating numbers.

The operation of ROP relay 564 in FIG. 25 results in the simultaneous closure of make contacts on CKR relay 453, RA3 relay 459, and RB1 relay 465 to operate ROP relay 1064. As noted above, ROP relay 1064 causes the flashing of the KEY CLG, KP BACK and ST TMG lamps at Position Circuit 17.

Upon the reception of the first code of any two-code class of call signal, an operate path is completed for First Digit Verification (1DV) relay 1065. Obvious operate paths are made for all classes of calls except CAMA, including Special Toll, Non-coin (RA1, RB0), Dial "0" (RA2, RB0–1), Special Toll, Coin (RA4, RB3–7), and Coin Station (RA6, RB3–7). The operation of 1DV relay 1065 results in the transmission of a verification signal to the Control Signaling Circuit 19 to indicate that this first code has been successfully received and that the second code may now be transmitted. The first code, of course, comprises the class of call code which lights the class lamps in FIG. 29. The second code of this signal comprises the Operator Identified and Identification Failure signals, when required, and which cause the operation of OI relay 1050 or IF relay 1051.

Upon the reception of the second code of the two-code class of call signal, an operate path through make contacts of CKR relay 453, RA0 relay 456, and one of RB6 relay 470 or RB7 relay 471 operates Second Digit Verification (2DV) relay 1066. This operate path includes break contacts of DON relay 294 (FIG. 8) to prevent the operation of this relay when requests for displays of originating numbers have been made. The 2DV relay 1066, when operated, results in the transmission of a verification signal back to Control Signalling Circuit 19 to indicate the reception of the second code.

The operation of PCK relay 585 in FIG. 25 results in the simultaneous operation of make contacts on CKR relay 453, RA3 relay 459, and RB7 relay 471 to operate Pulsing Check Verification (PCKV) relay 1067. PCKV relay 1067 locks through its own make contacts and one of two hold paths, the first including make contacts of DSPC relay 1333 (FIG. 46) and the second including make contacts of DMC relay 1016 and TC relay 1331 (FIG. 46). This relay, when operated, releases the Position Display Circuit 23 and terminates the transmission of the pulsing check signal.

When trouble occurs in Position Display Circuit 23 and TBL relay 1328 (FIG. 46) operates, as can most easily be seen in FIGS. 12 and 13, TBL relay 1328 causes the operation of TA4 relay 364 and TB7 relay 387 to transmit this trouble indication to the Control Signaling Circuit 19. Make contacts on TA4 relay 364 and TB7 relay 387 also complete an operate path for TBL1 relay 1068, which locks through its own make contacts and make contacts on ON relay 472. TBL1 relay 1068, when operated, releases the connected Position Display Circuit 23 and releases any numerical display previously registered at Position Circuit 17.

In FIG. 31 there are shown further transmitting and receiving relay control circuits and lamp control circuits which, in general, correspond to the transmitting control relays of FIG. 26. Thus, the operation of TCBL relay 902 in FIG. 26 results in the simultaneous operation of make contacts on CKR relay 453, RA1 relay 457, and RB7 relay 471 to place a ground on TCBL lead 1070. This ground lights the lamp under the TRFR key.

The operation of TSTP relay 937 in FIG. 26 results in the simultaneous closure of make contacts on CKR relay 453, RA3 relay 459, and RB5 relay 469 to place a ground on TSTP1 lead 1071. This ground is relayed through make contacts on a TSTP key in Position Circuit 17 to TSTP lead 1072. This ground is effective to operate TSTP relay 1073.

It can be seen that the operation of TSTP relay 937 (FIG. 26) results in the operation of TSTP relay 1073 (FIG. 31), provided that the TSTP key is operated. TSTP relay 1073 (FIG. 31), in turn, causes a ground to be placed on TSTP lead 935 (FIG. 26) to operate a corresponding relay in Position Control Circuit 15. Thus, a complete signaling loop can be made through the Position Circuit 17 by the operation of the TSTP key. Testing of the two-digit signaling circuits on loops 103 and 104 is therefore possible under the control of the Position Circuit 17.

The operation of RLBL relay 907 in FIG. 26 results in the simultaneous closure of make contacts on CKR relay 453, RA1 relay 457, and RB5 relay 469 to place a ground on RLBL lead 1074. This ground causes the lamp under the RELEASE BACK key to light. Similarly, the operation of RLFL relay 910 in FIG. 26 causes the simultaneous closure of make contacts on CKR relay 453, RA1 relay 457, and RB6 relay 470 to place a ground on RLFL lead 1075. This ground causes the lamp under the RELEASE FWD key to light.

The operation of the SR key at Position Circuit 17 applies a ground to SR lead 1076 to operate SR relay 1077. This relay, when operated, results in the transmission of a signal to Control Signaling Circuit 19 to operate SR relay 578 (FIG. 25) in the manner previously described.

The operation of the MAKE BUSY key at Position Circuit 17 applies a ground to MB lead 1078 to operate MB relay 1079. MB relay 1079, when operated, causes the transmission of a signal to operate MB relay 911 in FIG. 26 and mark this position as busy in the manner previously described. When so marked, the operation of MBL relay 914 in FIG. 26 causes the simultaneous closure of make contacts on CKR relay 453, RA4 relay 460, and RB2 relay 466 to operate MBL relay 1080. MBL relay 1080 locks through its own make contacts and break contacts of EMBL relay 1083. MBL relay 1080 also applies a ground to MBL lead 1081 to light the MAKE BUSY lamp.

The operation of FMB relay 574 in FIG. 25 results in the simultaneous closure of make contacts on CKR relay 453, RA2 relay 458, and RB4 relay 468 to likewise place a ground on MBL lead 1081. This signal is used to flash the MAKE BUSY lamp when a data transfer failure has occurred.

When the MAKE BUSY key is re-operated to operate MB relay 1079, an operate path is completed for Release Make Busy (RMB) relay 1082 through make contacts of MB relay 1079 and make contacts of MBL relay 1080. When so operated, RMB relay 1082 causes the transmission of a signal to Control Signaling Circuit 19 to operate RMB relay 915 (FIG. 26). The MAKE BUSY mark is thereby released. RMB relay 915 (FIG. 26) also causes the transmission of a signal to Position Signaling Circuit 21 which effects the simultaneous closure of make contacts on CKR relay 453, RA3 relay 459, and RB0 relay 464 to operate Extinguish Make Busy Lamp (EMBL) relay 1083. When so operated, EMBL relay 1083 releases MBL relay 1080 which, in turn, removes the ground from MBL lead 1081 and extinguishes the MAKE BUSY lamp.

The operation of OVLP relay 923 in FIG. 26 causes the operation of CKT relay 400 (FIG. 14) at OVLP make contacts 404 and operates TBO relay 340 (FIG. 11) at the level labeled OVLP. This single digit code is therefore transmitted and causes the operation of RB0 relay 464. Make contacts on RB0 relay 464 and CCW relay 1093 complete the operate path for OVLP relay 1084. As previously noted, OVLP relay 1084 releases the class of call lamp display in FIG. 29. Contacts on OVLP relay 1084 also lock CCW relay 1093 as a verification of the registration of the CAMA Call Waiting signal.

The appearance of a ground on LML lead 918 in FIG. 26 results in the transmission of a signal which simultaneously closes make contacts on CKR relay 463, RA1 relay 457, and RB3 relay 467 to place a ground on LML lead 1085. This ground lights the POS TRFR (Left) lamp. Similarly, a ground on RML lead 920 in FIG. 26 causes the transmission of a signal which results in the simultaneous closure of make contacts on CKR relay 453, RA1 relay 457, and RB1 relay 466 to place a ground on RML lead 1086. This ground lights the POS TRFR (Right) lamp.

The operation of PBA relay 576 in FIG. 25 results in the simultaneous closure of make contacts on CKR relay 453, RA6 relay 462, and RB4 relay 468 to operate PBA relay 1087. This relay, when operated, locks through its own make contacts and parallel break contacts on RA6 relay 462 and RB7 relay 471. When PBA relay 576 (FIG. 25) is thereafter released, a second signal is transmitted to Position Signaling Circuit 21, causing the simultaneous operation of RA6 relay 462 and RB7 relay 471 to release PBA relay 1087.

PBA relay 1087, when operated, applies a ground to PB lead 1088 to the Chief Operator's Administration Circuit 1089. PB lead 1088 is also grounded by make contacts on MBL relay 1080 and by the reception of Position Transfer lamp signals via make contacts on CKR relay 453, RA1 relay 457, and RB1 relay 465 or RB3 relay 467. The chief operator is thus made aware of when the position is busy due to a call in progress, a make busy initiated by the operator, or by a seizure of the speech circuits by one of the immediately adjacent positions.

The operation of PRL relay 928 in FIG. 26 results in the simultaneous closure of make contacts on CKR relay 453, RA4 relay 460, and RB1 relay 465 to place a ground on PRL lead 1090. This ground lights the POS RLS lamp.

The operation of STML relay 931 in FIG. 26 results in the simultaneous closure of make contacts on CKR relay 453, RA5 relay 461, and RB3 relay 467 to place a ground on STML lead 1091. If, in addition to STML relay 931 (FIG. 26), TMSO relay 522, TMS1 relay 523, or TMS2 relay 524 (FIG. 24) is also operated, a ground will be placed on STML lead 1091 via make contacts on CKR relay 453, RA0 relay 456 and RB1 relay 465, RB4 relay 468, or RB5 relay 469. It will be noted that the ground path through the make contacts of RB5 relay 469 also includes break contacts of DON relay 294 (FIG. 8) to prevent lighting of this lamp during a request for a display of an originating number.

If FMB relay 574 (FIG. 25) is operated, STML lead 1091 is grounded through make contacts on CKR relay 453, RA0 relay 456, and RB3 relay 467. This latter ground is intermittent and causes the ST TMG lamp to flash when a data transfer failure occurs. Finally, the operation of ROP relay 1064 (FIG. 30) applies an intermittent ground to STML lead 1091 through make contacts on ON relay 472.

The operation of the CAMA CW key in Position Circuit 17 places a ground on CCW lead 1092 to operate CCW relay 1093. CCW relay 1093 locks through make contacts on OVLP relay 1084 as previously described. CCW relay 1093 also includes a short-circuited winding closed by its own make contacts to render this relay slow to release. Momentary operation of the CAMA CW key will therefore operate CCW relay 1093 which will hold until this signal has been transmitted to the Control Signaling Circuit 19, operate the CCW relay in Position Control Circuit 15, and the verification of this operation has been indicated by the operation of OVLP relay 1084.

The operation of the POS RLS key at Position Circuit 17 applies a ground to PR lead 1094 to operate PR relay 1095. When so operated, PR relay 1095 causes the transmission of a signal to the Control Signaling Circuit 19 to operate the PR relay in the Position Control Circuit 15. PR relay 1095 locks through its own make contacts and make contacts on ON relay 472.

The operation of the ST TMG key in Position Circuit 17 places a ground on STM lead 1096 which operates STM relay 1097. This relay, when operated, produces a signal which results in the application of a ground on STM lead 929 to Position Control Circuit 15 (FIG. 26) to initiate the initial tape entry.

Figure 32:
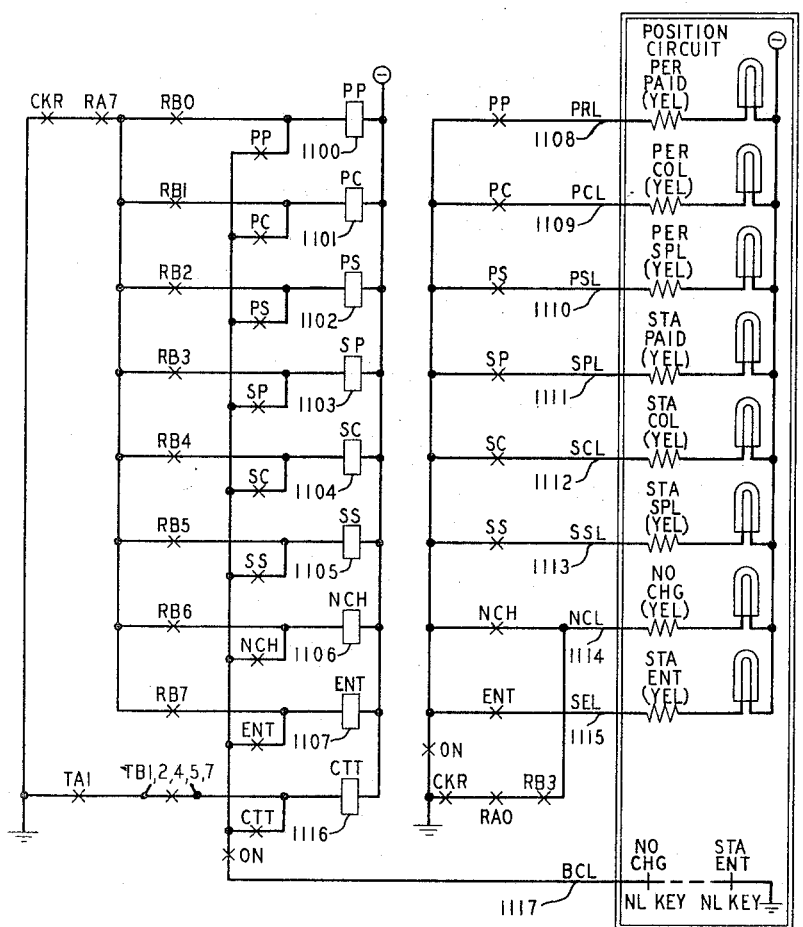

In FIG. 32 there are shown the billing class verification relays and billing class lamp circuits in Position Signaling Circuit 21. The billing class relays 1100 through 1107 are each operated by the simultaneous closure of make contacts on CKR relay 453, RA7 relay 463 and one of RB0 relay 464 through RB7 relay 471. When so operated, these billing class verification relays lock through their own make contacts and make contacts on ON relay 472 (FIG. 22) to Billing Class Lamp (BCL) lead 1117. BCL lead 1117 provides a ground through break contacts on the NO CHG and STATION ENT keys in Position Circuit 17. Thus, the billing class verification signal is registered in one of relays 1100 through 1116 until the position is released (see FIG. 22) or until the NO CHG or the STATION ENT key is depressed.

When operated, relays 1100 through 1107 apply a ground to the respective one of lamp leads 1108 through 1115 to light the corresponding lamp in Position Circuit 17. As was previously noted, the operation of TFL relay 933 (FIG. 26) indicating difficulty in making the initial tape entry, results in the simultaneous closure of make contacts on CKR relay 453, RA0 relay 456 and RB3 relay 467 to apply a ground No Charge Lamp (NCL) lead 1114. The operator thereupon depresses the NO CHG key to insure that the erroneous initial entry is not used for billing purposes.

The transmission of any billing class code except the codes for PERSON PAID, STATION PAID, or NO CHARGE results in the simultaneous closure of make contacts on TA1 relay 361 (FIG. 12) and TB1 relay 381, TB2 relay 382, TB4 relay 384, TB5 relay 385, or TB7 relay 387 (A1 levels, FIG. 13) to complete the operate path for Cancel Trunk Timing (CTT) relay 1116. CTT relay 1116 locks through its own make contacts to the ground on BCL lead 1117. As noted in connection with FIG. 29, transfer contacts on CTT relay 1116 extinguish the flashing RATE lamp on manual class calls.

Figure 33:
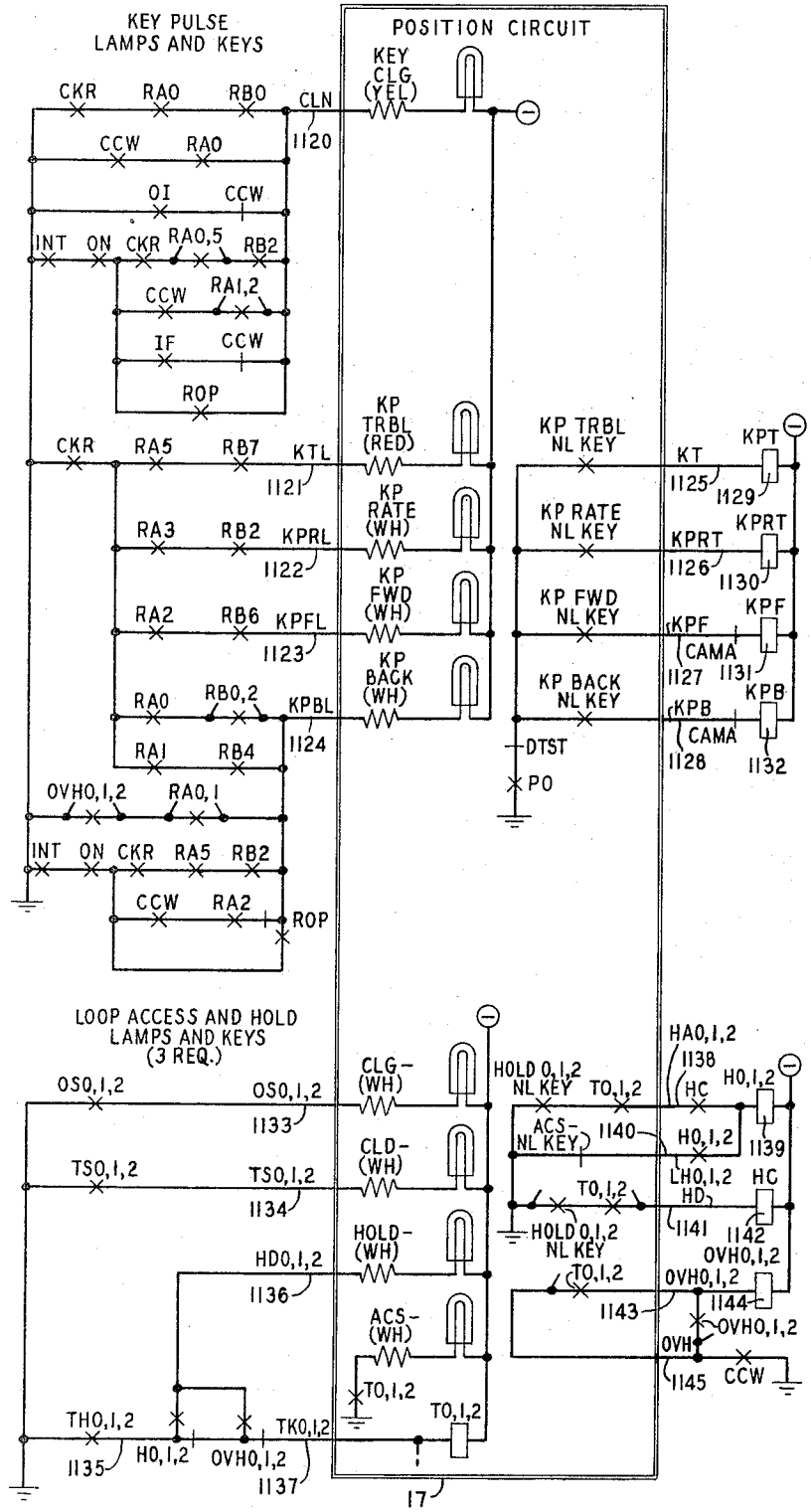

In FIG. 33 there are shown key pulse lamp and key control circuits as well as loop access and hold lamp and key control circuits. Thus, the KEY CLG lamp in Position Circuit 17 is lit by a ground on CLN lead 1120. A ground is provided on CLN lead 1120 by means of a plurality of parallel paths corresponding to the various classes of calls for which the KEY CLG lamp is to be lit. For all CAMA class calls, whether regularly accepted at Position Circuit 17 or received on an overlap basis, the operator must key the calling number in to the CAMA equipment. On Operator Identified CAMA calls, the simultaneous closure of make contacts on CKR relay 453, RA0 relay 456 and RB0 relay 464 provides this ground path. On Operator Identified overlap CAMA calls, this ground is provided through make contacts on CCW relay 1093 (FIG. 31) and RA0 relay 456. On any other class of call requiring Operator Identification, make contacts on OI relay 1050 (FIG. 30) complete a ground path through break contacts on CCW relay 1093.

Similarly, when an identification failure has occured, the KEY CLG lamp is flashed by means of one of a number of paths through make contacts on ON relay 472 and interrupter contacts. Thus, on identification failures in regularly accepted CAMA class calls, make contacts on CKR relay 453, RA0 relay 456 and RB2 relay 466 complete this path. On CAMA class calls taken on an overlap basis, make contacts on CCW relay 1093 and RA1 relay 457 provide this path. On non-CAMA class calls, this path is completed through make contacts on IF relay 1051 (FIG. 30) and break contacts on CCW relay 1093.

The KEY CLG lamp is also flashed whenever the position is reordered. On CAMA class calls, this ground is provided through make contacts on CKR relay 453, RA5 relay 461 and RB2 relay 466. On overlap CAMA class calls, this path is completed through make contacts on CCW relay 1093 and RA2 relay 458. On non-CAMA class calls, this path is completed through make contacts on ROP relay 1064 (FIG. 30).

The operation of KTL relay 972 (FIG. 20) in Control Signalling Circuit 19 results in the simultaneous closure of make contacts on CKR relay 453, RA5 relay 461 and RB7 relay 471 to apply a ground to KTL lead 1121. This ground lights the red KP TRBL lamp. Similarly, the operation of KPRL relay 975 in FIG. 28 results in the simultaneous closure of make contacts on CKR relay 453, RA3 relay 459, and RB2 relay 466 to place a ground on KPRL lead 1122. This ground lights the KP RATE lamp in Position Circuit 17.

The operation of KPFL relay in FIG. 28 results in the simultaneous closure of make contacts on CKR relay 453, RA2 relay 458 and RB6 relay 470 to place a ground on KPFL lead 1123. This ground lights the KP FWD lamp in Position Circuit 17.

The KP BACK lamp in Position Circuit 17 is lit to verify the operation of KP BACK key on non-CAMA class calls when the calling subscriber's number is keyed by the operator, to indicate that the calling subscriber's number is to be keyed into the CAMA equipment on CAMA class calls, and when the position is reordered. The combination of ground paths for KPBL lead 1124 is obvious from FIG. 23 and is in many respects similar to those of CLN lead 1120 and hence will not be described in detail. It should be noted, however, that the KP BACK lamp is flashed only to reorder the position.

The operation of the KP TRBL key in Position Circuit 17 places a ground on Key Trouble (KT) lead 1125 to operate KPT relay 1129. The operation of KPT relay 1129 ultimately results in the placement of a ground on KT lead 970 in FIG. 28.

The operation of the KP RATE key at Position Circuit 17 places a ground on KPRT lead 1126 to operate KPRT relay 1130. The operation of KPRT relay 1130 ultimately results in the placement of a ground on KPRT lead 973 in FIG. 28.

The operation of the KP FWD key in Position Circuit 17 places a ground on KPF lead 1127 to operate KPF relay 1131 through break contacts of CAMA relay 1000 (FIG. 29). The operation of KPF relay 1131 ultimately results in the placement of a ground on KPF lead 976 in FIG. 28.

The operation of the KP BACK key in Position Circuit 17 places a ground on KPB lead 1128 to operate KPB relay 1132 through break contacts on CAMA relay 1000. When operated, KPB relay 1132 ultimately causes the placement of a ground on KPB lead 979 in FIG. 28. Since the operation of the KP FWD and KP BACK keys is not required on CAMA calls, the associated relays are disabled by the CAMA break contacts.

The loop access and hold lamp circuits are also shown in FIG. 33. As previously noted in FIG. 8, direct current signals on loops 100, 101 and 102 control the operation of OS- relays, TH- relays and TS- relays associated with those loops. Make contacts on those relays, in turn, control the lighting of the various loop, supervision, access and hold lamps. Thus, the operation of OS- relay 290 (FIG. 8) place a ground on OS- lead 1133 to light the CLG- line supervisory lamp for that loop. Similarly, the operation of TS- relay 292 in FIG. 8 places a ground on TS- lead 1134 to operate the CLD- line supervisory lamp for that loop. Finally, the operation of TH- relay 291 in FIG. 8 places a ground on lead 1135 which is connected by means of transfer contacts on H- relay 1139 and OVH- relay 1144 to HD- lead 1136 or TK- lead 1137. A ground appearing on HD- lead 1136 lights the HOLD- lamp for the associated loop. A ground on TK- lead 1137 operates the corresponding T- relay in Position Circuit 17 to indicate that the loop is in a talk condition. Make contacts on the T- relay light the ACS- lamp for that loop.

From the above description, it can be seen that a single signal is used at times to signal the hold condition and at times signal the talk condition for each of the three loops. Since these two conditions never occur simultaneously, there is no ambiguity in the use of this signal.

The operation of any one of the HOLD- keys in Position Circuit 17 places a ground on the corresponding HA- lead 1138, provided make contacts on the associated T- relay are also closed. The ground on HA- lead 1138 operates H- relay 1139 through make contacts on HC relay 1142. When so operated, the H- relay locks through its own make contacts to the corresponding LH- lead 1140 which, in turn, is connected to ground through break contacts on the associated ACS- key. The operation of any of the HOLD- keys in combination with the corresponding T- relay also applies a ground to HD lead 1141 to operate HC relay 1142. It can be seen that the operation of a HOLD key operates a corresponding one of the H- relays 1139 and also operates the common hold (HC) relay 1142. As previously noted, the operation of HC relay 1142 ultimately results in the application of a ground to HD lead 991 in FIG. 28.

The operation of a T- relay in Position Circuit 17 also closes a path between the corresponding one of the OVH- leads 1143 and OVH leads 1145. If the CAMA CW key is depressed to operate CCW relay 1093, make contacts on this relay complete the operate path for the OVH- relay 1144. This relay locks through its own make contacts to the same make contacts on CCW relay 1093. Thus, when any loop is in the talk condition, the operation of a CAMA CW key results in an automtaic overlap hold on that loop.

E. *Signaling Codes To Remote Position*

The signaling codes on loops 103 and 104 from Control Signalling Circuit 19 to Position Signaling Circuit 21 are listed below. The contacts necessary to initiate the transmission of these codes are shown in the corresponding levels of the operate paths for the coding relays of FIGS. 10 and 11.

(1) A0–B0: CAMA Call, Operator Identified.
(2) A0–B1: Light ST TMG Lamp, Start Initial Period Timer, Loop 0.
(3) A0–B2: CAMA Call, Identification Failure.
(4) A0–B3: Flash ST TMG and NO CHG Lamps.
(5) A0–B4: Light ST TMG Lamp, Start Initial Period Timer, Loop 1.
(6) A0–B5:
   (a) DON relay 274 (FIG. 7) not operated. Light ST TMG Lamp, Start Initial Period Timer, Loop 2.
   (b) DON relay 274 (FIG. 7) operated. Light CALLING AREA CODE (OA0) Lamp.
(7) A0–B6:
   (a) DON relay 274 (FIG. 7) not operated. Non-CAMA Call, Operator Identified.
   (b) DON relay 274 (FIG. 7) operated. Light CALLING AREA CODE (OA1) Lamp.
(8) A0–B7:

(a) DON relay 274 (FIG. 7) not operated. Non-CAMA Call, Identification Failure.
(b) DON relay 274 (FIG. 7) operated. Light CALLING AREA CODE (OA2) Lamp.
(9) A1–B0: Special Toll, Non-Coin, Call.
(10) A1–B1: Light POS TRFR (Right) Lamp.
(11) A1–B2: Release MINUTES and CHARGE Displays.
(12) A1–B3: Light POS TRFR (Left) Lamp.
(13) A1–B4: Light KP BACK Lamp.
(14) A1–B5: Light RELEASE BACK Lamp.
(15) A1–B6: Light RELEASE FWD Lamp.
(16) A1–B7: Light TRFR Lamp.
(17) A2–B0: DIAL "0," COIN, CALL.
(18) A2–B1: DIAL "0," COIN, Recall Call.
(19) A2–B2: DIAL "0," NON-COIN, Call.
(20) A2–B3: DIAL "0," NON-COIN, Recall Call.
(21) A2–B4: Flash MAKE BUSY Lamp.
(22) A2–B5: Operate OUT Relay 1058 (FIG. 30).
(23) A2–B6: Light KP FWD Lamp.
(24) A2–B7: Release OUT Relay 1058 (FIG. 30).
(25) A3–B0: Extinguish MAKE BUSY Lamp.
(26) A3–B1: Non-CAMA Call, Reorder Position.
(27) A3–B2: Light KP RATE Lamp.
(28) A3–B3: Ground STP Lead 1060 (FIG. 30).
(29) A3–B4: Ground DTST Lead 1061 (FIG. 30).
(30) A3–B5: Position Test.
(31) A3–B6: Outpulsing Timeout.
(32) A3–B7: Outpulsing Check Verification.
(33) A4–B0: Spare.
(34) A4–B1: Light POS RLS Lamp.
(35) A4–B2: Light MAKE BUSY Lamp.
(36) A4–B3: Special Toll Coin Call, Manual Rate.
(37) A4–B4: Special Toll Coin Call, Automatic Rate.
(38) A4–B5: Special Toll Coin Call, Notify.
(39) A4–B6: Special Toll Coin Call, Charges Due.
(40) A4–B7: Special Toll Coin Call, Recall.
(41) A5–B0: Local Area Code Called Number.
(42) A5–B1: National Area Code Called Number.
(43) A5–B2: CAMA Call, Recorder Position.
(44) A5–B3: Light ST TMG Lamp.
(45) A5–B4: Start Initial Period Timer, Loop 0.
(46) A5–B5: Start Initial Period Timer, Loop 1.
(47) A5–B6: Start Initial Period Timer, Loop 2.
(48) A5–B7: Light KP TRBL Lamp.
(49) A6–B0: Spare.
(50) A6–B1: Coin Call, Change MINUTES and CHARGE Displays.
(51) A6–B2: Operate PO Relay 223 (FIG. 4).
(52) A6–B3: Coin Station-to-Station Call, Manual Rate.
(53) A6–B4:
  (a) 1DV Relay 581 (FIG. 25) Not Operated. Coin Station-to-Station Call, Automatic Rate.
  (b) 1DV Relay 581 (FIG. 25) Operated. Light BUSY Lamp in Chief Operator's Administration Circuit.
(54) A6–B5: Coin Station-to-Station Call, Notify.
(55) A6–B6: Coin Station-to-Station Call, Charges Due.
(56) A6–B7:
  (a) 1DV Relay 581 (FIG. 25) Not Operated. Coin Station-to-Station Call, Recall.
  (b) 1DV Relay 581 (FIG. 25) Operated. Extinguish BUSY Lamp in Chief Operator's Administration Circuit.
(57) A7–B0: Light PERSON PAID Lamp.
(58) A7–B1: Light PERSON COL Lamp.
(59) A7–B2: Light PERSON SPL Lamp.
(60) A7–B3: Light STATION PAID Lamp.
(61) A7–B4: Light STATION COL Lamp.
(62) A7–B5: Light STATION SPL Lamp.
(63) A7–B6: Light NO CHG Lamp.
(64) A7–B7: Light STATION ENT Lamp.

These codes are transmitted from Control Signaling Circuit 19 in the manner described with respect to FIG. 9 and the sequence charts of FIGS. 54 through 68.

On Overlap CAMA calls, i.e., CAMA calls handled while another call is being held for further operator assistance, single digit codes are transmitted, CKT relay 400 (FIG. 14) being operated by OVLP contacts 404. These single digit codes are shown at OVLP levels in FIGS. 10 and 11.

(1) A0: Overlap CAMA Call, Operator Identified.
(2) A1: Overlap CAMA Call, Identification Failure.
(3) A2: Overlap CAMA Call, Reorder Position.
(4) B0: Verification of Operation of CAMA CW Key.

F. *Signaling Codes from Remote Position*

The signaling codes on loops 103 and 104 from Position Signaling Circuit 21 to Control Signaling Circuit 19 are listed below. The contacts necessary to initiate the transmission of these codes are shown in the corresponding levels of the operate paths for the coding relays of FIGS. 12 and 13.

(1) A0–B0: RELEASE BACK Key Operated.
(2) A0–B1: MAKE BUSY Key Operated.
(3) A0–B2: Pulsing to Position Display Complete.
(4) A0–B3: COIN COL Key Operated.
(5) A0–B4: CNL TMG Key Operated.
(6) A0–B5: CAMA CW Key Operated.
(7) A0–B6: RELEASE FWD Key Operated.
(8) A0–B7: RING FWD Key Operated.
(9) A1–B0: PERSON PAID Key Operated.
(10) A1–B1: PERSON COL Key Operated.
(11) A1–B2: PERSON SPL Key Operated.
(12) A1–B3: STATION PAID Key Operated.
(13) A1–B4: STATION COL Key Operated.
(14) A1–B5: STATION SPL Key Operated.
(15) A1–B6: NO CHG Key Operated.
(16) A1–B7: STATION EWT Key Operated.
(17) A2–B0: TRFR Key Operated.
(18) A2–B1: KP FWD Key Operated.
(19) A2–B2: KP BACK Key Operated.
(20) A2–B3: RING BACK Key Operated.
(21) A2–B4: First Digit Verification.
(22) A2–B5: POS RLS Key Operated.
(23) A2–B6: Make Busy Lamp Verification.
(24) A2–B7: KP TRBL Key Operated.
(25) A3–B0: Spare.
(26) A3–B1: Second Digit Verification.
(27) A3–B2: ST TMG Key Operated.
(28) A3–B3: One of HOLD- Keys Operated.
(29) A3–B4: Spare.
(30) A3–B5: Verification of Operation of OUT Relay 1058 (FIG. 30).
(31) A3–B6: Spare.
(32) A3–B7: Verification of release of PBA Relay 1087 (FIG. 31).
(33) A4–B0: Verification of Operation of PBA Relay 1087 (FIG. 31).
(34) A4–B1: ST Key Operated.
(35) A4–B2: Spare.
(36) A4–B3: ACS0 Key Operated.
(37) A4–B4: ACS1 Key Operated.
(38) A4–B5: Spare.
(39) A4–B6: ACS2 Key Operated.
(40) A4–B7: Position Display Trouble.
(41) A5–B0: POS TRFR (Right) Key Operated.
(42) A5–B1: COIN RET Key Operated.
(43) A5–B2: POS TRFR (Left) Key Operated.
(44) A5–B3: SR Key Operated.
(45) A5–B4: Billing Class Lamp Verification.
(46) A5–B5: Position Test.
(47) A5–B6: MAKE BUSY Key Reoperated.
(48) A5–B7: KP RATE Key Operated.

V. MULTIFREQUENCY SIGNALING CIRCUITS

In FIGS. 34 through 42 there are shown detailed circuit diagrams of Control Pulsing Circuit 22 (FIG. 1) together with the associated portions of the Control Signaling Circuit 19. Similarly, in FIGS. 43 through 50, there are shown detailed circuit diagrams of the Position Display Circuit 23 and the associated portions of the Position Signaling Circuit 21. As was noted with reference to FIG. 5, these circuits are used for high speed multifrequency signaling between the tandem office location of Position Control Circuit 15 and the remote location of the Position Control Circuit 17.

In FIGS. 51 and 52 there are shown time-out and time-out control circuits which are located at Control Signaling Circuit 19 and are used to notify the operator that a Control Pulsing Circuit 22 has not been seized or has not completed its function in the time allotted. In FIG. 53 there is shown a block diagram of a multifrequency receiver suitable for use in both Control Pulsing Circuit 22 and Position Display Circuit 23. These circuits will be described in greater detail hereinafter.

A. *Control Pulsing Circuits (FIGS. 34–42)*

Figure 34:
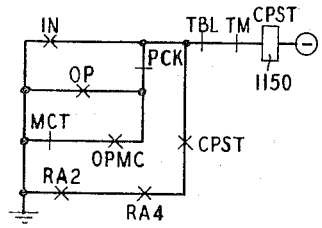

(1) *Control Pulsing Circuit Seizure (FIGS. 34–37).*—
In FIG. 34 there is shown Control Pulsing Start (CPST) relay 1150 together with the operate paths for this relay. The operation of CPST relay 1150 initiates the search for an available Control Pulsing Circuit 22 and hence is operated for multifrequency signaling in both directions.

When a Control Pulsing Circuit 22 is required for inpulsing from the remote Position Circuit 17, make contacts on IN relay 1201 (FIG. 38) complete the operate path for CPST relay 1150 through break contacts on TBL relay 586 (FIG. 25) and TM relay 1419 (FIG. 51). The break contacts on TM relay 1419 release CPST relay 1150 when a time-out occurs in the search for or use of a Control Pulsing Circuit 22. The break contacts on TBL relay 586 release CPST relay 1150 when trouble occurs at the Position Display Circuit 23 due to a pulsing error or other fault.

On outpulsing from the Control Pulsing Circuit 22 to the Position Display Circuit 23, make contacts on OP relay 1209 (FIG. 38) or OPMC relay 1208 (FIG. 38) operate to complete alternate operate paths for CPST relay 1150. The make contacts on OP relay 1209 operate when a request has been made by the operator for a display of the originating number, terminating number or the rate code. The make contacts on OPMC relay 1208 close when an automatic display of time and charges accompanies a class of call information on coin class calls. The operate path through OPMC relay 1208 also includes break contacts on MCT relay 1429 (FIG. 52) to release this operate path when an access lamp is flashed to tell the operator that an outpulsing trouble or time-out has occurred, and the ACS- key is depressed.

The outpulsing operate paths for CPST relay 1150 are made through break contacts on PCK relay 585 (FIG. 25) and are therefore released when the appropriate information has been received and registered at the remote Position Signaling Circuit 21 or Position Circuit 17.

When operated for inpulsing or outpulsing, CPST relay 1150 locks through its own make contacts and make contacts on RA2 relay 408 (FIG. 16) and RA4 relay 410 (FIG. 16). CPST relay 1150 will therefore remain operated even after the operate paths are reopened as long as one of the key pulse control keys or access keys is operated.

Figure 35:
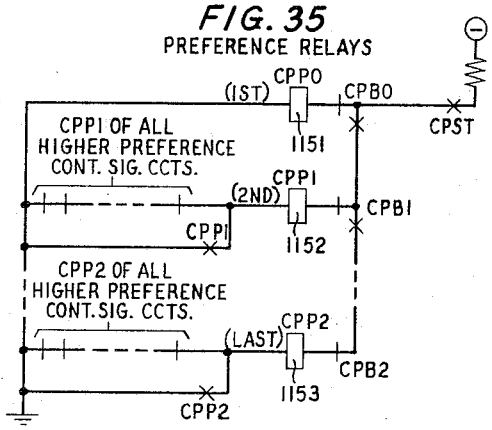

In FIG. 35 there is shown a detailed circuit diagram of the preference relay circuits for selecting one Control Pulsing Circuit 22 out of a plurality of such circuits available to Control Signaling Circuit 19. Each of the Control Pulsing Circuits 22 has associated therewith a Control Pulsing Preference (CPP-) relay such as CPP0 relay 1151, CPP1 relay 1152 and CPP2 relay 1153. Make contacts on CPST relay 1150 apply operating potential to the coil of CPP0 relay 1151, provided the transfer contacts on the Control Pulsing Busy (CPB-) relay for that Control Pulsing Circuit are not operated. Hence Control Pulsing Circuit #0 (see FIG. 5) is the first preference for this particular Control Signaling Circuit 19.

If Control Pulsing Circuit #0 is already busy, the CPB0 transfer contacts will transfer this operate potential to the next succeeding preference CPP1 relay 1152. CPP1 relay 1152 will therefore operate, provided the break contacts on corresponding CPP1 relays of all higher preference Control Signaling Circuits are not operated. These break contacts insure that one and only one Control Signaling Circuit is connected to any particular Control Pulsing Circuit at one time. CPP1 relay 1152 locks through its own make contacts to ground.

In a similar manner, if the CPB1 transfer contacts are operated, the CPST operate potential is transferred to the next succeeding preference relay which is operated through break contacts on preference relays of all higher preference Control Signaling Circuits. The number of Control Pulsing Circuits 22 included in the group from which Control Signaling Circuit 19 makes its selection depends on the size of the group of Control Signaling Circuits 19 to be served by these Control Pulsing Circuits. In a typical installation, for example, a group of thirty-three Control Signaling Circuits may be adequately serviced with only four to seven Control Pulsing Circuits.

The preference chain of FIG. 35 is arranged with Control Pulsing Circuit #0 as the first preference Control Pulsing Circuit, Control Pulsing Circuit #1 as the second preference Control Pulsing Circuit, and Control Pulsing Circuit #2 as the last preference. It is to be noted, however, that other Control Signaling Circuits are arranged with other preference sequences in order to distribute the load more or less evenly between the various Control Pulsing Circuits.

Figure 36:
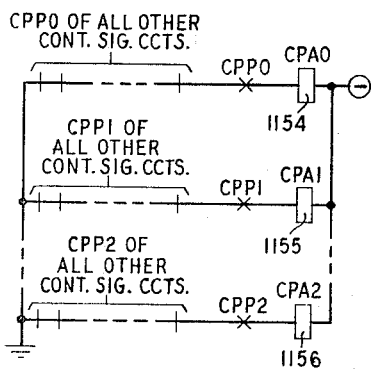

In FIG. 36 there is shown a circuit diagram of the connector relays for connecting Control Signaling Circuit 19 to the various Control Pulsing Circuits 22. Thus, CPA0 relay 1154 serves to connect Control Signaling Circuit 19 to Control Pulsing Circuit #0, CPA1 relay 1155 to Control Pulsing Circuit #1 and CPA relay 1156 to Control Pulsing Circuit #2.

CPA0 relay 1154 is operated through make contacts on CPP0 preference relay 1151 (FIG. 35) and break contacts on the preference relays for Control Pulsing Circuit #0 in all other Control Signaling Circuits. These break contacts provide added assurance that one and only one Control Pulsing Circuit can be connected to any Control Signaling Circuit. The double lockout chains of FIGS. 35 and 36 together insure that the lockout is effective irrespective of the timing of the individual requests for a Control Pulsing Circuit.

The CPA1 connector relay 1155 is similarly operated through make contacts on CPP1 relay 1152 and through break contacts on the CPP1 relays of all other Control Signaling Circuits. Finally, CPA2 relay 1156 is operated by make contacts on CPP2 relay 1153 and through break contacts on the CPP2 relays and all other Control Signaling Circuits.

Figure 37:
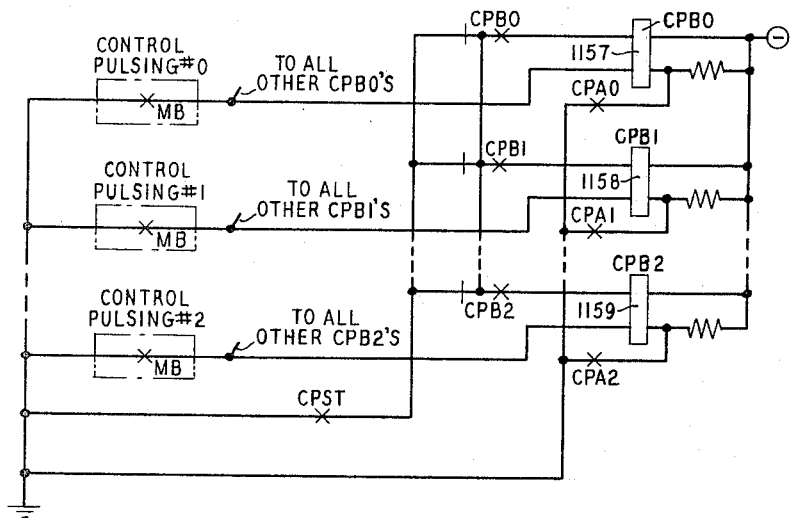

In FIG. 37 there are shown the Control Pulsing Busy (CPB-) relays for the various Control Pulsing Circuits. Thus Control Pulsing Circuit #0 has associated therewith CPB0 busy relay 1157, Control Pulsing Circuit #1 has associated therewith CPB1 busy relay 1158 and Control Pulsing Circuit #2 has associated therewith CPB2 relay 1159. Each of these busy relays includes two windings and is operated by make contacts on the Make Busy (MB) relay 1230 (FIG. 38) in the associated Control Pulsing Circuits. Thus CPB0 relay 1157 is operated by make contacts on an MB relay such as MB relay 1239 in FIG. 39. When so operated, CPB0 relay 1157 operates the transfer contacts in the operate path of FIG. 35 and locks its upper winding to make contacts on CPST relay 1150.

When Control Pulsing Circuit #0 is actually selected by Control Signaling Circuit 19, make contacts on CPA0 relay 1154 short-circuit the lower winding of CPB0 relay 1157 to prevent the operation of the CPB0 busy relay 1157 associated with the selected Control Pulsing Circuit #0 when the MB relay contacts close. Thus the CPB- relay associated with the selected Control Pulsing Circuit does not operate and provides a lock path for the other CPB- relays.

If Control Pulsing Circuit #0 has already been seized by a different Control Signaling Circuit 19, or if Control Pulsing Circuit #0 has been made busy by means of a jack provided for this purpose, the operation of the transfer contacts on CPB0 relay 1157 transfer the operating potential in the preference circuit of FIG. 35 to the next order preference Control Pulsing Circuit, Control Pulsing Circuit #1. In this way, only the highest order preference idle Control Pulsing Circuit is seized.

(2) *Control Pulsing Control (FIGS. 38–39).*—In FIG. 38 there is shown a portion of Control Pulsing Circuit 22 and the associated circuits of the Control Signaling Circuit 21. On impulsing from the Position Display Circuit 23 to the Control Pulsing Circuit 22, a ground is placed on IN lead 1200 to operate IN relay 1201. IN relay 1201 locks through its own make contacts and make contacts on ST relay 985 (FIG. 28). When Control Pulsing Circuit 22 is connected by means of connector 40 (CPA- connector relay of FIG. 36), make contacts on IN relay 1201 complete the operate path for KP relay 1202 in Control Pulsing Circuit 22. As will be described hereinafter, KP relay 1202 enables the multifrequency receiver to receive multifrequency codes. Simultaneously, make contacts on IN relay 1201 apply a ground to IN lead 1203 to operate IN relay 1204 in Control Pulsing Circuit 22.

Figure 40:
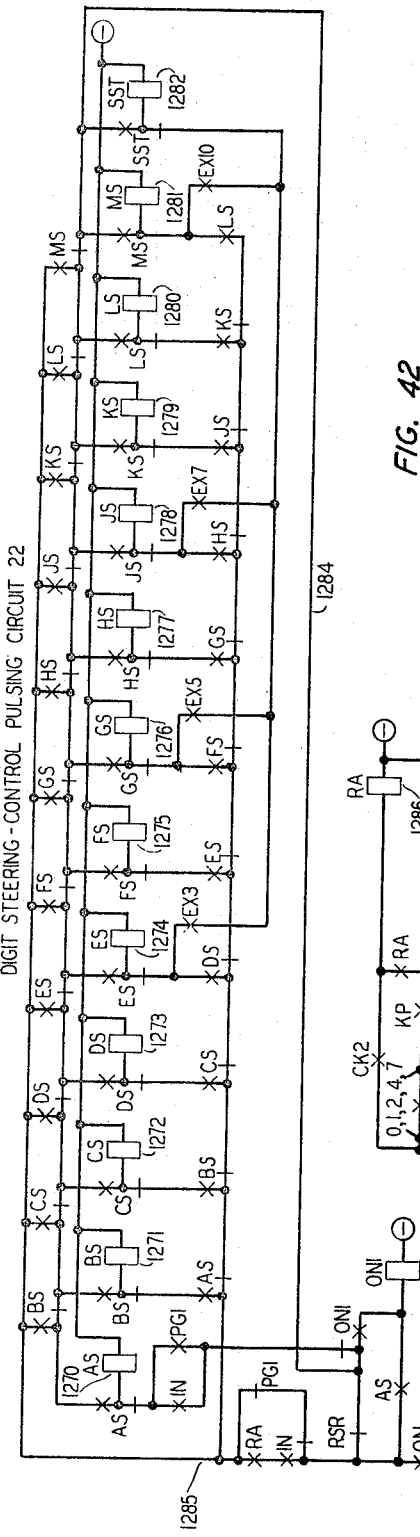

Transfer contacts on IN relay 1201 also transfer OUT lead 1205 to the control of make contacts on RSR relay 982 (FIG. 28). Simultaneously, transfer contacts on IN relay 1204 transfer the Control Pulsing Circuit end of OUT lead 1205 to the operate path for RSR relay 1206. The operate path for RSR relay 1206 also includes make contacts on ON1 relay 1283 (FIG. 40) and break contacts on AS relay 1270 (FIG. 40). As will be described hereinafter, the break contacts on AS relay 1270 and the make contacts on ON1 relay 1283 cooperate to prevent the operation of RSR relay 1206 until after the first digit has been received at Control Pulsing Circuit 22. At any time thereafter, the operation of one of the key pulse control keys at the Position Circuit 17 will operate RSR relay 982 to place a ground on OUT lead 1205 and operate RSR relay 1206. RSR relay 1206, in turn, releases the digits thus far registered and prepares the circuits for the reception of new key-pulsed multifrequency digits.

Outpulsing from the Control Pulsing Circuit 22 to Position Display Circuit 23 is initiated in one of two ways. First, for automatic displays of time and charges, a ground is placed on OPMC lead 1207 from Position Control Circuit 15 to operate OPMC relay 1208. Secondly, on requests for displays of originating numbers, terminating numbers or rate codes, an operate path is completed by way of make contacts on DON relay 274, DTN relay 276 or DRT relay 272 (FIG. 7), respectively, to operate OP relay 1209. The operation of either OPMC relay 1208 or OP relay 1209 completes an operate path for OPA relay 1210. OPA relay 1210, when operated, transfers GO lead 1211 to make contacts on GO relay 280 (FIG. 7). Make contacts on OPA relay 1210 also apply a ground to OUT lead 1205 to operate OUT relay 1212.

The Control Pulsing Circuit Off Normal (ON) relay 1213 is operated on both inpulsing and outpulsing. For inpulsing, make contacts on KP relay 1202 and break contacts on SP relay 1443 (FIG. 53) complete the operate path for ON relay 1213. On outpulsing, transfer contacts on OUT relay 1212, make contacts on PG1 relay 1290 (FIG. 42) and make contacts on one of EX3 relay 1216, EX5 relay 1217, EX7 relay 1220 or EX10 relay 1221 complete the operate path for ON relay 1213. When so operated, ON relay 1213 locks through its own make contacts and make contacts on IN relay 1204 or OUT relay 1212.

An EXB control lead 1214 is connected directly to ground through make contacts on DRT relay 272 (FIG. 7), or through make contacts on OPMC relay 1208 and a current limiting resistor 1215. In Control Pulsing Circuit 22, EXB lead 1214 is connected through a series combination of the operate coils of EX3 marginal relay 1216 and EX5 marginal relay 1217. These marginal relays are arranged such that EX3 relay 1216 will operate only when EXB lead 1214 is connected directly to ground through the make contacts on DRT relay 272. Similarly, EX5 relay 1217 is arranged to operate only when EXB lead 1214 is connected to ground through limiting resistor 1215 and the make contacts on OPMC relay 1208.

Similarly, EXA lead 1218 is connected directly to ground through make contacts on DON relay 274, or through make contacts on DTN relay 276 and LAC relay 562 (FIG. 25). EXA lead 1218 can also be connected to ground through limiting resistor 1219 and make contacts on DTN relay 276 and NAC relay 560 (FIG. 25). In Control Pulsing Circuit 22, EXA lead 1218 is connected to the series combination of the operate coils of EX7 relay 1220 and EX10 relay 1221. Relays 1220 and 1221 are marginal relays arranged such that EX7 relay 1220 operates only when a direct ground is placed on EXA lead 1218 through make contacts on DON relay 274 or through make contacts on DTN relay 276 and LAC relay 562. Similarly, EX10 relay 1221 operates only if ground is placed on EXA lead 1218 through a current limiting resistor 1219 via contacts on DTN relay 276 and NAC relay 560.

From the above description of the connections to EXA lead 1218 and EXB lead 1214, it can be seen that one of the four relays 1216, 1217, 1220 or 1221 will operate, depending on the number of digits to be transmitted to the Position Display Circuit 23. Since the rate code is a three-digit code, EX3 relay 1216 is operated to permit the transmission of only three digits. If the three-digit charge information and the two-digit time display are to be transmitted, EX5 relay 1217 is operated to permit the transmission of only five digits. If a seven-digit display of an originating subscriber's number or of a terminating subscriber's number within the same local code area is to be transmitted, EX7 relay 1220 is operated to permit transmission of only seven digits. Finally, if a ten-digit terminating number including a national area code is to be transmitted, EX10 relay 1221 is operated to permit the transmission of ten digits. The EX- relays are used to control the digit steering circuit of FIG. 40 in a manner to be hereinafter described.

When OPA relay 1210 is operated, transfer contacts on this relay transfer GO lead 1211 to make contacts on GO relay 280 (FIG. 7). GO lead 1211 is connected through transfer contacts on OUT relay 1212 and make contacts on SY relay 1261 (FIG. 39) to GO relay 1222 in Control Pulsing Circuit 22. This operate path for GO relay 1222 is utilized only on outpulsing, and the make contacts on SY relay 1261 close only when the first digit of the code to be outpulsed has been registered at Control Pulsing Circuit 22 in RC- relays 1253–1257 shown in FIG. 39. When so operated, GO relay 1222 locks through its own make contacts and make contacts on ON relay 1213.

GO lead 1211 is also used as an operate path for STPG relay 1223 on inpulsing. During inpulsing, the transfer contacts on OPA relay 1210 and OUT relay 1212 are not operated and hence STPG relay 1223 is connected via GO lead 1211 to an operate path including break contacts on RSR relay 1206 and make contacts on ON1 relay 1283 (FIG. 40). The make contacts on ON1 relay 1283 close when the Control Pulsing Circuit 22 is ready to receive multifrequency digits from Position Display Circuit 23. The break contacts on RSR relay 1206 permit this operate path to be interrupted when one of the key pulse control keys is depressed.

Figure 41:
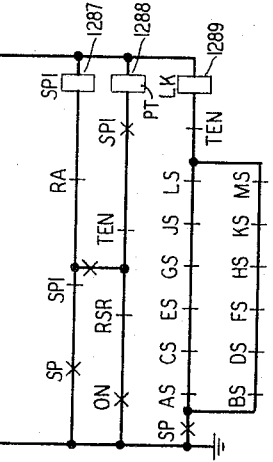

As will be described in connection with FIG. 53, the reception of a three frequency code at the multifrequency receiver in Control Pulsing Circuit 22 operates make contacts on CK3 relay 1455 to operate Pulsing Error (PE) relay 1224. A second operate path for PE relay 1224 can be completed through make contacts on Pulsing Trouble (PT) relay 1288 and SP1 relay 1287 (FIG. 41), and break contacts on RA relay 1286 (FIG. 41). This operate path is completed whenever a signal arrives at the Control Pulsing Circuit 22, but CK2 relay 1454 (FIG. 53) does not operate.

PE relays 1224, when operated, locks through its own make contacts and make contacts on ON relay 1213. PE relay 1224 may be released by way of break contacts on RSR relay 1206 when one of the key pulse control keys is depressed. When operated, PE relay 1224 places a ground on PE lead 1225 to Position Control Circuit 15. This ground operates a corresponding PE relay in Position Control Circuit 15 to flash the key pulse lamps as discussed in connection with FIG. 28. A ground is also placed on PE lead 1225 by the simultaneous operation of make contacts on STPG relay 1223 and TM relay 1419 (FIG. 51). These contacts close when a time-out occurs on inpulsing to the Control Pulsing Circuit 22.

Outpulsing Check (OCK) relay 1227 is operated from a ground on CK lead 1228 only during the outpulsing mode because of break contacts on IN relay 1201 and IN relay 1204. CK lead 1228 provides an operate path for this relay in Control Pulsing Circuit 22 by way of break contacts on IN relay 1204 and make contacts on ON1 relay 1283 (FIG. 40). OCK relay 1227, when operated, indicates that a Control Pulsing Circuit has been seized, and is ready to transmit multifrequency codes.

Make contacts on RMC relay 516 (FIG. 24) complete an operate path for RMC1 relay 1229 which locks through its own make contacts and break contacts on PCK relay 585 (FIG. 25). When operated, RMC relay 516 transmits a signal to the Position Signaling Circuit 21 to release the minutes and charge displays because they are erroneous. The operation of RMC1 relay 1229 prepares these circuits for the transmission of new minutes and charge information to the Position Circuit 17. As can be seen at level B1 of TA6 relay 326 (FIG. 10) and level A6 of TB1 relay 341 (FIG. 11), the operation of RMC1 relay 1229, followed by the release of RMC relay 516 and GO relay 280 (FIG. 7), results in the transmission of a code to Position Signaling Circuit 21 to reoperate DMC relay 1016 (FIG. 29) and initiate a new display.

When Control Pulsing Circuit 22 is seized for inpulsing or outpulsing, Make Busy (MB) relay 1230 is operated via make contacts on IN relay 1204, OUT relay 1212, or ON relay 1213. MB relay 1230 may also be operated by means of an MB jack so that the Control Pulsing Circuit can be taken out of service for testing or maintenance.

Figure 39:
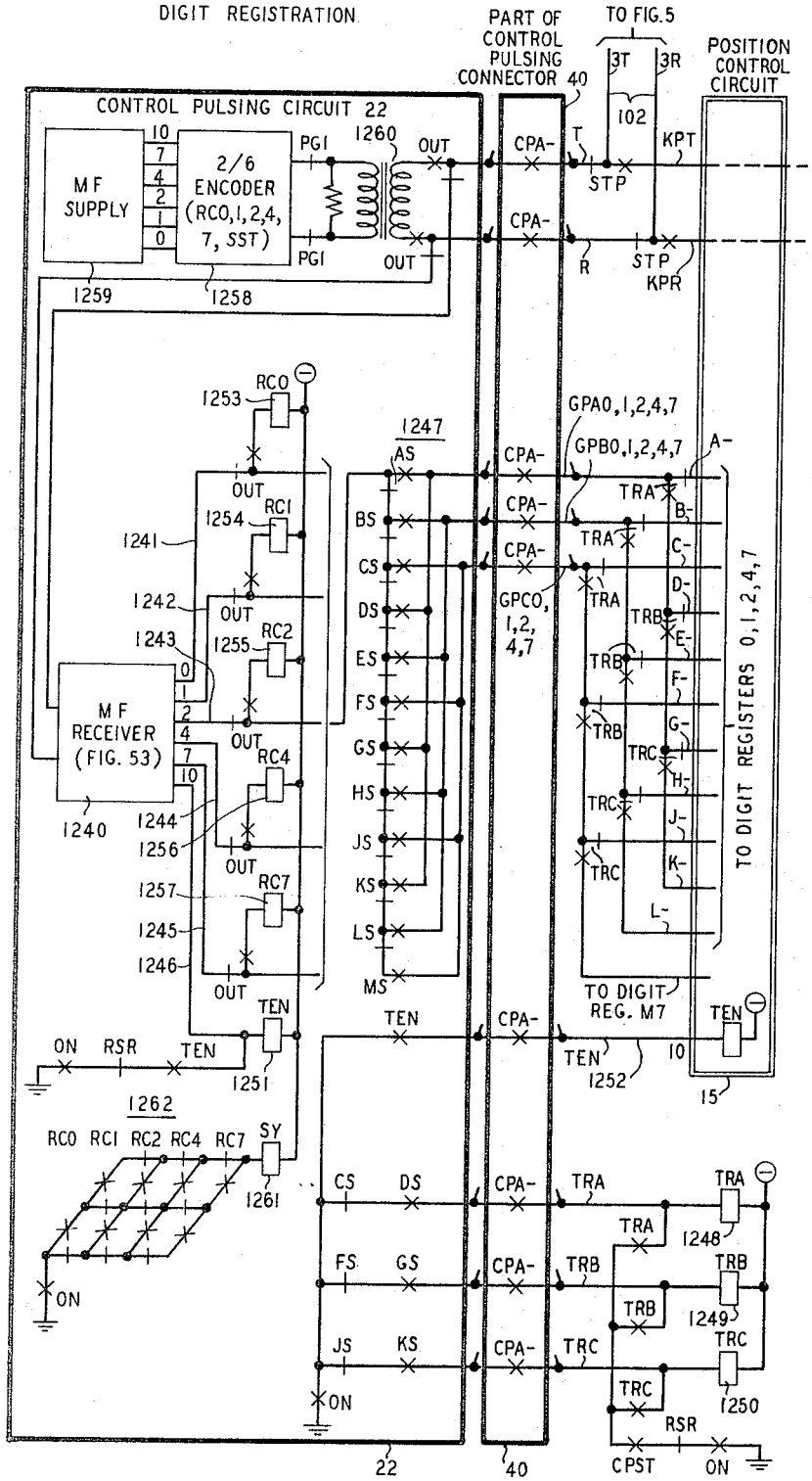

In FIG. 39 there is shown a further portion of the Control Pulsing Circuit 22 including the multifrequency transmission paths for inpulsing and outpulsing. During inpulsing, multifrequency codes received on loop 102 from the operator's multifrequency key pulse 110 at Position Circuit 17 are applied to a multifrequency receiver 1240 which will be described in detail in connection with FIG. 53. This transmission path includes transfer contacts on STP relay 988 (FIG. 28) and transfer contacts on OUT relay 1212 (FIG. 38). Multifrequency receiver 1240 provides, on output leads 1241 through 1246, ground indications of the particular frequencies 0, 1, 2, 4, 7, or 10, received. These ground indications are transferred by way by transfer contacts on OUT relay 1212 to the digit steering contacts 1247.

The digit steering contacts 1247 are shown for only one of the five frequency leads which may be grounded by multifrequency receiver 1240. Similar contact arrangements are, of course, provided for each of the other output leads from receiver 1240.

In order to reduce the number of leads between Control Pulsing Circuit 22 and Control Signaling Circuit 19, three transfer relays, TRA relay 1248, TRB relay 1249, and TRC relay 1250 are provided. The first three digits received at receiver 1240 are transferred, respectively, via contacts on AS relay 1270, BS relay 1271, and CS relay 1272 (FIG. 40) to corresponding A-, B-, and C- register relays in Position Control Circuit 15.

Following the registration of the third digit, DS relay 1273 operates and CS relay 1272 releases to complete the operate path for TRA relay 1248. Transfer contacts on TRA relay 1248 transfer the GPA-, GPB-, and GPC- digit leads to D-, E-, and F- register relays, respectively, in Position Control Circuit 15. Similarly, following the reception of the sixth digit, TRB relay 1249 operates to transfer the GPA-, GPB-, and GPC- leads to the next three register relays in Position Control Circuit 15. Finally, following the ninth digit, TRC relay 1250 operates to transfer the GPA-, GPB-, and GPC- leads to the last three register relays in Position Control Circuit 15. TRA relay 1248, TRB relay 1249, and TRC relay 1250 each lock through its own make contacts, make contacts on CPST relay 1150 (FIG. 34), break contacts on RSR relay 982 (FIG. 28), and make contacts on ON relay 419 (FIG. 17).

Following the final digit of the received multifrequency code, a special start code places a ground on output lead 1246 from multifrequency receiver 1240 to operate TEN relay 1251. TEN relay 1251 locks through its own make contacts, breaks contacts on RSR relay 982, and make contacts on ON relay 1214 (FIG. 38). When so operated, TEN relay 1251 places a ground on TEN lead 1252 to operate a corresponding relay in Position Control Circuit 15. As will be noted hereinafter, the operation of TEN relay 1251 marks the termination of the received multifrequency code and hence releases the Control Pulsing Circuit 22.

During outpulsing, each digit to be transmitted is received at Control Pulsing Circuit 22 via the same digit leads GPA-, GPB-, and GPC-, and is routed by the same steering relays of FIG. 40 to the appropriate RC-transmitting control relays 1253 through 1257 by way of the operated transfer contacts on OUT relay 1212. When so operated, relays 1253 through 1257 operate appropriate contacts in multifrequency encoder 1258 to connect the appropriate alternating current signals from multifrequency supply 1259 to loop 102. This multifrequency signaling path includes break contacts on PG1 relay 1290 (FIG. 42), repeating coil 1260, the make portion of transfer contacts on OUT relay 1212, and the break portion of transfer contacts on STP relay 988 (FIG. 28).

The steering matrix 1247 and the transfer relays 1248 through 1250 operate in exactly the same manner on outpulsing as on inpulsing to sequentially connect the digit leads GPA-, GPB-, and GPC- through the appropriate steering relay contacts to the transmitting control relays 1253 through 1257.

A synchronization (SY) relay 1261 is provided in Control Pulsing Circuit 22 to insure that a multifrequency code is not transmitted until a digit has been registered in two, and only two, of the transmitting control relays 1253 through 1257. Thus, checking matrix 1262 insures that this condition obtains before SY relay 1261 is operated through make contacts on ON relay 1213 (FIG. 38).

Inpulsing from Position Signaling Circuit 21 may also follow a direct path through the transfer contacts on STP relay 988 (FIG. 28) to Position Control Circuit 15 and thence directly to delayed call trunks for transmission to a remote office. This transmission path is used on delayed calls initiated by the operator and does not require registration of the digits at Position Control Circuit 15.

(3) *Control Pulsing Digit Control (FIGS. 40–42).*—
In FIG. 40 there are shown the digit steering relays 1270 through 1282. In general, these steering relays control the routing of up to twelve two-out-of-five codes plus a start signal. During inpulsing, AS relay 1270 is operated via make contacts on IN relays 1204 (FIG. 38), the break portion or transfer contacts on ON1 relay 1283 and break contacts on RSR relay 1206 (FIG. 38). When so operated, AS relay 1270 locks to bus 1284 by way of a chain of break contacts on all of the succeeding steering relays. As relay 1270, when operated, also operates ON1 relay 1283 by way of make contacts on ON relay 1213. As previously noted, the operation of ON1 relay 1283 indicates that Control Pulsing Circuit 22 is prepared to receive multifrequency code digits from the Position Circuit 17. ON1 relay 1283 locks to break contacts of RSR relay 1206.

As relay 1270, when operated, also partially enables an operate path for BS relays 1271 to bus 1285. As will be hereinafter described, the reception of the first digit at Control Pulsing Circuit 22 operates RA relay 1286 (FIG. 41) to ground bus 1285 through the make portion of transfer contacts on IN relay 1204 and make contacts on ON relay 1213. Thus, when the first digit is received, BS relay 1271 is operated from bus 1285 and locks to bus 1284. At the same time, BS relay 1271 transfers the operate path of AS relay 1270 from bus 1284 to bus 1285.

When the first digit terminates, RA relay 1286 (FIG. 41) releases, removing the ground from bus 1285 to release AS relay 1270. The circuit is now in condition to receive the second digit of the multifrequency code.

It will be noted that BS relay 1271, when operated, also prepares an operate path for CS relay 1272 for connection to bus 1285. CS relay 1272 cannot operate, however, until AS relay 1270 releases to complete the connection to bus 1285. When the second digit is received, CS relay 1272 operates by way of the make contacts on RA relay 1286 and, when this digit terminates, BS relay 1271 releases. The circuit is now in condition to receive the third digit. It can be seen that the steering relays 1270 through 1281 operate sequentially as the digits of the multifrequency code are received at Control Pulsing Circuit 22.

As can be seen in FIG. 41, the Register Advance (RA) relay 1286 operates when a proper code is received at multifrequency receiver 1240 in FIG. 39 as indicated by the closure of make contacts on CK2 relay 1454 (FIG. 53). When so operated, RA relay 1286 locks through its own make contacts to make contacts on KP relay 1202 and make contacts on the digit receiving relays 1447–1452 of FIG. 53.

SP1 relay 1287 is a slow operate relay with an operate path including break contacts on RA relay 1286 and make contacts on SP relay 1443 (FIG. 53). If SP1 relay 1287 operates before RA relay 1286 operates to release its operate path, a coding error is indicated. When so operated, SP1 relay 1287 locks through its own transfer contacts, break contacts on RSR relay 1206 (FIG. 38), and make contacts on ON relay 1213 (FIG. 38). When so operated, SP1 relay 1287 also provides an operate path for Pulsing Trouble (PT) relay 1288 which locks through break contacts on TEN relay 1251 and RSR relay 1026 and make contacts on ON relay 1213. Thus, PT relay 1288 is released when the start signal is received by the multifrequency receiver 1240 or when one of the key pulse control keys is operated.

Finally, LK relay 1289 operates through two parallel paths provided by break contacts on alternate ones of the steering relays 1270 through 1281, break contacts of TEN relay 1251, and make contacts of SP relay 1443 (FIG. 53). LK relay 1289 remains operated as long as the digit steering circuit of FIG. 40 is operating properly and a signal is being received. If two adjacent ones of the digit steering relays in FIG. 40 are both operated simultaneously, LK relay 1289 releases to prevent the operation of the digit receiving relays 1447–1452 in FIG. 53.

During outpulsing, the same digit steering relays 1270 through 1281 of FIG. 40 are used. The advance of these relays, however, is controlled by break contacts on PG1 relay 1290 (FIG. 42) rather than make contacts on RA relay 1286 (FIG. 41).

Figure 42:
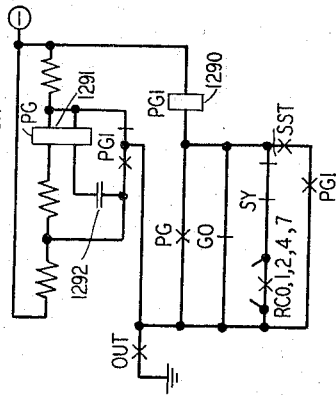

In FIG. 42, PG relay 1291 and PG1 relay 1290 comprise a pulse timing circuit to time the duration of pulses and the period between pulses transmitted from Control Pulsing Circuit 22. The operation of OUT relay 1212 in FIG. 38 causes PG1 relay 1290 to operate through the break contacts of GO relay 1222 (FIG. 38). PG relay 1291 is a polar relay and hence its operation follows current reversals through its coils. These current reversals are timed by a timing capacitor 1292 and controlled by transfer contacts on PG1 relay 1290. PG1 relay 1290, in turn, is controlled by make contacts on PG relay 1291, once the break contacts on GO relay 1222 are operated. In this way, a self-interrupting timer circuit is provided by the circuit of FIG. 42.

When OUT relay 1212 in FIG. 38 initially operates, G1 relay 1290 operates through break contacts on GO relay 1222. Transfer contacts on PG1 relay 1290 apply ground to timing capacitor 1292 in series with the primary winding of PG relay 1291. The initial large current surge drawn by current capacitor 1292 balances the current flow in the upper winding of PG relay 1291 to prevent PG relay 1291 from opening its contacts, if not already opened. Once capacitor 1292 is fully charged, however, this current decreases sufficiently to allow PG relay 1291 to release by way of its upper winding. The circuit remains in this state until GO relay 1222 operates to indicate that outpulsing may begin.

When GO relay 1222 does operate, PG1 relay 1290 releases and reverses the direction of current flow through the windings of PG relay 1291. Again, PG relay 1291 will not operate until the charging current through capacitor 1292 has charged this capacitor. When the charging current is sufficiently small, PG relay 1291 operates by way of its upper winding to close its contacts and operate PG1 relay 1290. PG1 relay 1290 again reverses the direction of current flow in PG relay 1291 to eventually open its own operate path. This process will repeat itself so long as PG1 relay 1290 remains under control of the make contact on PG relay 1291.

PG1 relay 1290 is held operated through transfer contacts on SST relay 1282, break contacts on SY relay 1261, and make contacts on any one of RC1 relays 1253 through 1257. PG1 relay 1290 therefore cannot be released until SY relay 1261 operates to indicate that a digit is properly registered for transmission.

As can be seen in FIG. 40, SST relay 1282 operates through make contacts on EX3 relay 1216, EX5 relay 1217, EX7 relay 1220, or EX10 relay 1221 from the operate paths of the respective ones of digit steering relays ES relay 1274, GS relay 1276, JS relay 1278, or MS relay 1281. SST relay 1282, of course, therefore operates when the appropriate number of digits have been transmitted to the Position Display Circuit 23. SST relay 1282 controls contacts in encoder 1258 (FIG. 39) to transmit a start signal following the digits of the transmitted multifrequency code. When operated, SST relay 982 also locks PG1 relay 1290 through its own make contacts to prevent the transmission of any further signals to the Position Display Circuit 23.

B. *Position Display Circuits (FIGS. 43 through 50)*

In FIGS. 43 through 50 there are shown circuit diagrams of the Position Display Circuit 23 and the associated portions of the Position Signalling Circuit 21. These circuits correspond in many respects to the circuits previously described with reference to FIGS. 34–42 in connection with the Control Pulsing Circuit 22.

(1) *Position Display Seizure* (FIGS. 43–45).—In FIG. 43 there is shown a position display preference circuit similar to the control pulsing preference circuit in FIG. 35. Thus, each Position Display Circuit available to Position Signaling Circuit 21 has associated therewith a position display preference relay such as DP0 relay 1300, DP1 relay 1301 or DP2 relay 1302. DP0 relay 1300 is associated with Position Display Circuit #0 (FIG. 5), which is assumed to be the highest order preference choice of this Position Signaling Circuit 21.

DP0 relay 1300 is operated on automatic minutes and charge displays by make contacts on DMC relay 1016 (FIG. 29), and on operator requests for displays of originating numbers, terminating numbers, and rate codes by make contacts on DSPC relay 1333 (FIG. 46). These operate paths are completed through break contacts on TBL1 relay 1068 (FIG. 30) and PCKV relay 1067 (FIG. 30). TBL1 relay 1068 interrupts this circuit (and releases the Position Display Circuit) when trouble occurs at the Position Display Circuit 23. PCKV relay 1069 interrupts this circuit when the multifrequency pulsing has been completed and its reception verified.

A bid for an idle Position Display Circuit is initiated by the operation of DMC relay 1016 or DSPC relay 1333. If the highets order preference Position Display Circuit, i.e., Position Display Circuit #0, is idle, as indicated by the release transfer contacts on DBY0 relay 1306 (FIG. 45), DP0 relay 1300 operates to select Position Display Circuit #0. If this Position Display Circuit is already in use, as indicated by the operated condition of the transfer contacts on DBY0 relay 1306, DP1 relay 1301 will operate, provided a corresponding preferance relay has not already been operated in any Position Signaling Circuit for which the Position Display Circuit #1 is a higher order preference. DP1 relay 1301 locks through its own make contacts.

If the Position Display Circuit #1 is already in use, transfer contacts on DBY1 relay 1307 will transfer the operate path to the next succeeding preference DP-relay. In this way, Position Signaling Circuit 21 will select the highest order preference Position Display Circuit which is idle.

In FIG. 44 there are shown the connector relay circuits for the Position Display Circuits. DA0 connector relay 1303 is operated by make contacts on DP0 preference relay 1300 provided none of the corresponding DP0 relays in other Position Signaling Circuits are operated. Likewise DA1 connector relay 1304 is operated by make contacts on DP1 preference relay 1301, provided no corresponding DP1 relay in any other Position Signaling Circuit is operated. Similarly, DA2 connector relay 1305 is operated by make contacts on DP2 preference relay 1302, provided no other DP2 relay is operated. The double lockout arrangement of the break contacts in FIGS. 33 and 34 insures that no Position Display Circuit can be simultaneously seized by two Position Signaling Circuits.

In FIG. 45 there are shown the position display busy relay circuits for Position Eignaling Circuit 21. When any Position Display Circuit is made busy, as indicated by the operation of an MB relay corresponding to MB relay 1330 in FIG. 46, an operate path is provided for the associated DBY- relay by way of its lower winding. Thus, DBY0 relay 1306 is operated by a ground on its lower winding from Position Display Circuit #0. DBY1 relay 1307 is operated by a ground on its lower winding from Position Display Circuit #1, and DBY2 relay 1308 is operated by a ground on its lower winding from Position Display Circuit #2.

When operated, each of the DBY- relays locks through its own make contacts to a lock path including break contacts on at least one other DBY- relay, parallel make contacts on DMC relay 1016 and DSPC relay 1333, as well as break contacts on PCKV relay 1067 and TBL1 relay 1068. Thus, it can be seen that this lock path is operative only when a Position Display Circuit is bid for by this Position Signaling Circuit. Furthermore, when a Position Display Circuit has been selected by this Position Signaling Circuit, the associated PBY- busy relays do not release when the make busy terminates, but hold long enough to insure the continuity of the preference chain of FIG. 43.

When a Position Display Circuit is actually seized by this Position Signaling Circuit, as indicated by the operation of one of the connector relays in FIG. 44, the other side of the lower winding of the associated DBY- relay is connected through make contacts on the DA- connector relay to ground. When a ground is thereafter placed on this lower winding by the MB contacts in the correponding Position Display Circuit, this relay does not operate and the DP- preference chain in FIG. 43 remains intact.

(2) *Position Display Control (FIGS. 46, 47).—* In FIG. 46 there is shown a circuit diagram of a portion of the Position Display Circuit 23 and the associated portions of Position Signaling Circuit 21. The circuits shown in FIG. 46 are, in many respects, similar to the circuits of FIG. 38 and, in general, comprise the major control circuits for Position Display Circuit 23.

It will be first noted that Position Display Circuit 23 is utilized only for the reception of multifrequency codes from Control Pulsing Circuit 22. All multifrequency signals originating at the remote location are generated in the operator's key set 110 (FIG. 5) and are transmitted directly to loop 102.

As soon as Position Display Circuit 23 is connected to Position Signaling Circuit 21 by way of connector 41, an operate path is completed for KP relay 1310 in Position Display Circuit 23 by way of make contacts on EX3 relay 1313, EX5 relay 1314, EX7 relay 1317, or EX 10 relay 1318. KP relay 1310, of course, prepares the multifrequency receiver 1350 (FIG. 47) at Position Display Circuit 23 for the reception of multifrequency codes from the Control Pulsing Circuit 22. Off Normal (ON) relay 1311 also operates from the same operating potential and locks through its own make contacts to ground potential. The operation of ON relay 1311 indicates that Position Display Circuit 23 is being utilized for the reception of multifrequency codes.

The coils of EX3 relay 1313 and EX5 relay 1314 are connected in series to EXB lead 1312 which provides an operate path either directly through make contacts on DMC relay 1016 (FIG. 29) or through a current limiting resistor 1320 by way of make contacts on DRT relay 293 (FIG. 8). EX3 relay 1313 and EX5 relay 1314 are marginal relays arranged such that EX3 relay 1313 will operate only when ground is provided through resistor 1320 by way of the make contacts on DRT relay 293. Similarly, EX5 relay 1314 operates only when a direct ground connection is made through the make contacts on DMC relay 1016. When so operated, EX5 relay 1314 substitutes a resistor 1315 for the coil of EX3 relay 1313 to prevent the subsequent operation of this relay.

In a similar manner, the coils of EX7 relay 1317 and EX10 relay 1318 are connected in series to EXA lead 1316. Ground is placed on EXA lead 1316 directly by way of make contacts on DTN relay 295 and NAC relay 1063 (FIG. 30). A ground is placed on EXA lead 1316 through a limiting resistor, either by way of make contacts on DTN relay 295 and LAC relay 1062 (FIG. 30) to limiting resistor 1322, or by way of make contacts on DON relay 294 to limiting resistor 1321. EX7 relay 1317 and EX10 relay 1318 are marginal relays arranged such that EX7 relay 1317 operates only when ground is applied to EXA lead 1316 through one of the current limiting resistors 1321 or 1322. EX10 relay 1318, on the other hand, operates only when ground is placed directly on EXA lead 1316. When so operated, EX10 relay 1318 substitutes a resistor 1319 for the coil of EX7 relay 1317 to prevent the subsequent operation of this relay.

When Position Display Circuit 23 is seized, one of the four relays including EX3 relay 1313, EX5 relay 1314, EX7 relay 1317, and EX10 relay 1318 operates to indicate the number of digits to be expected from Control Pulsing Circuit 22. In addition to completing the operate path for KP relay 1310, these relays control the digit steering circuits of FIG. 48 and the registration complete circuit of FIG. 50.

ON relay 1311, when operated, completes the operate path for TM1 relay 1323 which locks through its own make contacts and make contacts on ON1 relay 1325. TM1 relay 1323 operates as will be described in connection with FIG. 48 to remove an auxiliary ground in the operate paths of the steering relays.

When the "10" frequency is received at the multifrequency receiver of FIG. 53 at Position Display Circuit 23, make contacts of "10" relay 1452 (FIG. 53) complete the operate path for TEN relay 1324 which locks through its own make contacts and make contacts on ON relay 1311. TEN relay 1324, when operated, indicates the reception of a start signal from the Control Pulsing Circuit 22 after the completion of a multifrequency code.

The operation of AS relay 1400, DS relay 1403, HS relay 1407, or JS relay 1408 in FIG. 48 operates make contacts in the operate path of ON1 relay 1325 which locks through its own make contacts and make contacts on ON relay 1311. The operation of ON1 relay 1325 indicates that the digit steering circuits in FIG. 48 are prepared for the reception of the particular number of digits which are expected from the Control Pulsing Circuit 22.

A Trouble (TBL) relay 1326 is used to register any difficulties or errors in the key pulse signals. Thus, if the "10" frequency is received in combination with any frequency other than the "7" frequency, make contacts on the corresponding receiving relays 1447–1452 (FIG. 53) complete an operate path for TBL relay 1326. Similarly, a multifrequency signal is received which includes three or more constituent frequencies, make contacts on CK3 relay 1455 (FIG. 53) complete a parallel operate path for TBL relay 1326. If the start signal is received from the Control Pulsing Circuit 22 before the expected number of digits are received, the combination of make contacts on RGC relay 1415 (FIG. 50) and break contacts on RGC1 relay 1416 (FIG. 50) likewise operate TBL relay 1326.

When operated, TBL relay 1326 locks through its own make contacts and make contacts on ON relay 1311. When so operated, TBL relay 1326 also places a ground on TBL lead 1327 to operate TBL relay 1328 in Position Signaling Circuit 21. As was previously described, TBL relay 1328 causes a signal to be transmitted to Control Signaling Circuit 19 to release the Control Pulsing Circuit 22 and provide the operator with a flashing lamp signal.

TBL relay 1328 locks through its own make contacts to RFL lead 1329 to Position Circuit 17. This lock path is interrupted when the operator depresses the access key for any loop and that loop is connected to the operator position. The trouble indications are therefore terminated as soon as the operator depresses the access key for that loop.

A Make Busy (MB) relay 1330, when operated, indicates that the Position Display Circuit 23 is in use. MB relay 1330 is operated by make contacts on ON relay 1311, by make contacts on RGC1 relay 1416 (FIG. 50), or by a make busy jack provided for that purpose. As was noted in connection with FIG. 45, the operation of MB relay 1330 prevents this Positon Display Circuit 23 from being seized by any other Position Signaling Circuit 21.

A Time and Charges (TC) relay 1331 is operated by way of make contacts on DMC relay 1016 (FIG. 29) provided a display has not been requested by the operator, as indicated by the operation of the break contacts on DON relay 294, DTN relay 295, or DRT relay 293. If a billing class other than paid or no charge is thereafter keyed, as indicated by the break contacts on CTT relay 1116 (FIG. 32) TC relay 1331 releases. As will be described hereinafter in connection with FIG. 47, TC relay 1331 is utilized to control the registration of the time and charge digits at the Position Signaling Circuit 21. Other displays are registered at the Position Circuit 17.

A Time and Charge Auxiliary (TCA) relay 1332 is operated when the time and charge digits have been successfully received as indicated by the operation of make contacts on TC relay 1331 and PCK relay 1337. TCA relay 1332 locks through its own make contacts and the make contacts on TC relay 1331, and is used to display the time and charge digits once they have been successfully received.

A Display Control (DSPC) relay 1333 is operated whenever any type of display is necessary for the display panel 200 of FIG. 3. On displays of originating numbers, make contacts on DON relay 294 complete an operate path for DSPC relay 1333. When a terminating number is being displayed, this operate path is completed through make contacts on DTN relay 295 and one of LAC relay 1062 or NAC relay 1063. When a rate is being displayed, this operate path is completed through make contacts on DRT relay 293. Finally, if minutes and charges are being displayed, an operate path is completed through make contacts on DMC relay 1016 and break contacts on TCA relay 1332. Thus, on time and charge displays, once the digits are successfully registered at Position Signaling Circuit 21, the Position Display Circuit 23 is released by the operation of TCA relay 1332. Moreover, if special billing classes are requested, the automatic STATION PAID or PERSON PAID charge display is released to permit the transmission of alternate charges for the selected billing class.

The operate path of DSPC relay 1333 includes break contacts on PCMKV relay 1067 (FIG. 30) which open this operate path when the multifrequency code has been successfully received at Position Display Circuit 23, a check has been transmitted to Control Signaling Circuit 19, and a verification of the reception of the check signal has been returned to Position Signaling Circuit 21. As noted in connection with FIG. 43, the operation of DSPC relay 1333 initiates the search for an idle Position Display Circuit 23.

Once the digit steering circuits of FIG. 48 have been prepared for the reception of the proper number of digits, as indicated by the operation of ON1 relay 1325, a ground is placed on Start Pulsing (STPG) lead 1334 to operate STPG relay 1335. As noted in connection with FIG. 6, the operation of STPG relay 1335 applies a positive voltage to the ring conductor of loop 102, ultimately resulting in the operation of GO relay 280 (FIG. 7). This is an indication to the Control Pulsing Circuit 22 that it may proceed to transmit the multifrequency code signals. As noted in FIG. 5 break contacts on STPG relay 1335 also disconnect the operator's key pulser 110 from the multifrequency signal loop 102.

When a multifrequency code has been successfully received at Position Display Circuit 23, a ground is placed on Pulsing Check (PSK) lead 1336 by way of make contacts on RGC relay 1415 (FIG. 50) and RGC1 relay 1416 (FIG. 50), and break contacts on TBL relay 1326. This ground operates PCK relay 1337 to initiate the transmission of the pulsing check signal to the Control Signaling Circuit 19. The operation of TBL relay 1325, of course, prevents the transmission of this check signal.

Figure 47:
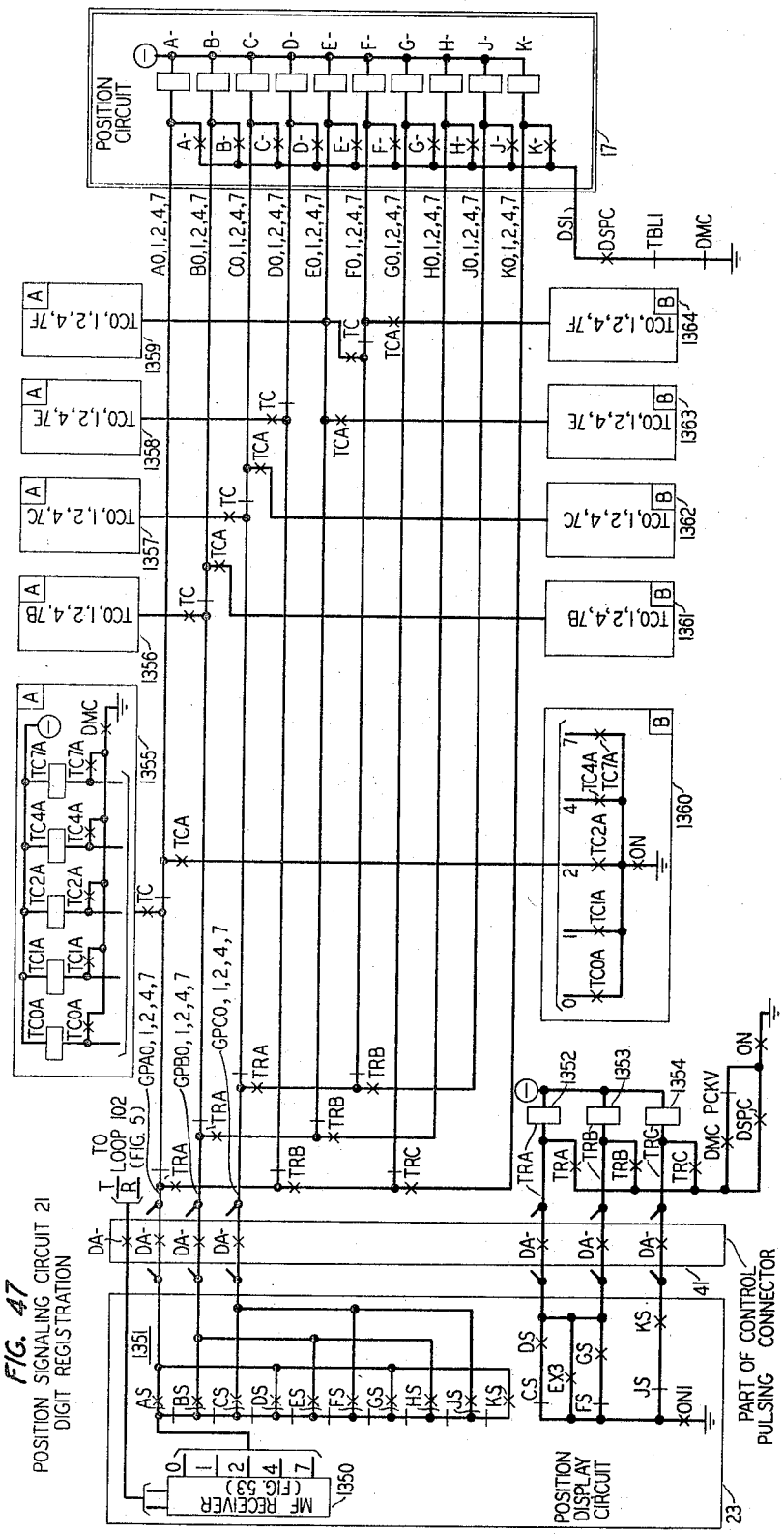

In FIG. 47 there are shown the digit leads between the Position Display Circuit 23, the Position Signaling Circuit 21, and the Position Circuit 17. Multifrequency signals received on loop 102 are applied by way of contacts on control pulsing connector 41 to multifrequency receiver 1350 in Position Display Circuit 23. Multifrequency receiver 1350 may comprise a second receiver such as that to be described in connection with FIG. 53. At this time, it is only necessary to note that receiver 1350 operates to place a ground on two of its five output leads in response to the reception of each multifrequency code.

The outputs of multifrequency receiver 1350 are applied to digit steering contact matrices 1351 which are essentially identical to the matrix 1247 at Control Pulsing Circuit 22 (FIG. 39). These contacts serve to apply each received code successively to the digit leads GPA-, GPB-, and GPC- in sequence.

Transfer relays 1352, 1353, and 1354 are provided to sequentially transfer the three groups of digit leads GPA-, GPB-, and GPC- to succeeding sets of digit leads A- through K-. Thus, following the reception of the third digit, TRA relay 1352 is operated by break contacts on CS relay 1402 and make contacts on DS relay 1403 and locks through its own make contacts and make contacts on DMC relay 1016 or DSPC relay 1333. After the reception of the sixth digit, TRB relay 1353 operates by way of break contacts on FS relay 1405 and make contacts on GS relay 1406 and locks through its own make contacts to the same locking path. Finally, after the reception of the ninth digit, TRC relay 1354 operates by way of break contacts on JS relay 1408 and make contacts on KS relay 1409 and locks through its own make contacts to the same lock path.

It will be noted that in the display 200 of FIG. 3 the rate is displayed in digit positions G, H, and J. Since EX3 relay 1313 in FIG. 46 is operated for rate displays, make contacts on EX3 relay 1313 also operate TRA relay 1352 and TRB relay 1353 to steer the rate digits to the appropriate digit positions in the display.

As can be seen in FIG. 47, digit leads GPA-, GPB-, and GPC- are initially connected via digit leads A-, B-, and C- to Position Circuit 17. The first three digits are therefore registered in corresponding relays in Position Circuit 17 which lock through their own make contacts, make contacts on DSPC relay 1333, break contacts on TBL1 relay 1068 (FIG. 30) and break contacts on DMC relay 1016 (FIG. 29). After the reception of the first three digits, the operation of TRA relay 1352 transfers digit leads GPA-, GPB-, and GPC- to digit leads D-, E-, and F-, respectively. Similarly, after the reception of the first six digits, the operation of TRB relay 1353 transfer leads GPA-, GPB-, and GPC- to the G-, H-, and J- leads to Position Circuit 17. Finally, following the reception of the first nine digits, the operation of TRC relay 1354 transfers the GPA- digit leads to the K- leads to Position Circuit 17.

On time and charge displays initiated by the operation of DMC relay 1016 (FIG. 29), transfer contacts on TC relay 1331 (FIG. 46) transfer the digit leads GPA-, GPB-, and GPC- from leads A- through K- to time and charge register relay circuits 1355, 1356, 1357, 1358, and 1359. Each of these register relay circuits 1355 through 1359 includes five register relays TC(0, 1, 2, 4, 7)-, two of which are operated by corresponding grounds from multifrequency receiver 1350. When so operated, these relays lock through their own make contacts and make contacts on DMC relay 1016.

Following the successful reception of the time and charge digits, TCA relay 1332 in FIG. 46 operates to connect the ground leads from contact circuits 1360 through 1364 to corresponding ones of the digit leads A-, B-, C-, E-, and F-. As can be seen in FIG. 3, the charges are displayed in digit positions A, B, and C while the time is displayed in digit positions E and F. The time and charge register relays 1355 through 1359 are therefore connected to the corresponding digit leads from Position Display Circuit 23 and the contact circuits 1360 through 1364 are likewise connected to corresponding digit leads to Position Circuit 17.

(3) *Position Display Digit Control (FIGS. 48–50).—* In FIG. 48 there is shown a circuit diagram of the digit steering circuits for Position Display Circuit 23, including digit steering relays 1400 through 1410. These steering relays are arranged similarly to those shown in FIG. 40 and operate in a similar fashion. Thus, AS relay 1400 operates by way of make contacts on EX5 relay 1314 or EX10 relay 1318, break contacts on TM1 relay 1323 (FIG. 46) and make contacts on ON relay 1311 (FIG. 46) and locks to the ground on bus 1411 by way of a chain of transfer contacts on the remaining digit steering relays. AS relay 1400 also prepares the operate path for BS relay 1401 from bus 1412.

RA relay 1413 (FIG. 49) operates when the first multifrequency signal is received to place a ground on bus 1412 and thereby operate BS relay 1401. When operated, BS relay 1401 transfers the lock path for AS relay 1400 from bus 1411 to bus 1412 and sets up the operate path for CS relay 1402 from bus 1412. Since AS relay 1400 remains operated, however, the operate path for CS relay 1402 is not completed.

When the first multifrequency signal terminates, RA relay 1413 releases to remove the ground from bus 1412 and thus release AS relay 1400. BS relay 1401 remains locked to bus 1411.

Similarly, on the reception of the second multifrequency code, RA relay 1413 again operates to again place ground on bus 1412. Since AS relay 1400 has now released, the operate path for CS relay 1402 is complete and this relay operates, locking to bus 1411 and transferring the lock path for BS relay 1401 to bus 1412. When RA relay 1413 again releases, BS relay 1401 releases and an operate path is prepared for DS relay 1403. In the manner described above, the digit steering circuit of FIG. 48 sequentially operates the steering relays 1400 through 1410 as the multifrequency codes are received at Position Display Circuit 23.

Since a national area code terminating number display and a time and charge display both begin in the A digit position, the make contacts on EX5 relay 1314 and EX10 relay 1318 initiate the digit steering at AS relay 1400. On local area terminating number displays, however, make contacts on EX7 relay 1317 cause the initial operation of DS relay 1403. As the multifrequency codes are thereafter received, the subsequence digit steering relays 1404 through 1410 are sequentially operated in exactly the same manner as previously described. Similarly, for rate displays, make contacts on EX3 relay 1313 cause the initial operation of HS relay 1407 to begin the display in the H-digit position.

In FIG. 49 there is shown a circuit diagram of the Register Advance (RA) relay 1413 and LK relay 1414. RA relay 1413 is operated by make contacts on CK2 relay 1454 (FIG. 53) upon the reception of any valid multifrequency code, and locks through its own make contacts, make contacts on KP relay 1310 (FIG. 46), and make contacts on the digit reeciving relays of FIG. 53. In this way, RA relay 1413 operates upon the reception of each valid code and holds until that code has completely terminated. This operation results in the proper advancement of the digit steering circuits of FIG. 48 as previously described.

LK relay 1414 registers the proper operation of the digit steering circuit of FIG. 48 by means of two parallel paths including break contacts on alternate ones of the digit steering relays 1400 through 1410. Proper operation of the digit steering circuit of FIG. 48 requires that successive pairs of relays be operated and released in a stepwise fashion. If any of these adjacent pairs of relays are simultaneously operated, the circuit is not ready to properly steer the digits and an operate path is not completed for LK relay 1414. The operate path for LK relay 1414 also includes make contacts on ON1 relay 1325 and a parallel combination of make contacts on CK2 relay 1454 and SP relay 1443. When operated, LK relay 1414 enables the multifrequency receiver of FIG. 53 as will be described hereinafter.

In FIG. 50 there is shown the registration complete circuits for the Position Display Circuit 23. Registration Complete (RGC) relay 1415 operates when the start signal is received as indicated by the simultaneous closure of make contacts on the "7" frequency receiving relay 1451 of FIG. 53 and TEN relay 1324 in FIG. 46. When so operated, RGC relay 1415 locks through its own make contacts and make contacts on ON1 relay 1325.

This same start signal operates RGC1 relay 1416 through a chain of break contacts on all of the steering relays 1400 through 1410 of FIG. 48. Transfer contacts on FS relay 1405 provide an alternate operate path through make contacts on EX5 relay 1314. Similarly, transfer contacts on LS relay 1410 provide an alternate operate path through a parallel combination of make contacts on EX3 relay 1313, EX7 relay 1317, and EX10 relay 1318. The operation of RGC1 relay 1416 indicates not only that a start signal has been received, but that the proper number of digits have also been received. Thus, on displays of time and charges, the reception of five digits will ultimately result in the operation of FS relay 1405. If five digits were expected, the make contacts on EX5 relay 1314 will also be operated to complete the operate path for RGC1 relay 1416.

Similarly, if three, seven, or ten digits have been received for rate, seven digit terminating number, or ten digit terminating number displays, respectively, the transfer contacts on LS relay 1410 are operated along with the corresponding make contacts on EX3 relay 1313, EX7 relay 1317, or EX10 relay 1318. RGC1 relay 1416, when operated, locks through its own make contacts and make contacts on RGC relay 1415.

It can be seen that the simultaneous operation of RGC relay 1415 and RGC1 relay 1416 indicates the proper reception of the multifrequency code at Position Display Circuit 23. As previously described, this results in the operation of PCK relay 1337 to transmit a pulsing check signal.

On the other hand, if RGC1 relay 1416 does not operate when RGC relay 1415 operates, the operate path for TBL relay 1326 (FIG. 46) is completed and a trouble signal is transmitted to the Control Signaling Circuit 19.

C. *Control Pulsing Time-Out Circuits (FIGS. 51, 52)*

In FIG. 51 there is shown a gas tube timing circuit which is utilized to provide time-out intervals in connection with the use of Control Pulsing Circuit 22. Thus, gas tube 1410 is used in conjunction with timing resistors 1411, 1412, 1413, 1414 and timing capacitor 1415 to provide four sepaarte timing intervals. In general, current drawn from positive voltage source 416 flows through one of timing resistors 1411 through 1414 to charge timing capacitor 1415. When sufficient voltage has built up on capacitor 1415, the control electrode 1417 of gas tube 1410 initiates a discharge which fires gas tube 1410. Current limiting resistor 1418 limits the amount of current drawn by control electrode 1417.

When gas tube 1410 fires, the operate path for Timing (TM) relay 1419 is completed through the make contacts of TMST relay 1424 and gas tube 1410. When operated, TM relay 1419 locks through its own make contacts, current limiting resistor 1420, and break contacts on Reset Timing (RTM) relay 1425. A discharge resistor 1421 is also provided to discharge capacitor 1415 any time prior to the firing of gas tube 1410. A plurality of time-out recycling contacts 1422, to be described, are provided to connect resistor 1421 across capacitor 1415.

Separate time-out intervals are provided for inpulsing and outpulsing to and from Control Pulsing Circuit 22. Thus, make contacts on IN relay 1201 (FIG. 38) serve to connect either resistor 1411 or resistor 1412 in the timing circuit for inpulsing timing. Similarly, make contacts on OPA relay 1210 (FIG. 38) serve to connect either of resistor 1413 or 1414 in the timing circuit for outpulsing timing.

Furthermore, two sepaarte intervals are timed during inpulsing. The search for an idle Control Pulsing Circuit 22 is timed by way of the break portion of transfer contacts on STPG relay 1223 (FIG. 38) and timing resistor 1411. The time constant of this resistance-capacitance circuit is selected to provide an interval prior to the firing of gas tube 1410 sufficiently long to indicate that a Control Pulsing Circuit 22 is not available.

Once a Control Pulsing Circuit 22 has been seized, STPG relay 1223 operates. An alternate timing path, including the make portion of the transfer contacts on STPG relay 1223 and resistor 1412, is therefore completed to provide a separate timing interval for the actual multifrequency pulsing sequence. At the same time, make contacts on STPG relay 1223 operate in the discharge contact matrix 1422 to discharge capacitor 1415 and thus prepare it for the new timing interval. Break contacts on RCY relay 1426 (FIG. 52) open following this discharge to permit timing to continue. The time constant of resistor 1412 and capacitor 1415 is selected to provide an appropirate time-out interval for the multifrequency pulsing sequence.

In a similar manner, two separate timing intervals are provided for outpulsing from Control Pulsing Circuit 22. The search interval for an idle Control Pulsing Circuit 22 is timed by way of break contacts on GO relay 280 (FIG. 7) and resistor 1413. Resistor 1413 is of the same values as resistor 1411 to provide identical timing intervals. Similarly, during the actual outpulsing, a new timing circuit is completed through the break portion of the transfer contacts of GO relay 280, timing resistor 1414 and the make portion of the transfer contacts on OCK relay 1227 (FIG. 38). An appropriate time constant is likewise selected for this timing circuit. The reception of a key pulse reset signal releases OCK relay 1227 to short circuit resistor 1414 and terminate the timing.

TM relay 1419, when operated on outpulsing, causes the flashing of the HOLD or ACCESS key as discussed in connection with HA- relay 994 of FIG. 28. It also initiates the transmission of a signal to Position Signaling Circuit 21 to release the Position Display Circuit 23. As can be seen in FIG. 34, the operation of TM relay 1419 likewise releases CPST relay 1150 to release the Control Pulsing Circuit 22. If the operator wishes to again make a bid for a Control Pulsing Circuit 22, the appropriate ACCESS key must be reoperated.

On inpulsing from Position Circuit 17, a time out places a ground on PE lead 1225 (FIG. 38) to flash the appropriate key pulse lamp. As can be seen in FIG. 34, CPST relay 1150 is also released.

In FIG. 52 there are shown the circuits for the timer control relays used in conjunction with the timer circuit of FIG. 51. Thus, the Timer Start (TMST) relay 1424 is operated by make contacts on IN relay 1201 (FIG. 38) or OPA relay 1210 (FIG. 38). As can be seen in FIG. 51, transfer contacts on TMST relay 1424 interrupt the discharge path for capacitor 1415 and connect TM relay 1419 in series with gas tube 1410 and positive voltage source 1416. TMST relay 1424 remains operated throughout the interval for which a Control Pulsing Circuit search and usage continue.

Following an outpulsing time-out, as discussed in connection with FIG. 51, resulting in the flashing of the HOLD or ACCESS loop at Position Circuit 17, the operator depresses the flashing ACS- key. A code is thereupon transmitted resulting in the simultaneous closure of make contacts on CKR relay 403, RA4 relay 410 and one of RB3 relay 415, RB4 relay 416 or RB6 relay 418. When the operator has actually gained access to the loop, make contacts on the corresponding TLK- relay 990 (FIG. 28) operate to complete an operate path for Reset Timing (RTM) relay 1425. As can be seen in FIG. 51, RTM relay 1425 interrupts the hold path for TM relay 1419 and completes a discharge path in discharge matrix 1422 to return the gas tube timing circuit of FIG. 51 to normal. When the ACS- key is released to release the corresponding decoding relays, the timing circuit of FIG. 51 is again enabled by the release of RTM relay 1425.

On inpulsing to Control Pulsing Circuit 22, the closure of make contacts on STPG relay 1223 (FIG. 38) causes Recycle (RCY) relay 1426 to operate. Between the time that STPG relay 1223 is operated and the time that RCY relay 1426 is operated to make contacts on STPG relay 1223, a discharge path in discharge matrix 1422 is completed to discharge capacitor 1415. Almost immediately, however, RCY relay 1426 operates to reinterrupt this discharge path and permit a new timing cycle to begin. When operated, RCY relay 1426 locks through make contact on GO relay 280 (FIG. 7) and OCK relay 1227 (FIG. 38). As previously noted, the reception of a key pulse reset signal releases OCK relay 1227 to release RCY relay 1426.

At the end of inpulsing, make contacts on IN relay 1201 (FIG. 38) and ST relay 985 (FIG. 28) are closed to operate End Timing (ETM) relay 1427. ETM relay 1427 terminates the time-out by means of make contacts in the discharge matrix 1422. On outpulsing, the simultaneous closure of make contacts on OPA relay 1210 (FIG. 38) and PCK relay 585 (FIG. 25) likewise operates ETM relay 1427 to terminate the time-out. In each of the above cases, the operation of ETM relay 1427 indicates the successful completion of the sequence being timed and hence prevents the operation of TM relay 1419.

If an error occurs during the process of inpulsing, or if an outpulsing time-out occurs, as can most easily be seen in connection with PE lead 1225 of FIG. 38, the PE relay in Position Control Circuit 15 operates to place a ground on TMC lead 1428 and likewise operate ETM relay 1427. Thus, it can be seen that ETM relay 1427 is operated to disable the timing circuit of FIG. 51 at the successful conclusion of a multifrequency pulsing sequence, when an error occurs on inpulsing, and when a time-out occurs on outpulsing.

During automatic outpulsing of time and charge information, make contacts on OPMC relay 1208 (FIG. 38) partially enable the operate path of Minutes and Charge Timing (MCT) relay 1429. When a time-out occurs, the operator depresses the ACS- key for the appropriate loop and RTM relay 1425 operates completing the operate path for MCT relay 1429. When so operated, MCT relay 1429 locks through its own make contacts and make contacts on ON relay 420 (FIG. 17). As discussed in connection with FIG. 34, the operation of MCT relay 1429 prevents the reoperation of CPST relay 1150 on Minutes and Charge displays.

D. *Multifrequency Receiver (FIG. 53)*

In FIG. 53 there is shown a general block diagram of multifrequency receiver which is suitable for receiving the two-frequency multifrequency codes transmitted on loop 102. The same receiver can be used in the Control Pulsing Circuit 22 shown in FIG. 39 or in the Position Display Circuit 23 shown in FIG. 47. Such a multifrequency receiver is disclosed in detail in W. V. K. Largert et al. Patent 2,826,638, issued Mar. 11, 1958, and hence will not be described in detail here.

In general, the circuit of FIG. 53 receives multifrequency codes from loop 102 on input leads 1440, amplifies them, and applies them to a bank 1441 of frequency separating filters. A Signal Present (SP) filter 1442 is tuned to the entire band of frequencies used for multifrequency signaling. These frequencies are detected and used to operate a SP relay 1443. Similarly, each of the six frequencies used in the signaling system is separated in filters 1444 through 1446 to operate corresponding relays 1447, 1448, 1449, 1450, 1451 and 1452, respectively.

The six frequencies used for multifrequency signals on loop 102 are arbitrarily assigned the numbers 0, 1, 2, 4, 7 and 10. These numerical designations are chosen to simplify the encoding of the decimal digits. Since each digit is represented by two frequencies transmitted simultaneously, the decimal digit value can then be computed as the sum of the arbitrary frequency designations. This coding scheme, together with the coding of the start pulse, is shown in the following Table V. Each "x" represents the presence of that frequency in the code for the particular decimal digit.

TABLE V

| Digits | Frequencies (c.p.s.) | | | | | |
|---|---|---|---|---|---|---|
| | 700 | 900 | 1100 | 1300 | 1500 | 1700 |
| | Designations | | | | | |
| | 0 | 1 | 2 | 4 | 7 | 10 |
| 0 | | | | | x | x |
| 1 | x | x | | | | |
| 2 | x | | x | | | |
| 3 | | x | x | | | |
| 4 | x | | | x | | |
| 5 | | x | | x | | |
| 6 | | | x | x | | |
| 7 | x | | | | x | |
| 8 | | x | | | x | |
| 9 | | | x | | x | |
| Start Pulse | | | | | x | x |

Returning to FIG. 53, the operate path for digit relays 1447 through 1452 from positive voltage source 1453 includes the windings of two marginal relays 1454 and 1455. Check Two (CK2) relay 1454 is arranged to be operated when two, but no more than two, of the digit relays 1447 through 1452 are operated. The operation of CK2 relay 1454, of course, is a check indicating that an appropriate two-frequency code has been received. Check Three (CK3 relay 1455 includes a second biasing winding and is arranged to be operated when three or more of the digit relays 1447 through 1452 are operated. CK3 relay 1455, of course, indicates that an erroneous multifrequency code has been received and is utilized as shown in FIGS. 38 and 46 to operate Pulsing Error (PE) relay 1424 and Trouble (TBL) relay 1326, respectively.

The operate path for the digit relays 1447 through 1452 also includes make contacts on KP relay 1202 (FIG. 38) or KP relay 1310 (FIG. 46) and LK relay 1289 (FIG. 41) or LK relay 1414 (FIG. 49). The KP make contacts enable the multifrequency receiver of FIG. 53 when the Control Pulsing Circuit 22 or Display Position Circuit 23 has been seized for the reception of multifrequency codes. The LK make contacts complete the enablement of the multifrequency receiver only when the associated digit steering relays are prepared for the reception of the next multifrequency code digit.

FIG. 53 also discloses digit grounding leads 1456 including make contacts on the KP relay and make contacts on each of the relays 1447 through 1452. The output leads 1456, of course, comprise the output leads of the multifrequency receiver 1240 in FIG. 39 and the multifrequency receiver 1350 in FIG. 47.

VI. SEQUENCE CHARTS (FIGS. 54–68)

In FIGS. 54 through 68 there are shown sequence charts which are useful in explaining the operation of the heretofore described circuits. The use of the detached contact convention has resulted in contacts of a particular relay being shown in different figures than the relay structure which operates those contacts. For this reason, and to render the description of the figures convenient and more meaningful, FIGS. 54 through 68 represent the important overall functions of these circuits in the form of sequence charts.

A particular sequence of operation begins on a centrally-located vertical sequence line at the top of the figure and continues to the bottom. Two short crossed lines interrupting this sequence line represent the operation of the relay identified adjacent thereto. A single short line perpendicular to the sequence line represents the release of the relay identified adjacent thereto. With this convention in mind, the particular sequences described in FIGS. 54 through 58 will now be taken up in detail.

Figure 54:
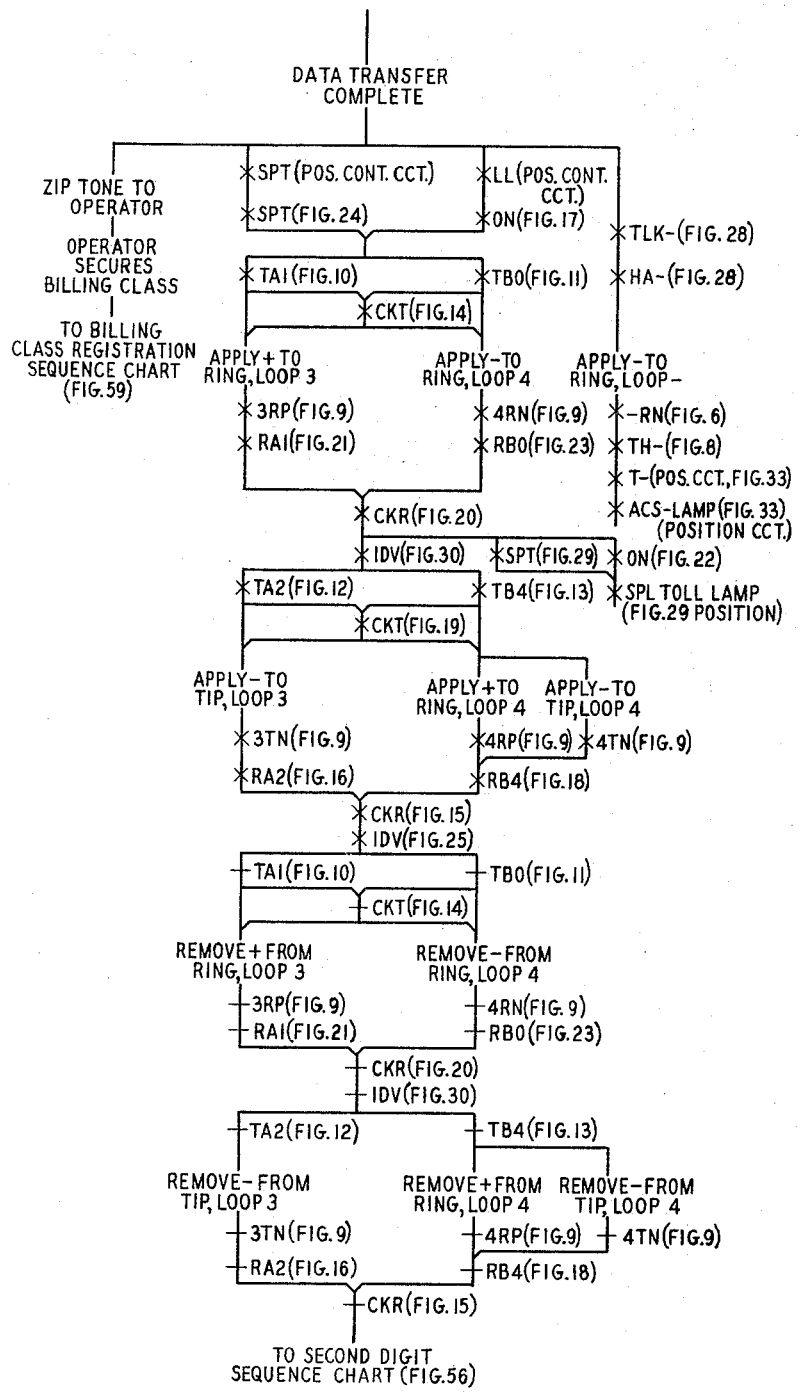

In FIG. 54 there is shown a sequence chart for the initiation of a noncoin, customer-dialed, person-to-person call handled by Position Circuit 17. As is disclosed in the aforementioned copending application of R. B. Curtis, the Position Link and Controller 16 of FIG. 1 operates to detect an incoming call on one of the Incoming Trunk Circuits 10 and to assign that call to a particular Position Control Circuit 15 which is associated with a Traffic Service Position 18. Position Control Circuit 15 operates to obtain the calling and called numbers from Sender 12 by way of Data Transfer Circuit 24, along with all of the other call information required by the operator.

When the transfer of data to Position Control Circuit 15 has been completed on a noncoin, customer-dialed, person-to-person call, the SPT relay in the Position Control Circuit 15 is operated along with the Light Lamps (LL) relay. Contacts on the SPT relay operate SPT relay 501 (FIG. 24) while contacts on the LL relay operate ON relay 472 (FIG. 17). Make contacts on SPT relay 501 and ON relay 420 operate TA1 relay 321 (FIG. 10) and TB0 relay 340 (FIG. 11). The operation of these two coding relays results in the operation of CKT relay 400 (FIG. 14).

As can be seen in FIG. 9, the operation of the TA1 and TB0 coding relays, together with the operation of the CKT relay, results in the application of positive voltage to the ring conductor of loop 103, via contacts 316, and negative potential to the ring conductor of loop 104, via contacts 317. These voltage conditions on loops 103 and 104 cause 3RP relay 310 and 4RN relay 315 to operate (FIG. 9), which, in turn, operate RA1 relay 407 (FIG. 16) and RB0 relay 412 (FIG. 23). Together these relays operate CKR relay 453 (FIG. 20), resulting in the operation of SPT relay 1002 (FIG. 29) and 1DV relay 1065 (FIG. 30). 1DV relay 1065 also operates ON relay 472 (FIG. 22) which, together with STP relay 1002, results in the lighting of the SPL TOLL lamp.

It should be noted that, at the same time this code is being transmitted on loops 103 and 104, the speech circuits of the operator are being connected to the appropriate speech loop to Position Circuit 15, resulting in the operation of the corresponding TLK- relay 990 (FIG. 28). When so operated, TLK- relay 990 closes make contacts in the operate path of HA- relay 994 (FIG. 28), resulting in the application of a negative voltage to the ring conductor of the appropriate one of loops 100, 101, and 102 (FIG. 6). This negative potential causes the operation of the corresponding -RN relay 259 (FIG. 6) which, in turn, operates the associated TH- relay 291 (FIG. 8). As can be seen in FIG. 33, contacts on TH- relay 291 place a ground on lead 1135 to operate the T- relay in Position Circuit 17. When so operated, the T- relay closes contacts to light the ACS- lamp in the appropriate loop. This lamp identifies the loop for the operator.

When the connection of this loop to the operator has been completed, a zip tone is applied to the loop to signal the operator of this fact. At this time, the operator may secure the special billing class (person-to-person) desired by the customer and key this billing class to the Position Control Circuit 15 in the manner to be described in connection with FIG. 59.

Returning to Position Signalling Circuit 21, the operation of 1DV relay 1065 (FIG. 30) completes the operator path for TA2 relay 362 (FIG. 12) and TB4 relay 384 (FIG. 13). Together, these coding relays permit the operation of CKT relay 450 (FIG. 19) to apply negative voltage to the tip conductor of loop 103, positive voltage to the ring conductor of loop 104, and negative voltage to the tip conductor of loop 104 (FIG. 9). As can be seen in FIG. 9, these voltages result in the operation of 3TN relay 309, 4RP relay 314, and 4TN relay 313, which, together, operate RA2 relay 408 and RB4 relay 416. These relays, in turn, permit the operation of CKR relay 403 (FIG. 15) which permits the operation of 1DV relay 581 (FIG. 25).

From the above description, it can be seen that the class of call information is first encoded in the "A1-B0" code and transmitted to the Position Signaling Circuit 21. When received, this code results in the operation of 1DV relay 1065 which, in turn, generated the "A2-B4" code for transmission back to Control Signaling Circuit 19. This First Digit Verification code causes the operation of 1DV relay 581 (FIG. 25) at Control Signaling Circuit 19. Thus, the circuit operates to automatically transmit the class of call code and to verify its reception by a returned code.

When operated, 1DV relays 581 (FIG. 25) interrupts the operate path for TA1 relays 321 (level B0, FIG. 10) and the operate path for TB0 relay 340 (A1 level, FIG. 11). When released, these coding relays also release CKT relay 400 (FIG. 14), removing the voltage conditions from loops 103 and 104. 3RP relay 310 and 4RN relay 315 (FIG. 9) therefore also release, releasing RA1 relay 457 (FIG. 21) and RB0 relay 464 (FIG. 23). These receiving relays, when released, likewise release CKR relay 453 (FIG. 20) and 1DV relay 1065 (FIG. 30).

When so released, 1DV relay 1065 (FIG. 30) releases TA2 relay 362 (FIG. 12) at level B4 and TB4 relay 384 (FIG. 13) at level A2. When released, these transmitting relays remove the voltage conditions from the position signaling end of loops 103 and 104 to release 3TN relay 300, 4RP relay 307, and 4TN relay 304 (FIG. 9). When so released, these receiving relays likewise release RA2 relay 408 (FIG. 16) and RB4 relay 416 (FIG. 18), resulting in the release of CKR relay 403 (FIG. 15).

From the above description, it can be seen that the reception of a First Digit Verification code at Control Signaling Circuit 19 releases the class of call encoding relays to remove the class of call code (A1-B0) from the signaling loops 103 and 104. The removal of this code releases the corresponding receiving relays at Position Circuit 21 in which, in turn, release the First Digit Verification relay 1065 at Position Signaling Circuit 21. This terminates the transmission of the First Digit Verification signal ("A2-B4").

The entire sequence of FIG. 54 is merely illustrative of one class of call signaling sequence. It can readily be seen that any other class of call will follow the same sequence, varying only in the class of call relays operated, the codes transmitted, and the particular lamps lit. Moreover, it will be noted that the sequence of FIG. 54 results in each of the codes being automatically terminated when it has been successfully received at the other end of the signaling loop.

Figure 55:
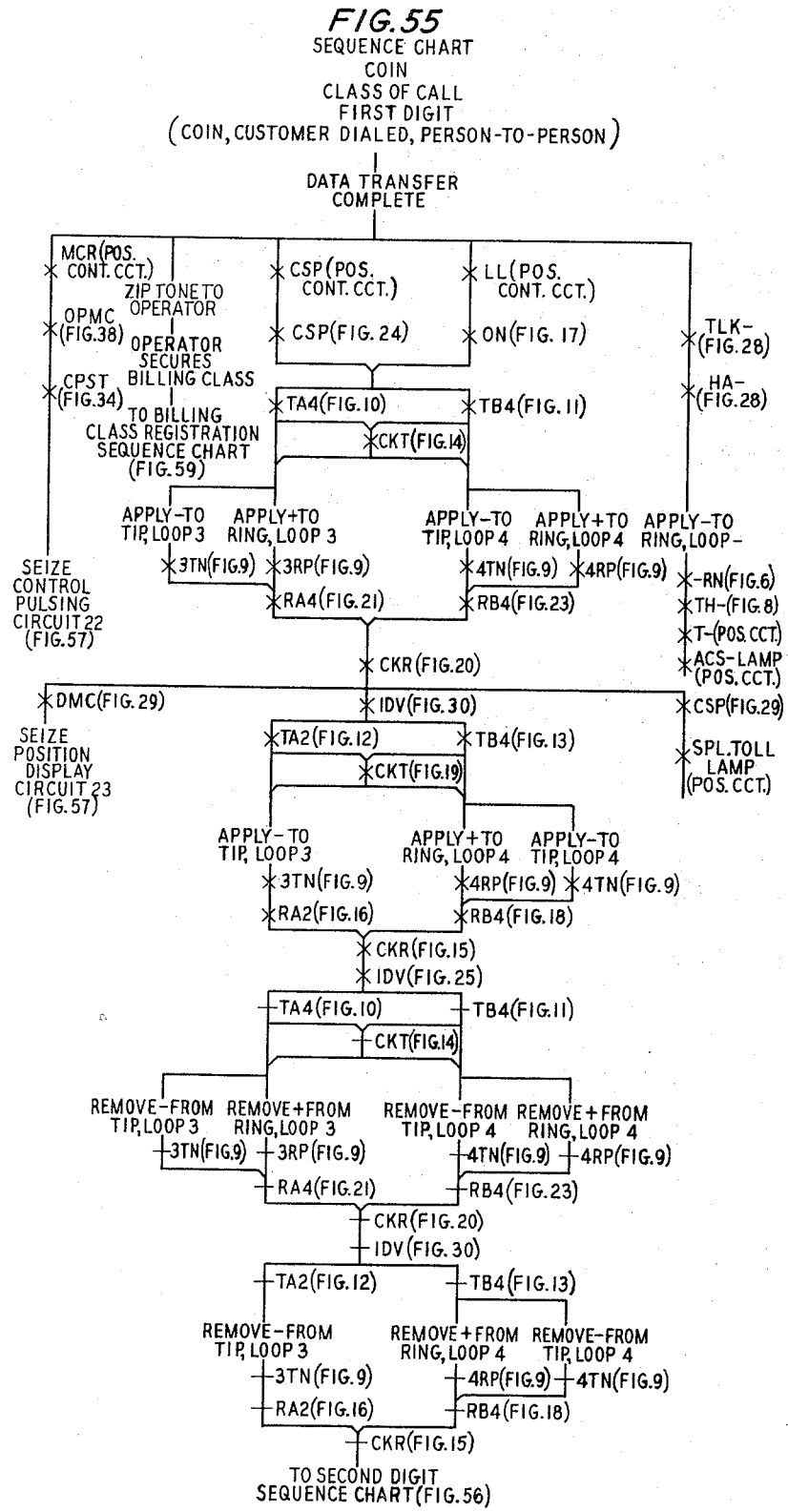

In FIG. 55 there is shown a sequence chart for a coin class of call initially arriving at the Position Circuit 15. The sequence chart of FIG. 55 is, in many respects, very similar to that of FIG. 54 and hence will be described only insofar as it differs.

As before, following the completion of the transfer of data to Position Control Circuit 15, the class of call relay, in this case the CSP relay in Position Control Circuit 15, as well as the LL relay, result in the operation of CSP relay 503 (FIG. 24) and ON relay 420 (FIG. 17). The operation of these relays causes the transmission of the "A4-B4" code from Control Signaling Circuit 19 to Position Signaling Circuit 21.

At the same time that this class of call code is being transmitted, the ASC- lamp for the appropriate loop is being lit by a sequence initiated by the operation of TLK- relay 990 (FIG. 28). Similarly, a zip tone is applied to the loop, when complete, to indicate to the operator that she must secure the billing class from the customer and key it into the Position Control Circuit 15.

Unlike the noncoin class of call illustrated in FIG. 54, coin class calls result in the placement of a ground on OPMC lead 1207 to operate OPMC relay 1208 (FIG. 38). As can be seen in FIG. 34, this results in the operation of CPST relay 1150 to initiate a search for an idle Control Pulsing Circuit 22. The seizure of Control Pulsing Circuit 22 and its following operations are illustrated in detail in the sequence chart of FIG. 57.

At Position Signaling Circuit 21, the "A4–B4" code results in the operation of DMC relay 1016 (FIG. 29), 1DV relay 1065 (FIG. 30), and CSP relay 1006 (FIG. 29). The operation of DMC relay 1016 initiates a sequence to seize a Position Display Circuit as is illustrated in more detail in the sequence chart of FIG. 57. As can be seen in FIG. 29, the operation of CSP relay 1006 results in the lighting of the SPL TOLL (coin) lamp at Position Circuit 17.

In exactly the same manner as described with respect to the sequence chart of FIG. 54, the operation of 1DV relay 1065 (FIG. 30) initiates the transmission of the "A2–B4" code back to Control Signaling Circuit 19. As before, this code causes 1DV relay 581 (FIG. 25) to operate. As can be seen at the B3 level of TA4 relay 324 (FIG. 10) and the A6 level of TB4 relay 344 (FIG. 11), contacts on 1DV relay 581 release these coding relays, resulting in the removal of the "A4–B4" code from loops 103 and 104. When this code is removed, 1DV relay 1065 (FIG. 30) releases, terminating the transmission of the "A2–B4" code.

Some class of call signals include two codes. The first code, exemplified by the sequence charts of FIGS. 54 and 55, causes the appropriate class of call lamp to light, initiates the seizure of a Position Display Circuit 22 when required, and initiates the transmission back of a verification signal. The second digit of this two-digit code is utilized to indicate that the operator must secure the calling number either because no ANI equipment exists at the originating office or because this equipment has failed. The sequence for the transmission of this second digit is illustrated in the sequence chart of FIG. 56.

As was previously described, the reception of the First Digit Verification signal at Control Signaling Circuit 19 results in the operation of 2DT relay 583 (FIG. 25). As can be seen at the B6 level of TA0 relay 320 (FIG. 10) and the A0 level of TB6 relay 346 (FIG. 11), the operation of OI relay 550 (FIG. 25) or IF relay 551 (FIG. 25) results in the transmission of an appropriate code to the Position Signaling Circuit 21.

Figure 56:
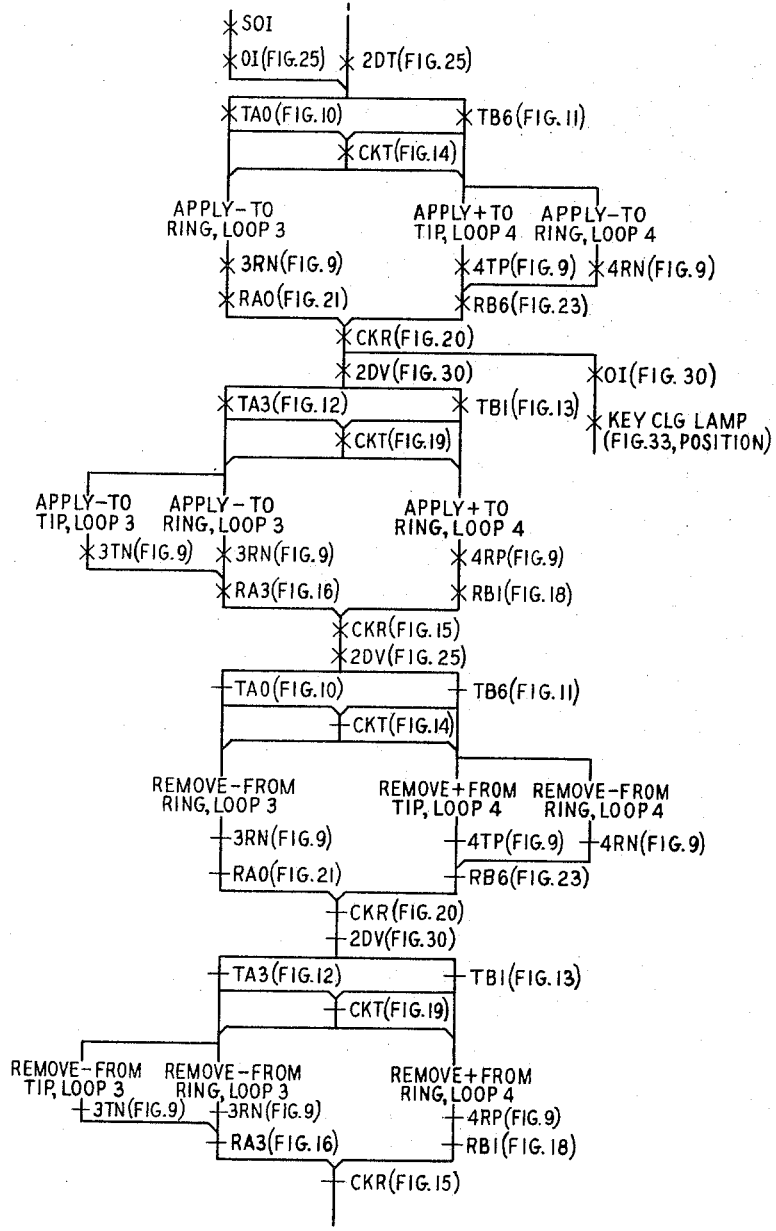

In the illustration of FIG. 56, it is assumed that an operator identification of a calling number is required and OI relay 550 (FIG. 25) is operated. The operation of these relays results in the transmission of the "A0–B6" code to Position Signaling Circuit 21 to operate OI relay 1050 (FIG. 30) and 2DV relay 1066 (FIG. 30). As can be seen in FIG. 33, the operation of OI relay 1050 results in the lighting of the KEY CLG lamp. The lighting of this lamp indicates to the operator that she must secure the calling number and key it to the Position Control Circuit 15.

The operation of 2DV relay 1066 results in the transmission of the "A3–B1" code which operates 2DV relay 582 (FIG. 25). When so operated, 2DV relay 582 causes the termination of the "A0–B6" code at Control Signaling Circuit 19. When this code is terminated, 2DV relay 1066 (FIG. 30) releases to terminate the "A3–B1" Second Digit Verification code. At this time the signaling circuits are returned to normal and can be used for various other types of signaling between Control Signaling Circuit 19 and Position Signaling Circuit 21.

Figure 57:
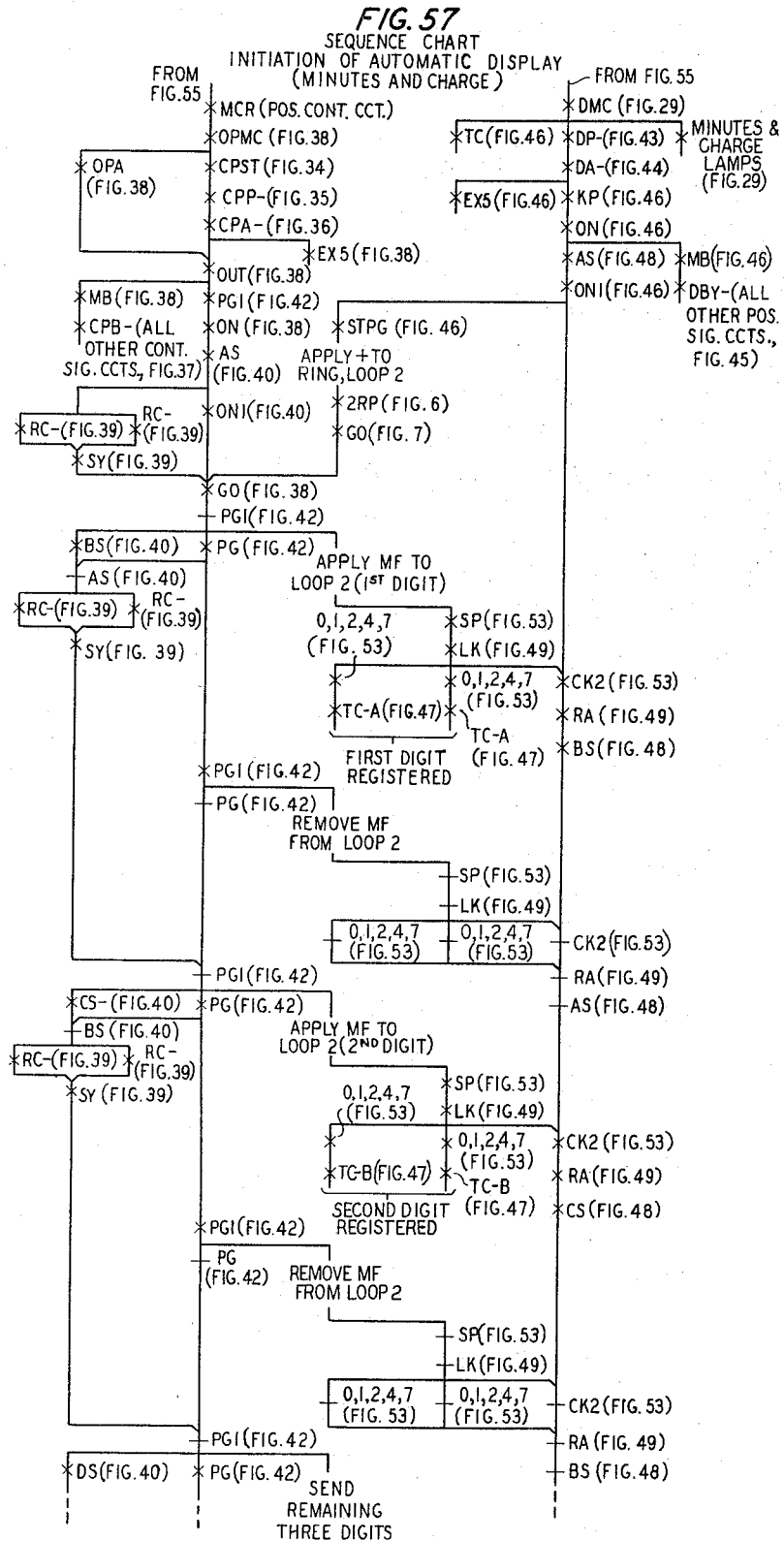

In FIG. 57 there is shown a sequence chart for the initiation of an automatic display of minutes and charges on a coin class call. As was noted in connection with FIG. 55, on coin class calls OPMC relay 1208 (FIG. 38) at Control Signaling Circuit 19 is operated to operate CPST relay 1150 (FIG. 34). When so operated, CPST relay 1150 initiates a search for an idle Control Pushing Circuit 22 in the preference chain of FIG. 35. When one of the CPP- relays of FIG. 35 operates, it operates the corresponding CPA- relay in FIG. 36. This CPA- relay is the connector relay which provides the connector contacts 40 to connect the Control Pulsing Circuit 22 to Control Signaling Circuit 19.

When so connected, EX5 relay 1217 and OUT relay 1212 (FIG. 38) operate. Contacts on OUT relay 1212 operate MB relay 1230 which, in turn, operates the CPB- relays in all other Control Signaling Circuits, as can be seen in FIG. 37.

Contacts on OUT relay 1212 also operate PG1 relay 1290 (FIG. 42) which, in turn, operates ON relay 1213 (FIG. 38). As can be seen in FIG. 40, contacts on ON relay 1213 permit the operation of AS relay 1270 which, in turn, operates ON1 relay 1283. At this point, the Control Pulsing Circuit is in a condition to transmit multi-frequency signals to the remote position. The first digit of the time and charge display has been registered in the RC- relays 1253–1257 of FIG. 39 and SY relay 1261 (FIG. 39) is operated.

As can also be seen in FIG. 55, the reception of a coin class code at the Position Signaling Circuit 21 operates DMC relay 1016 (FIG. 29) which, in turn, operates TC relay 1331 (FIG. 46), lights the MINUTES and CHARGE lamps (FIG. 29), and initiates a search for an idle Position Display Circuit 23 (FIG. 43). In FIG. 43 the first idle position display preference relay DP- operates to operate the associated DA- connector relay (FIG. 44). This connector relay provides the contacts 41 to connect the Position Display Circuit 23 to the Position Signaling Circuit 21.

When this connection is completed, EX5 relay 1314 and KP relay 1310 (FIG. 46) operate to operate ON relay 1311 (FIG. 46). When operated, ON relay 1311 completes operate paths for AS relay 1400 (FIG. 48) and MB relay 1330 (FIG. 46). MB relay 1330 operates the DBY- relays in all other Position Signaling Circuits to prevent subsequent seizure of this same Position Display Circuit.

The operation of AS relay 1400 completes the operate path for ON1 relay 1325 (FIG. 46) which, in turn, operates STPG relay 1335 (FIG. 46). As can be seen in FIG. 6, the operation of STPG relay 1335 results in the application of a positive potential to the ring conductor of loop 102. At Control Signaling Circuit 19, this positive potential operates the -RP relay on loop 102 corresponding to -RP relay 251. When so operated, this -RP relay operates GO relay 280 (FIG. 7). As can be seen in FIG. 38, contacts on GO relay 280 (FIG. 7) operate GO relay 1222 (FIG. 38) to release PG1 relay 1290 (FIG. 42).

When released, PG1 relay 1290 reverses the current through PG relay 1291 (FIG. 42) as well as operating BS relay 1271 (FIG. 40), by way of bus 1285, and permits the application of the multifrequency code representing the first time and charge digit to be applied to loop 102 (FIG. 39). At the same time, PG relay 1291 (FIG. 42) begins to time the duration of this multifrequency code.

When received at the multifrequency receiver of FIG. 53 at Position Display Circuit 23, this code first operates SP relay 1443 which, in turn, operates LK relay 1414 (FIG. 49). The frequency receiving relays 1447–1452 of FIG. 53 are therefore free to operate and transfer the first digit as ground on a two-out-of-five code leads to the TC-A relays shown in FIG. 47. This code is registered in the TC–A relays, which are locked to make contacts on DMC relay 1016 (FIG. 29).

If the received code is a valid code, CK2 relay 1454 (FIG. 53) also operates to operate RA relay 1413 (FIG. 49). When operated, RA relay 1413 completes the operate path for BS relay 1401 (FIG. 48).

The operation of BS relay 1271 (FIG. 40) at Control Pulsing Circuit 22 and the operation of PG relay 1291 (FIG. 42) releases AS relay 1270 (FIG. 40) to permit the registration of the second digit of the time and charge display in the RC-relays 1253–1257 of FIG. 39. Likewise, when PG relay 1291 operates, PG1 relay 1290 is also operated to remove the first digit multifrequency code from loop 102 and begin the timing of the interdigital interval. When PG relay 1291 again releases, PG1 relay 1290 is likewise released and the second digit is applied to loop 102.

Meanwhile, at Position Display Circuit 23, the removal of the first multifrequency digit releases SP relay 1453 (FIG. 53) which releases LK relay 1414 (FIG. 49) to release the digit receiving relays 1447–1452 (FIG. 53) as well as the CK2 relay 1454. When these relays release, the operate path for RA relay 1413 (FIG. 49) is interrupted to release this relay and likewise release the AS relay 1400 (FIG. 48). The Position Display Circuit 23 is now in a condition to receive the second digit of the time and charge display.

As can be seen in the sequence chart of FIG. 57, the transmission of the second digit takes place in precisely the same manner as the first digit, the only difference being the condition of the digit steering relays of FIGS. 40 and 48. These relays, of course, sequentially advance with each digit to insure that the appropriate digit is transmitted and that, when received, is registered in the appropriate register relays of FIG. 47. Since the time and charge display requires five digits, three more digits must be transmitted in the manner similar to those shown in FIG. 57 to complete the information for this display.

Figure 58:
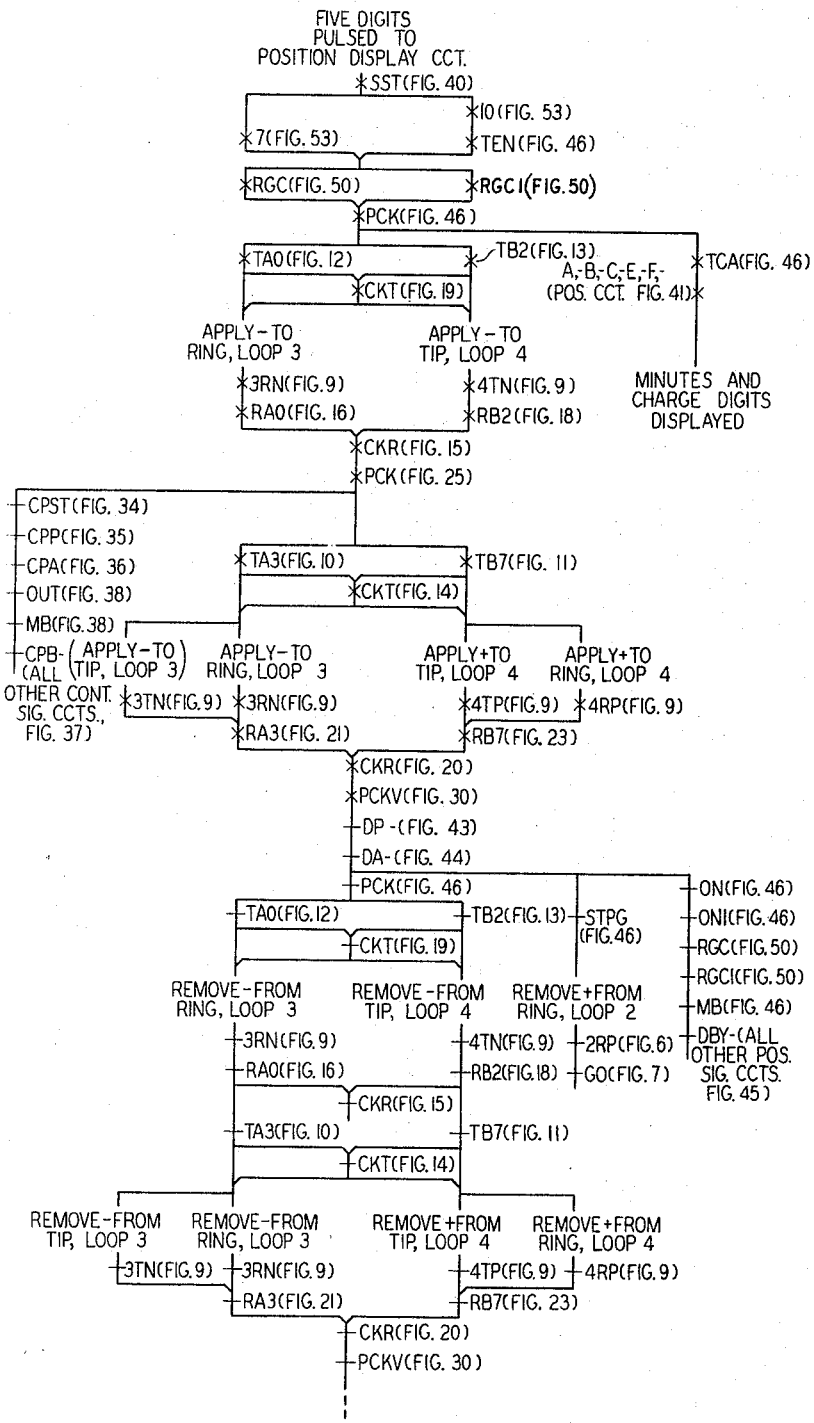

In FIG. 58 there is shown a sequence chart of the termination of a time and charge display on coin class calls. Following the transmission of the five time and charge digits, as described in connection with FIG. 57, SST relay 1282 (FIG. 40) operates by way of make contacts on EX5 relay 1217 (FIG. 38). When so operated, SST relay 1282 causes the transmission of the "7" and "10" frequencies by way of contacts within encoder 1258 (FIG. 39).

When received at Position Display Circuit 23, these frequencies operate corresponding frequency receiving relays 1451 and 1452 in FIG. 53. When operated, "10" relay 1452 (FIG. 53) operates TEN relay 1324 (FIG. 46). As can be seen in FIG. 50, contacts on TEN relay 1324 and "7" relay 1451 operate RGC relay 1415 and, provided the appropriate number of digits have been received, RGC1 relay 1416. When so operated, these relays cause the operation of PCK relay 1337 (FIG. 46) which, in turn, operates TCA relay 1332 (FIG. 46) to transfer the registered minutes and charge digits from the TC-(A, B, C, E, F) relays to the A-, B-, C-, E- and F- register relays in Position Circuit 17 (FIG. 41). These digits can then be displayed on the operator's display panel 200 (FIG. 3).

When operated, PCK relay 1337 (FIG. 46) also causes the transmission of the "A0–B2" code to Control Signaling Circuit 19. This code operates PCK relay 585 (FIG. 25) to release CPST relay 1150 (FIG. 34) and thus release the Control Pulsing Circuit 22. PCK relay 585 (FIG. 25) also causes the transmission of the "A3–B7" pulsing check verification signal to Position Signaling Circuit 21 to operate PCKV relay 1067 (FIG. 30). When so operated, PCKV relay 1067 releases the Position Display Circuit 23 (FIG. 43), causing the release of PCK relay 1337 (FIG. 46). When released, PCK relay 1337 (FIG. 46) terminates the "A0–B2" code which, in turn, at Control Signaling Circuit 19, terminates the "A3–B7" code. This can be seen at the B7 level of TA3 relay 323 (FIG. 10) and the A3 level of TB7 relay 347 (FIG. 11). When so terminated, the "A3–B7" code releases the operate path of PCKV relay 1067 (FIG. 30) to restore the signaling circuits to normal. The signaling circuits may now be used for other types of signaling.

Figure 59:
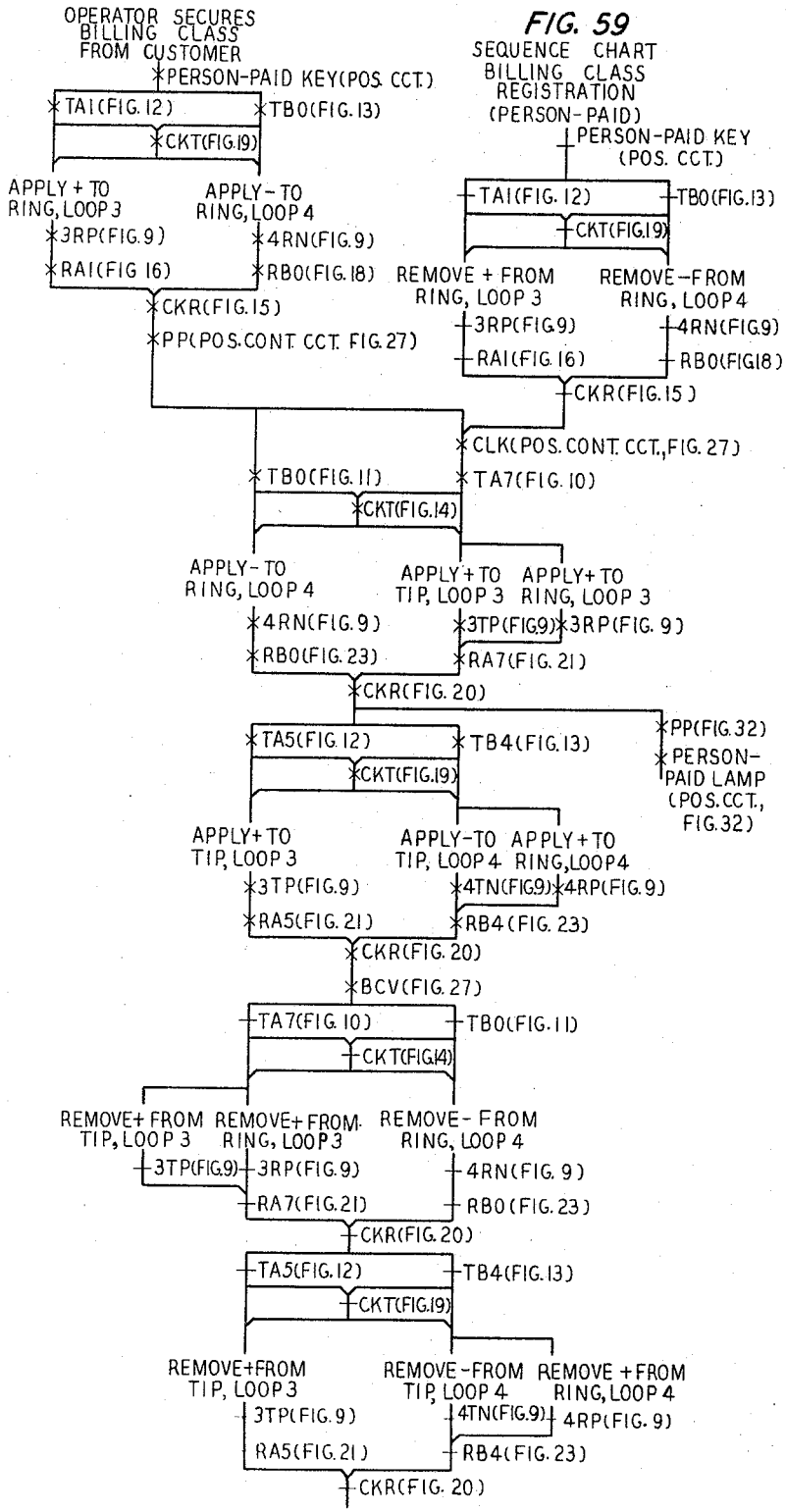

In FIG. 59 there is shown a sequence chart of the billing class registration sequence for the PERSON PAID class of billing. When the operator has secured the billing class from the customer on special toll classes of call, she operates the appropriate billing class key on the keyboard, as shown in FIG. 3. The operation of the PERSON PAID key, for example, results in the transmission of the "A1–B0" code to ground PP lead 950 (FIG. 27) and operate the PP relay in Position Control Circuit 15.

When the PERSON PAID key is released to terminate this code, and the CLK relay in Position Control Circuit 15 (FIG. 27) operates, together the PP and CLK relays cause the transmission of the "A7–B0" code back to Position Signaling Circuit 21. When received, this code operates PP 1100 relay (FIG. 32) to, in turn, light the PERSON PAID lamp in Position Circuit 17. The reception of the "A7–B0" code also results in the transmission of the "A5–B4" verification code back to Control Signaling Circuit 19 to operate BCV relay 967 (FIG. 27). When so operated, BCV relay 967 releases the "A7–B0" billing class lamp signal which, in turn, terminates the billing class verification signal "A5–B4." The signaling circuits are now returned to normal and may be used for other types of signals.

Figure 60:
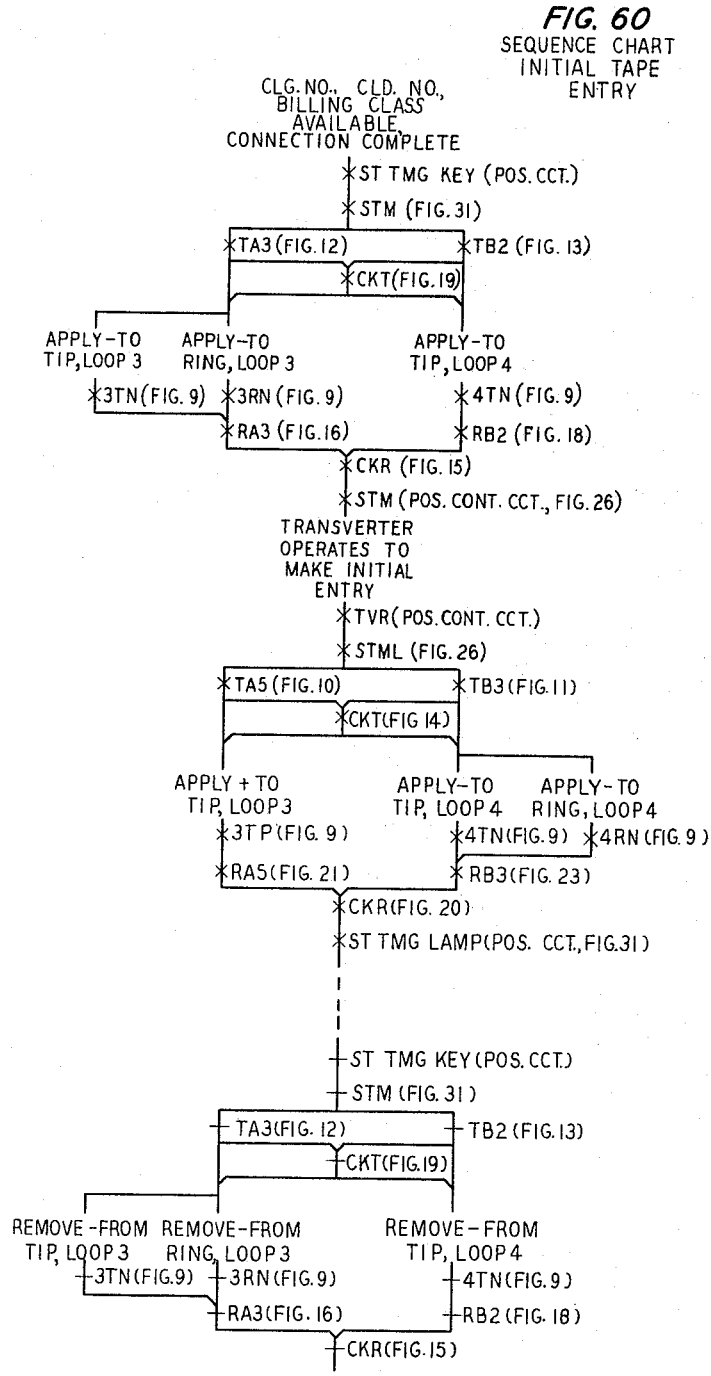

In FIG. 60 there is shown a sequence chart for the initiation of the initial tape entry in the Recorder 25 in FIG. 1. When the calling number, called number, and billing class have all been secured from the customer or from the automatic equipment, the initial entry on the tape can be made. This initial entry is made when the operator depresses the ST TMG key on her keyboard. As can be seen in FIG. 31, the operation of this key operates STM relay 1097 to send the "A3–B2" code to Control Signaling Circuit 19. This code places a ground on STM lead 929 (FIG. 26) to operate the STM relay in Position Control Circuit 15.

The STM relay in Position Control Circuit 15 calls in a Transverter Connector 29 to connect Position Control Circuit 15 to a Transverter 28. When so connected, the initial entry is made in Recorder 25 and, when complete, Transverter 21 disconnects. This disconnection places a ground on STML lead 930 (FIG. 26) to operate STML relay 931. When so operated, STML relay 931 causes the transmission of the "A5–B3" start timing lamp signal which lights the ST TMG lamp at Position Circuit 17 (FIG. 31). When the operator thereafter releases the ST TMG key, STM relay 1097 (FIG. 31) releases to terminate the "A3–B2" code.

It will be noted that alternate start timing lamp signals are available when it is also necessary to start the loop timer for manual timing by the operator on a held loop basis. As previously discussed, the "A0–B1," "A0–B4," and "A0–B5" signals are used to start the appropriate initial period timer as well as light the ST TMG lamp.

In FIG. 61 there is shown a sequence chart of the position occupied sequence followed when an operator initially occupies the position. As can be seen in FIG. 4, the insertion of the operator's headset 105 in jacks 217 and 218 completes an operate path for PO relay 221. When operated, PO relay 221 applies a ground to operate PO relay 223 in Position Signaling Circuit 21.

In FIG 6 it can be seen that the operation of PO relay 223 applies positive voltage to the tip conductor of loop 100 to operate a -TP relay corresponding to relay 250 in FIG. 6. When so operated, OTP contacts 271 complete the operate path for PO relay 270 (FIG. 7) which, in turn, applies a ground via contacts 282 to Position Control Circuit 15. The position is then made available to receive incoming calls in the manner described in the aforementioned copending application of R. B. Curtis.

If the operator wishes to release the position after completing her functions on any class of call, the POS RLS key is depressed to operate PR relay 1095 (FIG. 31). This relay, when operated, causes the transmission of the "A2–B5" code to the Control Signaling Circuit 19 to place a ground on PR lead 926 (FIG. 26) and operate the PR relay in Position Control Circuit 15 (FIG. 26). The Position Control Circuit 15 then operates to disconnect the position from this loop, extinguish the appropriate ACCESS lamp, release the LL relay at the Position Control Circuit 15, and hence ON relay 420 (FIG. 17), and release STML relay 931 (FIG. 26).

When so released, STML relay 931 terminates the "A5–B3" code previously initiated when the initial tape entry was made (FIG. 60), thus to extinguish the ST TMG lamp at Position Circuit 17 (FIG. 31). The termination of the "A5–B3" code also releases ON relay 472 (FIG. 22) at Position Signaling Circuit 21 which, in turn, releases PR relay 1095 (FIG. 31) when so released, PR relay 1095 terminates the "A2–B5" code on loops 103 and 104 to return the signaling circuits to normal.

In FIG. 63 there is shown a sequence chart for an operator-initiated make busy to prevent further incoming calls from being taken by the operator position. To this end, the MAKE BUSY key at Position Circuit 17 (FIG. 31) is operated to operate MB relay 1029 (FIG. 31). When so operated, this relay initiates the transmission of the "A0–B1" code to Control Signaling Circuit 19. This code causes the operation of MB relay 911 (FIG. 26) which in turn operates the MB relay in Position Control Circuit 15. When so operated, the MB relay in Position Control Circuit 15 marks this Position Control Circuit as unavailable and returns a ground on MBL lead 913 to operate MBL relay 914 (FIG. 26). When so operated, MBL relay 914 initiates the transmission of the "A4–B2" make busy lamp signal to Position Signaling Circuit 21.

When this code is received at Position Signaling Circuit 21, it results in the operation of MBL relay 1080 (FIG. 31) to light the MAKE BUSY lamp in Position Circuit 17, terminate the transmission of the "A0–B1" code, and initiate the transmission of the "A2–B6" lamp verification code. This latter code, when received at Control Signaling Circuit 19, operates MBV relay 584 (FIG. 25) to terminate the "A4–B2" make busy lamp signal. When this code is no longer received at Position Signaling Circuit 21, the "A2–B6" code is automatically terminated to restore the signaling circuits to normal.

Figure 64:
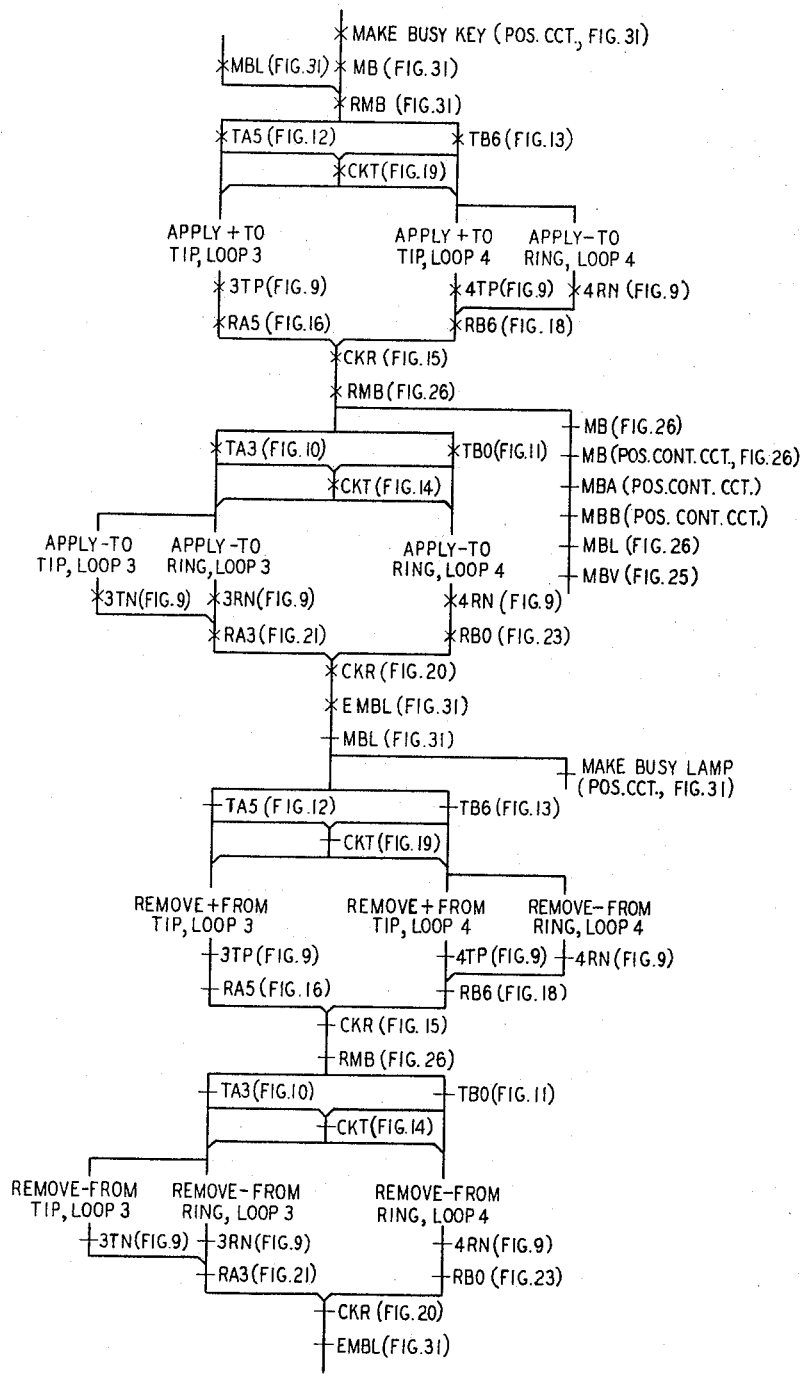

As shown in the sequence chart of FIG. 64, when it is desired to release the make busy condition, the MAKE BUSY key in Position Circuit 17 is again operated to operate MB relay 1079 (FIG. 31). Since MBL relay 1080 (FIG. 31) is now operated and locked through its own make contacts, RMB relay 1082 operates to initiate the transmission of the "A5–V6" make busy release code to Control Signaling Circuit 19.

When this code is received at Control Signaling Circuit 19, it results in the operation of RMB relay 915 (FIG. 26) which releases MB relay 911 (FIG. 26). When so released, MB relay 911 removes the ground from MB lead 912 to Position Control Circuit 15 and thus removes the make busy condition for this position.

When operated, RMB relay 915 also initiates the transmission of the "A3–B0" extinguish make busy lamp signal to Position Signaling Circuit 21. When received, this code operates EMBL relay 1083 (FIG. 31) which, in turn, releases MBL relay 1080 to extinguish the MAKE BUSY lamp in Position Circuit 17. The release of MBL relay 1080 also terminates the transmission of the "A5–B6" code thus to release RMB relay 915 (FIG. 26) at Control Signaling Circuit 19. The release of RMB relay 915 similarly terminates the "A3–B0" code to restore the signaling circuits to normal.

Figure 65:
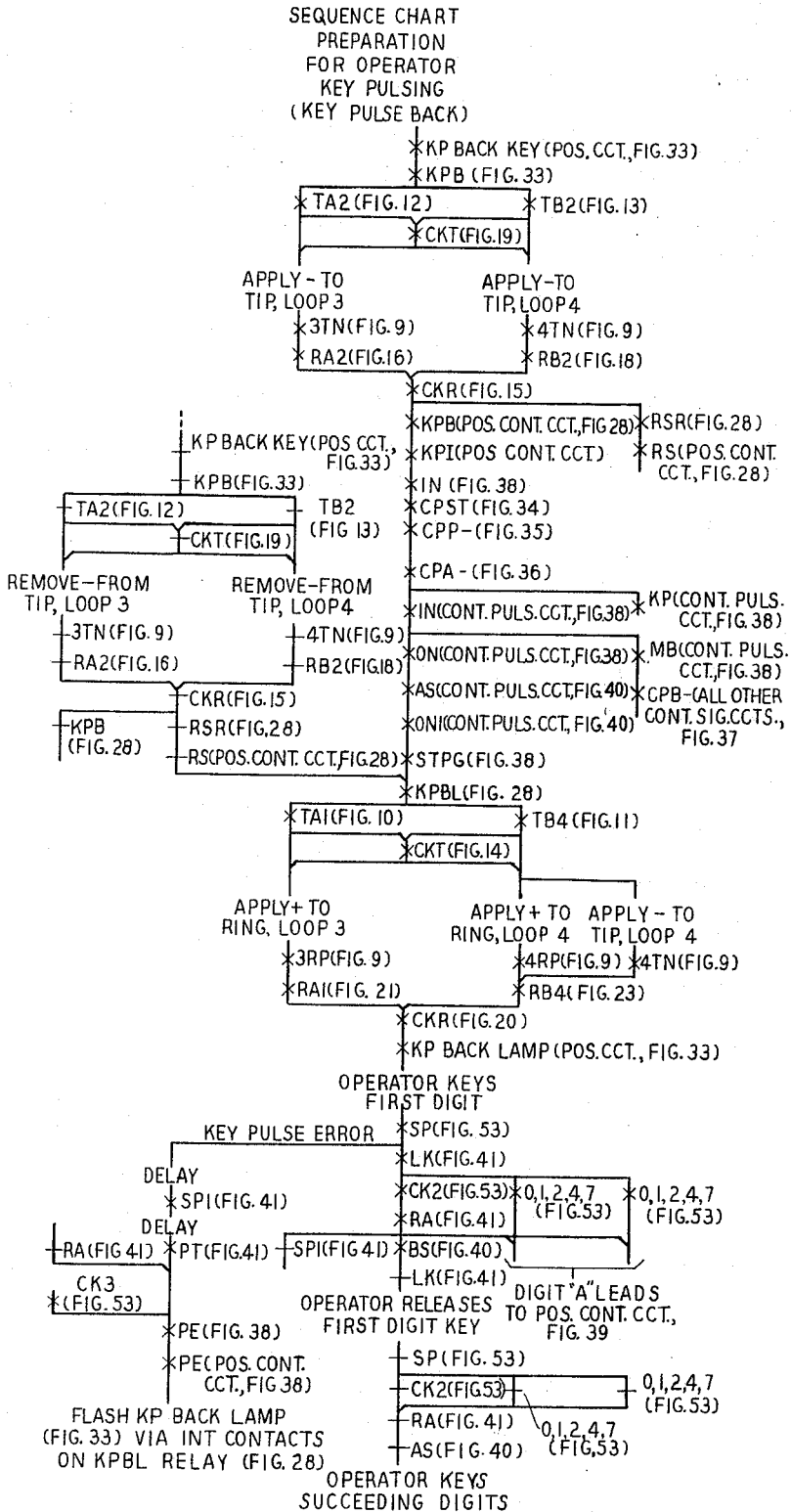

In FIG. 65 there is shown a sequence chart of the operations necessary for operator key pulsing from the Position Circuit 17 to Position Control Circuit 15. When the operator wishes to key pulse from the keyset 110 (FIG. 2) on her keyboard (FIG. 3), she depresses the appropriate key pulse control key. In FIG. 65, for example, the KP BACK key is depressed to operate KPB relay 1132 (FIG. 33). When so operated, this relay initiates the transmission of the "A2–B2" code to Control Signaling Circuit 19 to place a ground on KPB lead 979 (FIG. 28) and operate the KPB relay in Position Control Circuit 15, and to operate RSR relay 982 (FIG. 28). When so operated, the KPB relay in Position Control Circuit 15 operates a KPI relay to place a ground on IN lead 1200 to operate IN relay 1201 (FIG. 38). As can be seen in FIG. 34, the operation of IN relay 1201 operates CPST relay 1150 to initiate a search for an idle Control Pulsing Circuit. When such a Control Pulsing Circuit has been seized, connected to the Control Signaling Circuit 19, and readied for the reception of key pulse digits, ON1 relay 1283 (FIG. 40) operates to operate STPG relay 1223 (FIG. 38).

Returning to the Position Circuit 17, when the operator releases the KP BACK key to release KPB relay 1132 (FIG. 33), the "A2–B2" code is terminated to release the KPB relay in Position Control Circuit 15 and RSR relay 982 (FIG. 28). When released, RSR relay 982 removes ground from RS lead 982 to release the RS relay in Position Control Circuit 15. KPBL relay 981 (FIG. 28) now operates to initiate the transmission of the "A1–B4" code to the Position Signaling Circuit 21. When received, this code lights the KP BACK lamp to indicate to the operator that the circuits are now prepared for operator key pulsing.

It will be noted that, on operator key pulsing, only the Control Pulsing Circuit 22 is seized and no Position Display Circuit 23 is required. Since the demand for these two types of circuits is therefore different, the ratio of Control Pulsing Circuits to Traffic Service Positions will be less than the ratio of Control Pulsing Circuits to Traffic Service Positions.

Upon the lighting of the KP BACK lamp, the operator keys the first digit by depressing the appropriate digit key on her keyboard. The multifrequency code thus generated is transmitted on loop 102 to Control Pulsing Circuit 22. When received at the multifrequency receiver of FIG. 53, this code operates SP relay 1443 which, in turn, operates LK relay 1289 (FIG. 41). The digit receiving relays of FIG. 53 are now enabled and operate in accordance with the received multifrequency code. CK2 relay 1454 (FIG. 53) also operates to operate RA relay 1286 (FIG. 41).

Following the operation of SP relay 1443 (FIG. 53), the operate path for SPI relay 1287 (FIG. 41) is complete and, after a delay, this relay will operate to complete the operate path for PT relay 1288 (FIG. 41). If SPI relay 1287 is not released by the operation of RA relay 1286, after a further delay, PT relay 1288 will operate to operate PE relay 1224 (FIG. 38). As previously noted, a ground is then placed on PE lead 1225 to Position Control Circuit 15 which results in the flashing of the KP BACK lamp (FIG. 33) by way of interrupter contacts in the operate path of KPBL relay 981 (FIG. 28).

Assuming, however, that no key pulsing error has occurred, CK2 relay 1454 (FIG. 53) does operate to operate RA relay 1286 (FIG. 41). The operation of RA relay 1286 completes the operate path for BS relay 1271 (FIG. 40). The received digit, in two-out-of-five direct-current code, is transmitted directly to Position Control Circuit 15 by way of the GPA leads of FIG. 39.

When the operator releases the first digit key, SP relay 1443 (FIG. 53) releases along with CK2 relay 1454 and the operated ones of the frequency receiving relays 1447–1452. This releases RA relay 1286 (FIG. 41) to release AS relay 1270 (FIG. 40). The circuit is now in a condition to receive the second digit to be keyed by the operator. The operator keys succeeding digits in the same manner as the first digit and with the same sequence of events. The only difference is that the digit steering relays of FIG. 40 advance with each digit so that these digits are registered in appropriate relay registers in Position Control Circuit 15.

Figure 66:
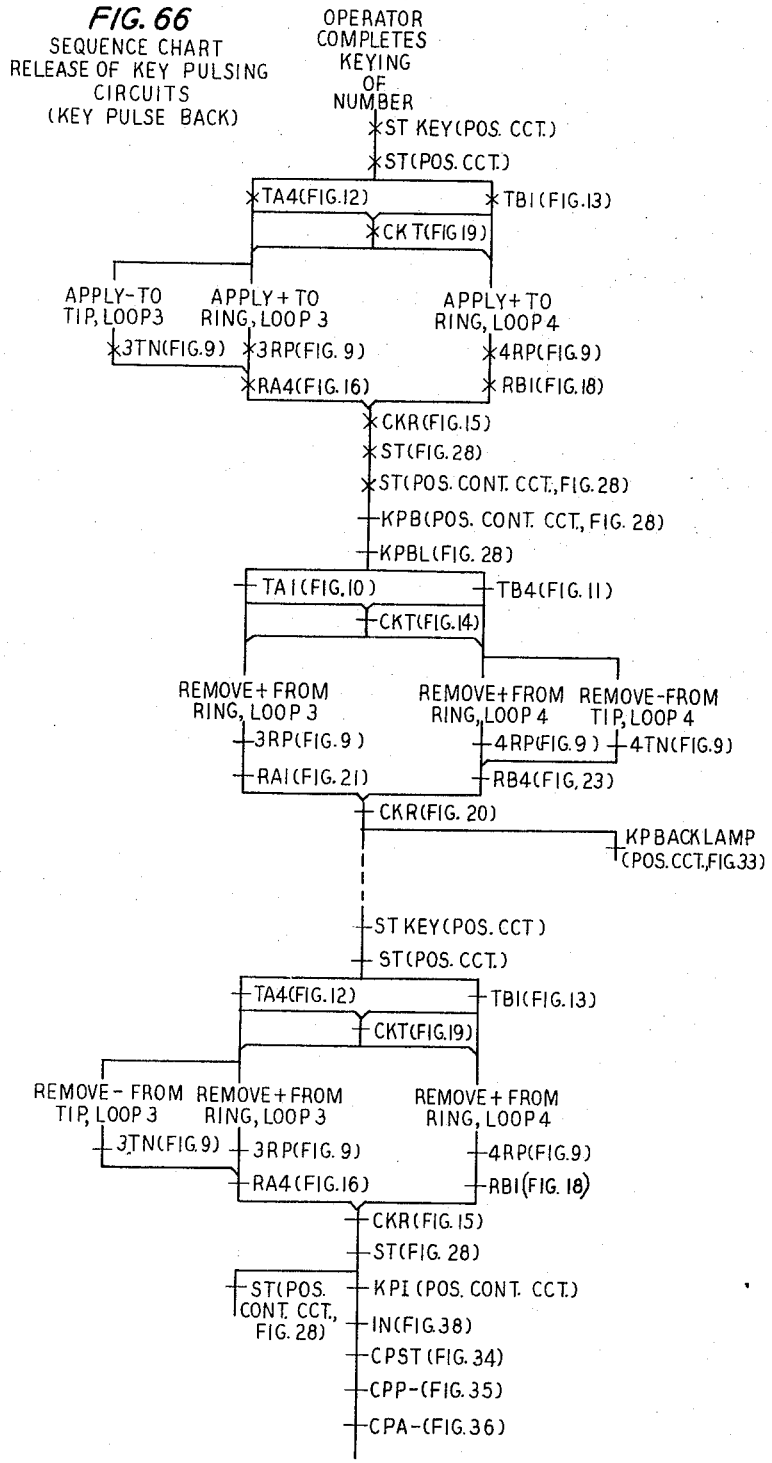

When the operator has completed the keying of the number as shown in FIG. 65, the ST key of her keyboard is depressed as shown in the sequence chart of FIG. 66. This operates the ST relay in the Position Circuit 17 to initiate the transmission of the "A4–B1" code on loops 103 and 104 to Control Signaling Circuit 19. When received, this code operates ST relay 985 (FIG. 28) to apply a ground to ST lead 986 to Position Control Circuit 15. When the corresponding ST relay in Position Circuit 15 operates, the KPB relay in Position Circuit 15 is released to interrupt the operate path for KPBL relay 981 and therefore terminate the "A1–B4" code to Position Signaling Circuit 21. When this code terminates, the KP BACK lamp is extinguished.

When the ST key is thereafter released to release the ST relay in Position Circuit 17, the "A4–B1" code is terminated to release ST relay 985 (FIG. 28). When this relay releases, it releases the corresponding ST relay in Position Control Circuit 15 as well as the KPI relay in Position Control Circuit 15. When released, the KPI relay releases IN relay 1201 (FIG. 38) to release CPST relay 1150 (FIG. 34). The Control Pulsing Circuit 22 is thereby released to restore the signaling circuits to normal.

Figure 67:
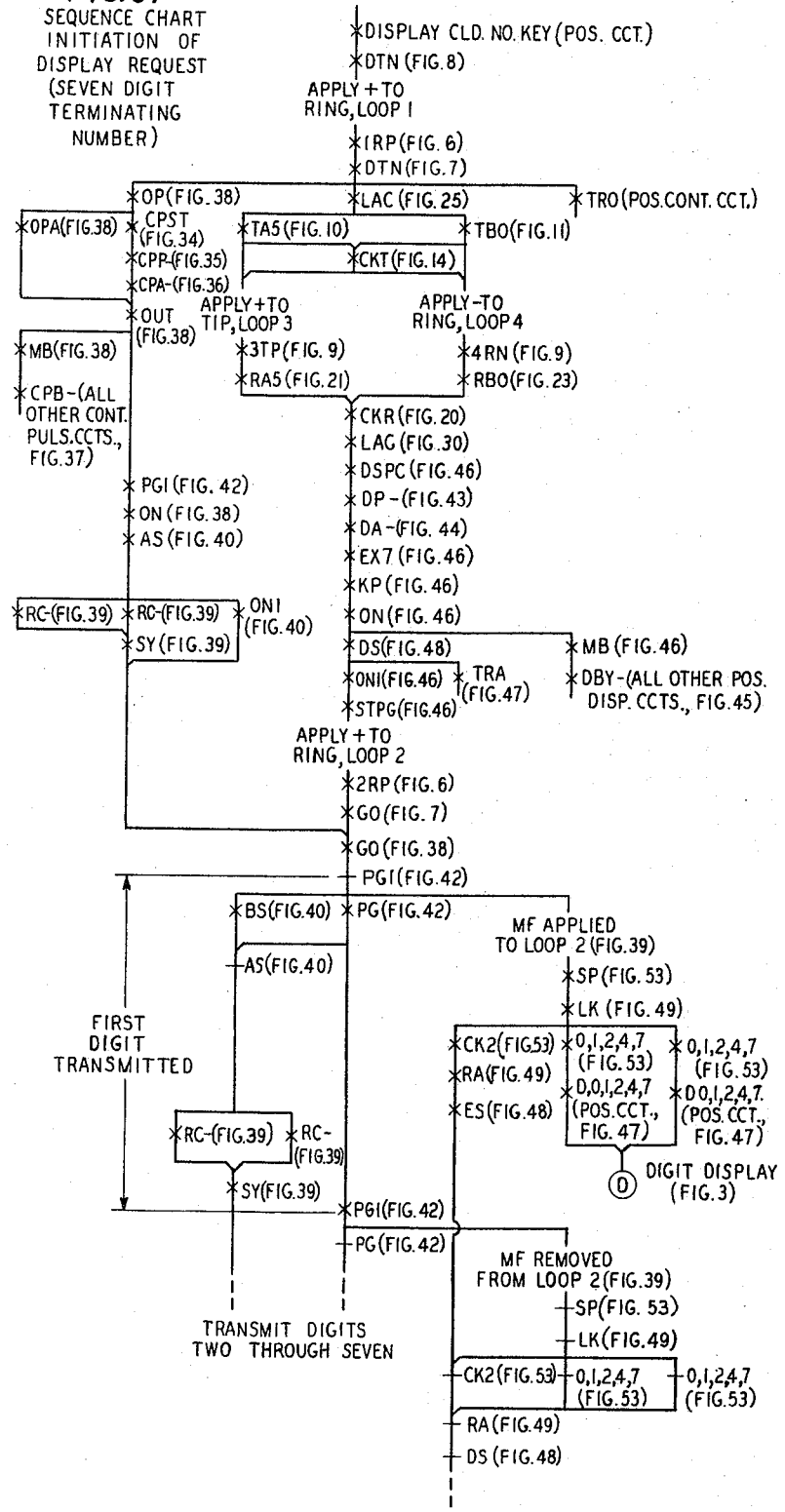

In FIG. 67 there is shown a sequence chart for the initiation of a display request at the operator position. For the purposes of illustration, it is assumed that the operator wishes to have displayed a seven-digit terminating number and therefore operates the DISPLAY CLD NO key in Position Circuit 17. As can be seen in FIG. 8, this operates DTN relay 295 to apply a positive potential to the ring conductor of loop 100.

As can be seen in FIG. 6, a 1RP relay corresponding to -RP relay 251 operates to complete the operate path for DTN relay 276 (FIG. 7). When so operated, DTN relay 276 operates the TR0 relay in Position Control Circuit 15 to prepare the Position Control Circuit for the transmission of the seven digit terminating number registered there.

Contacts on DTN relay 276 also operate OP relay 1209 (FIG. 38) and LAC relay 562 (FIG. 25). Contacts on OP relay 1209 operate OPA relay 1210 (FIG. 38) as well as CPST relay 1150 (FIG. 34). CPST relay 1150 initiates a search for an idle Control Pulsing Circuit 22 which, when seized, is connected to Control Signaling Circuit 19 to operate OUT relay 1212 (FIG. 38). In a manner similar to that described with reference to FIG. 57, the Control Pulsing Circuit 22 is thereafter prepared for the transmission of multifrequency codes by the operation of PG1 relay 1290 (FIG. 42), ON relay 1213 (FIG. 38), and ON1 relay 1283 (FIG. 40). At the same time, the first digit of the seven-digit terminating number is registered in a two-out-of-five code in RC relays 1253–1256 in FIG. 39.

The operation of LAC relay 562 (FIG. 25) initiates the transmission of the "A5–B0" code to Position Signaling Circuit 21 to operate LAC relay 1062 (FIG. 30). When so operated, contacts on LAC relay 1062 completes the operate path for DSPC relay 1333 (FIG. 46) to initiate the search for an idle Position Display Circuit. When a Position Display Circuit is seized, the corresponding DP- relay (FIG. 43) operates, followed by the operation of the corresponding DA- relay (FIG. 44) to connect the Position Display Circuit to Position Signaling Circuit 21.

Since a seven-digit terminating number is to be received, make contacts on LAC relay 1062 (FIG. 30) operate EX7 relay 1317 (FIG. 46) to prepare the Position Display Circuit 23 for the reception of seven digits. When the connector relay operates, KP relay 1310 and ON relay 1311 (FIG. 46) operate to complete the operate path for DS relay 1403 (FIG. 48). Since only a seven-digit code is to be received, the first digit display must take place in the D digit position and hence DS relay 1403 (FIG. 48) is operated by make contacts on EX7 relay 1317 (FIG. 46).

The multifrequency signals are thereafter transmitted from Control Pulsing Circuit 22 to Position Display Circuit 23 in precisely the same fashion that the minutes and charge digits were transmitted in FIG. 57. Hence this sequence will not be described in detail except to note that instead of registering these digits in Position Signaling Circuit 21 (FIG. 47), these digits are relayed directly to Position Circuit 17 for registration there.

Figure 68:
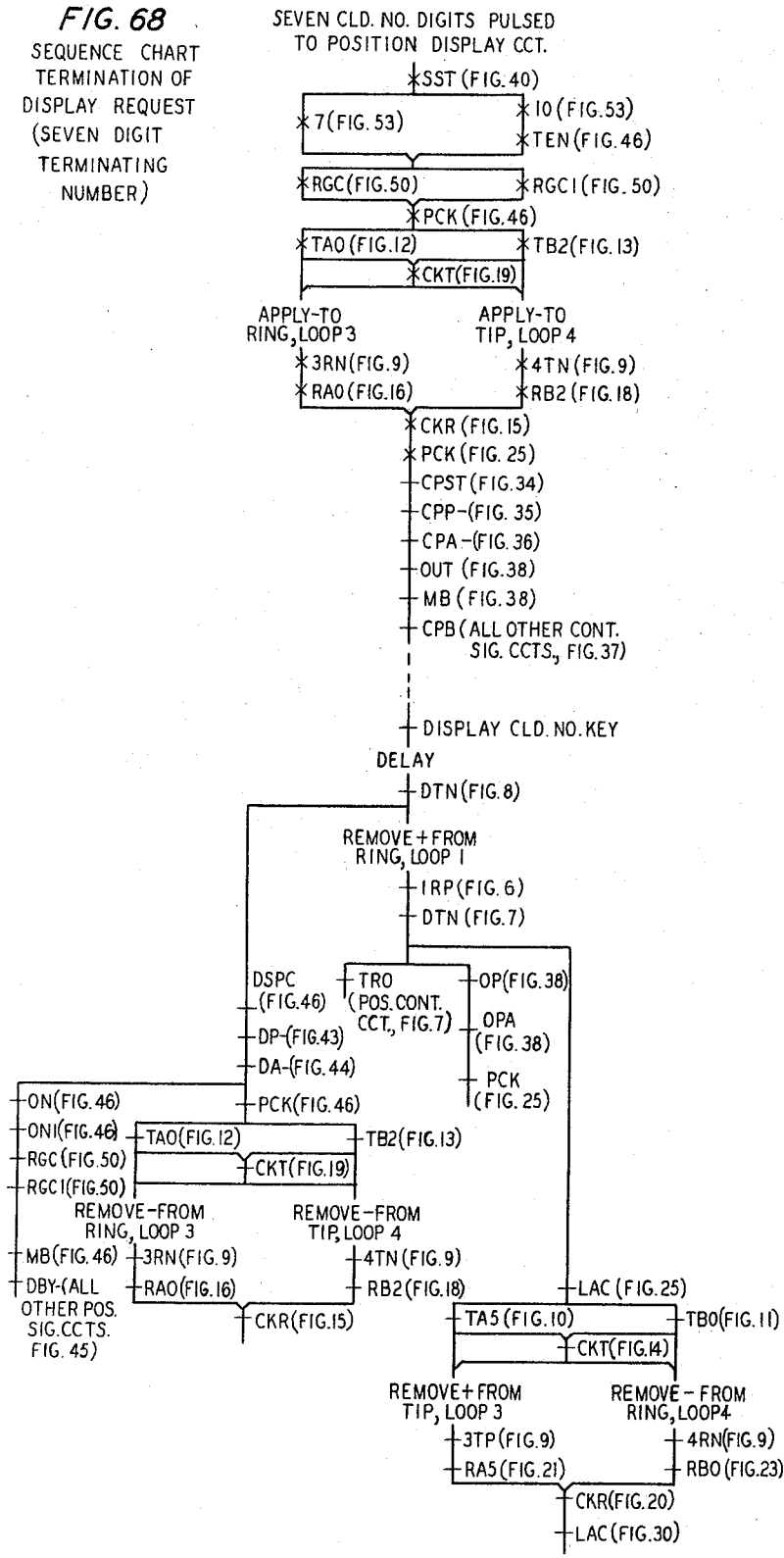

As can be seen in the sequence chart of FIG. 68, following the transmission of the seven-digit calling number to the Position Display Circuit 23, SST relay 1282 (FIG. 40) operates to transmit the "7" and "10" frequencies to Position Display Circuit 23. When received, these frequencies operate "7" relay 1451 and "10" relay 1452 (FIG. 53), the latter of which operates TEN relay 1324 (FIG. 46). In combination, "7" relay 1451 and TEN relay 1324 operate RGC relay 1415 and RGC1 relay 1416 (FIG. 50) provided, of course, the expected number of digits were previously received. When so operated, RGC relay 1415 and RGC1 relay 1416 complete the operate path for PCK relay 1337 (FIG. 46) to initiate the transmission of the "A0–B2" verification signal. When received at Control Signaling Circuit 19, this signal operates PCK relay 585 (FIG. 25) to release CPST relay 1150 (FIG. 34) and thus releases the Control Pulsing Circuit.

The operator continues to depress the DISPLAY CLD NO KEY as long as she wishes the display to continue. When this key is released, DTN relay 295 (FIG. 8) releases to remove the positive voltage from the ring conductor of loop 102. The release of DTN relay 295 also releases DSPC relay 1333 (FIG. 46) to release the Position Display Circuit 22. When it operate path is thus interrupted, PCK relay 1336 (FIG. 46) releases to terminate the "A0–B2" code.

The application of positive voltage to the ring conductor of loop 1 operates a 1RP relay corresponding to -RP relay 251 (FIG. 6), thus to release DTN relay 276 (FIG. 7). When so released, this relay releases LAC relay 562 (FIG. 25) to terminate the "A5–B0" code. The signaling circuits are now returned to normal and may be used for other signals.

The above-described arrangements are merely illustrative of numerous and varied other arrangements which may constitute applications of the pinciples of the invention. Such other arrangements may readily be devised by those skilled in the art without departing from the spirit or scope of the invention.

What is claimed is:

1. In combination, a telephone switching center, a remotely located operator position, a plurality of signaling trunks extending between said switching center and said operator position, means for deriving speech circuits on selected ones of said signaling trunks, and means for multiplexing control signals on said signaling trunks at said switching center and at said operator position.

2. The combination according to claim 1 wherein said multiplexing means includes direct current polar duplex signaling circuits.

3. The combination according to claim 1 wherein said multiplexing means includes multifrequency signaling circuits.

4. In combination, a telephone switching center, a remotely located operator position, a plurality of signaling trunks extending between said switching center and said operator position, means for deriving a four-wire speech circuit on two of said signaling trunks, means for connecting multifrequency signaling apparatus to one other of said signaling trunks, and direct current polar duplex signaling circuits connected to at least some of said signaling trunks.

5. The combination according to claim 4 further including means for selectively and temporarily connecting multifrequency transmitting and receiving equipment to said one other signaling trunk.

6. The combination according to claim 4 further including means for transmitting multidigit control signals through said direct current polar duplex signaling circuits connected to a sub-plurality of said signaling trunks.

7. In combination, a central office telephone switching center, a remotely located operator position, a plurality of two-wire lines extending between said switching center and said remote operator position, means for deriving a four-wire talking circuit on first and second ones of said lines, means for selectively and temporarily connecting multifrequency signaling apparatus to a third one of said lines, direct current polar duplex signaling circuits connected to at least fourth and fifth ones of said lines, and means for encoding multidigit codes in parallel in said direct current polar duplex signaling circuits for simultaneous transmission thereof on said lines.

8. The combination according to claim 7 further including direct current polar duplex supervisory signaling apparatus coupled to said first, second and third ones of said lines, and means for transmitting continuous supervisory signals on said first, second and third ones of said lines by way of said direct current polar duplex supervisory signaling apparatus.

9. The combination according to claim 7 further including a plurality of multifrequency signaling circuits, and means for selecting an idle one of said circuits on the basis of a predetermined order of priority.

10. A signaling system for interconnecting a telephone switching center and an operator position at some remote location, said signaling system comprising five two-wire lines extending between said telephone switching center and said remote location, means for connecting first and second ones of said lines in a four-wire speech circuit for verbal communication between said operator position and connections established at said switching center, multifrequency transmitting and receiving means, means for selectively and temporarily connecting said multifrequency transmitting and receiving means to a third one of said lines for multifrequency code signaling between said operator position and said switching center, and direct current signaling means connected to the remaining ones of said lines for direct current parallel code signaling between said operator position and said switching center.

11. The signaling system according to claim 10 further including direct current calling and called party line supervisory signaling circuits connected to said first, second and third ones of said lines, calling and called party line supervisory lamps at said remote operator position, and means responsive to said signaling circuits for selectively lighting said lamps.

12. The signaling system according to claim 10 further including decimal digit display means at said operator position, means for encoding in said multifrequency code the calling and called party telephone numbers, elapsed time, charges, coin rate for paystation connections at said switching center, and means responsive to said encoded multifrequency signals for selectively energizing said decimal digit display to display said calling and called party telephone numbers, elapsed time, charges and coin rate.

13. The signaling system according to claim 10 further including polar duplex direct current signaling apparatus connected to fourth and fifth ones of said lines, said apparatus providing a plurality of unique and distinguishable direct current conditions on each of said lines, and means for encoding each of a plurality of control and monitoring conditions at said switching center in a code including two portions, one of said portions corresponding to one of said unique conditions on said fourth line, and the other of said portions corresponding to one of said unique conditions on said fifth line.

14. A polar duplex signaling system comprising at least two pairs of wire transmission lines, means for connecting a pair of oppositely poled polarity sensitive relays in series at each end of each of the wires of said lines, a source of positive and a source of negative voltage at each end of said lines, a biasing winding on each of said relays for rendering said relays unresponsive to the local ones of said votage sources, and means for selectively connecting each wire of said lines through a respective one of said relay pairs to said positive voltage source, said negative voltage source or ground potential.

15. The polar duplex signaling system according to claim 14 further including means for monitoring said selective connecting means, said monitoring means automatically disabling said selective connection means when more than one of said voltage sources is connected to any one of said wires.

16. In a telephone system, a plurality of communication paths, a switching center for connecting calling ones of said communication paths to corresponding called ones of said communication paths, telephone operator positions located remotely from said switching center, a plurality of transmission lines interconnecting said switching center and said remotely located operator positions, means for bridging speech circuits at each of said operator positions on selected ones of said connections by ways of said transmission lines, multifrequency transmitting and receiving means for transmitting decimal digital information from and to each of said operator positions, means for selectively and temporarily connecting said multifrequency transmitting and receiving means to each of said operator positions as required, direct current polar duplex signaling means connected to all of said transmission lines, means for initiating direct current control signals at each of said operator positions to control said connections, and means for initiating direct current indicating signals at said switching center to indicate the condition of said connections.

17. In combination, a telephone central office for extending connections between originating and terminating subscriber lines, a plurality of remotely located operator positions for monitoring and controlling said connections, at least five conductor pairs extending between said central office and each of said operator positions, a four-wire speech circuit connected to first and second ones of said conductor pairs and adapted to be connected to at least three of said connections at said central office simultaneously, a lesser plurality of multifrequency signaling circuits at said central office and at said operator positions, means for selectively and temporarily connecting said multifrequency signaling circuits to a third one of said conductor pairs, first direct current polar duplex signaling circuits associated with said first, second and third conductor pairs for transmitting from said central office the supervisory state of said originating and terminating subscriber lines of said at least three connections, second direct current polar duplex signaling circuits connected to at least fourth and fifth ones of said conductor pairs, said second polar duplex signaling circuits comprising means for transmitting to said operator position parallel code indications of the states of said connections, and for transmitting to said central office parallel code directives for the control of said connections.

18. The combination according to claim 17 wherein said connections include connections from a paystation subscriber, means for encoding the time elapsed on said connection from said paystation subscriber and the charges due from said paystation subscriber, means including said multifrequency signaling circuits for transmitting said time and charges codes to said operator position, and means at said operator position for displaying said time and charges.

19. The combination according to claim 17 wherein said connections include a plurality of different classes of calls, means for encoding the appropriate class of call for each said connection, means including said second direct current polar duplex signaling circuits for transmitting said encoded class of call to said operator positions, and means responsive to said encoded and transmitted class of call for indicating said class of call at said operator position.

20. The combination according to claim 17 further including means at said central office for registering the telephone directory numbers of said originating and terminating subscribers for each of said connections, means at said operator position for requesting displays of said originating and terminating subscriber telephone subscribers, means including said first direct current polar duplex signaling circuits for transmitting said request to said central office, means responsive to said requests for seizing one of said multifrequency signaling circuits at said central office and one of said multifrequency signaling circuits at said operator position and connecting them to said third conductor pair, means for transmitting the selected one of said registered telephone directory numbers to said operator position by way of said seized multifrequency signaling circuits, and means at said operator position for displaying said transmitted directory number.

21. The combination according to claim 17 further including a plurality of illuminated control keys at each said operator position, means responsive to the operation of each of said keys for generating a multidigit operation code representative thereof, means including said second polar duplex signaling circuits for transmitting said operation codes to said central office, means at said central office for registering the reception of each of said operation codes, means responsive to each said registration for generating a multidigit verification code representation thereof, means including said second polar duplex signaling circuits for transmitting said vertification codes to said operator positions, and means at said operator positions responsive to said vertification codes for illuminating the appropriate ones of said keys.

References Cited by the Examiner

UNITED STATES PATENTS

| | | | |
|---|---|---|---|
| 1,210,505 | 1/1917 | Lundell | 179—90 |
| 2,471,220 | 5/1949 | Lear | 340—226 X |
| 2,598,695 | 6/1952 | Hill et al. | 179—90 |
| 2,802,050 | 8/1957 | Mahoney | 178—50 |
| 3,218,892 | 11/1965 | Blashfield | 179—27 X |

KATHLEEN H. CLAFFY, *Primary Examiner.*

WILLIAM C. COOPER, *Examiner.*